United States Patent [19]

Chung et al.

[11] 4,232,374
[45] Nov. 4, 1980

[54] SEGMENT ORDERING FOR TELEVISION RECEIVER CONTROL UNIT

[75] Inventors: David H. Chung, Palo Alto; John V. Cosley, Cupertino, both of Calif.

[73] Assignee: Umtech, Inc., Sunnyvale, Calif.

[21] Appl. No.: 823,619

[22] Filed: Aug. 11, 1977

[51] Int. Cl.³ .................... G06F 3/153; A63F 9/22
[52] U.S. Cl. .................................. 364/900; 340/703; 340/706; 340/725; 340/747; 340/799; 273/85 G; 273/DIG. 28; 273/313
[58] Field of Search .............. 364/900 MS File, 515, 364/518, 410, 200 MS File; 358/160; 340/324 AD, 703, 799; 273/DIG. 28; 235/92 GA

[56] References Cited

U.S. PATENT DOCUMENTS

| | | | |
|---|---|---|---|
| 3,345,458 | 10/1967 | Cole et al. | 340/324 AD |
| 3,497,613 | 2/1970 | Botjer et al. | 364/900 X |
| 3,685,038 | 8/1972 | Flanagan | 340/703 |
| 3,911,418 | 10/1975 | Takeda | 340/703 |
| 4,026,555 | 5/1977 | Kirschner et al. | 364/200 X |
| 4,054,919 | 10/1977 | Alcorn | 358/160 X |

Primary Examiner—Raulfe B. Zache
Attorney, Agent, or Firm—C. Michael Zimmerman

[57] ABSTRACT

A method and apparatus are described for generating, under the control of a microprocessor, signals for operating a scanning system of a standard television receiver. A plurality of display segments, each containing information at least partially defining one or more object images that may be desired be included in a specified display on the receiver, are stored in a cartridge memory which can also include specific operating instructions for carrying out a particular video game or other function with such display segments. Indicia uniquely associated with each of the display segments are placed in a predetermined order correlated with the order of appearance in the display of those display seqments which are to be included therein. The position of the scan is tracked, and when it approaches a desired location under the display area for a particular segment to be displayed, it responds to the indicia representing such segment by directing delivery to the scanning system of control signals which define the selected display segment. The apparatus includes composers for producing the display for each line, and a FIFO buffer for delivering information defining the line to the scanning system at a regular rate correlated to the scanning rate, irrespective of the time in which such information is made ready for the display.

12 Claims, 2 Drawing Figures

SEGMENT ORDERING FOR TELEVISION RECEIVER CONTROL UNIT

BACKGROUND OF THE INVENTION

This invention relates to the production of control signals for operating a visual display mechanism of the scanning type, such as a standard television receiver, and, more particularly, to a method and apparatus for composing under the control of a microprocessor each frame of a display at the same time the display surface area is being scanned to produce the same.

Microprocessor controlled units are now available for producing the scanning signals required to form a display on a standard television receiver. While such units typically are used to produce displays for video games and the like, proposals have been made to provide a much more powerful control unit which will, in effect, turn a television receiver into a visual output device of a computer. That is, it has been proposed that the control unit not only have the processing power to compose those displays incident to video games, but also have the processing power to perform many calculations and functions which may be desired in the home, and to produce on the television receiver whatever displays may be incident thereto.

It will be recognized that a unit for producing scanning control signals for a television receiver must be quite versatile in order to enable such usage of a standard television receiver. U.S. Patent Application Ser. No. 755,749, filed Dec. 30, 1976 and assigned to the same assignee as this application, describes and claims a control method and apparatus which has such versatility. The invention of such application comprises composing each of the frame displays during the very scan which produces the same. It accomplishes this by storing information defining a plurality of different display segments which it may be desired be included in any particular display, and then selectively extracting such information when it is required to produce the particular display segments which are to appear in any one television display. This is in contrast to prior microprocessor controlled arrangements in which each frame display is, in effect, duplicated in memory prior to the time that it is actually displayed.

Standard television receivers typically produce thirty display frames per second, each one of which requires 525 scan lines. Many of such receivers are capable of resolving each scan line into 320 individual display points which can be separately defined. Therefore, the time between the display of adjacent display points is in the order of $4.5 \times 10^{-6}$ seconds, very little time in which to both make decisions on the difference between adjacent display points and to actually make the control changes necessary to reflect such differences on the screen. One major problem in taking full advantage of the resolution and versatility available in standard television receivers is the difficulty of inexpensively making such decisions and changes.

SUMMARY OF THE INVENTION

The present invention provides an approach to such decision and change making which represents a significant advance. In its broad aspects, the method comprises the steps of storing at predetermined locations sets of information respectively defining a plurality of spatial display segments, each of which at least partially defines an object image that it may be desired be included in the display; and placing in a predetermined order indicia uniquely associated with each of the sets of information defining those spatial display segments which are to appear in a particular display. Thus, the indicia can be looked at to determine what is to be displayed over relatively large segments of the screen, rather than decisions having to be made with respect to each display point on the screen. By correlating the order in which the indicia are placed with the order of appearance of the display segments in the display, one need not even search through the indicia. It will be known that the next segment to appear on the screen will be identified by the correlation.

Most desirably, the indicia which is selected to represent each of the segments at least partly defines the geometrical location on the display surface area at which such segment is to appear. Most simply, such indicia can define the first line to be scanned during the scanning of a frame it is desired that a portion of the display segment be shown. The indicia then will not only provide the unique association discussed above, it will also set forth when information from the information set defining the display segment is required by the scanning system to produce the desired segment at the prescribed location.

The invention includes other features and advantages which will be discussed or will become apparent from the following more detailed description of a preferred embodiment.

BRIEF DESCRIPTION OF THE DRAWING

With reference to the accompanying two sheets of drawing.

DETAILED DESCRIPTION OF THE PREFERRED EMBODIMENT

Figure 1:
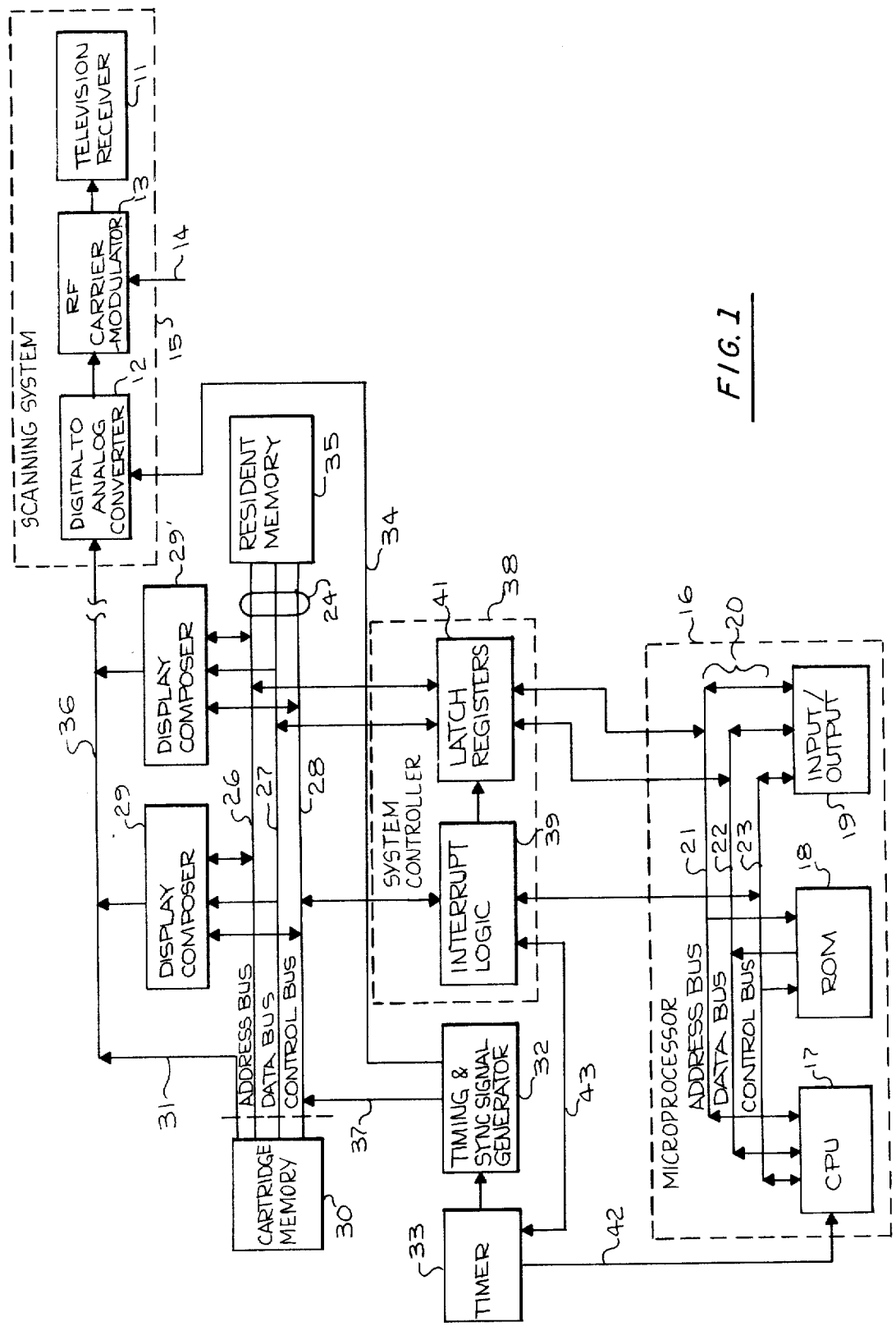
FIG. 1 is an overall functional block diagram of a preferred embodiment of the apparatus of the invention illustrating the same connected between a television receiver and a processor.

FIG. 1 illustrates a major block diagram of a preferred embodiment of the invention and the manner in which it is connected between a scanning display and a processing device. In this preferred arrangement, the scanning display is represented by a standard TV receiver 11; a digital to analog converter 12 which converts the digital scanning information delivered to it by the coupler of the invention to a composite video signal; and an RF carrier modulator 13 which superimposes a radio frequency carrier signal on the composite video signal to condition the same for direct application to the RF input (antenna input) of the TV receiver. The frequency of the carrier can be changed to correspond to the bandwidth of an available channel in accordance with conventional practice. An input line 14 is included to represent such selection capability. The total scanning system is differentiated from the remainder of the system depicted in FIG. 1 by the dotted line enclosure 15.

The processing device in this preferred embodiment is a microprocessor having desired input and output active elements connected thereto. Such microprocessor is represented in FIG. 1 by the dotted line enclosure 16 and includes a central processing unit (CPU) 17 containing the arithmetic and control registers of the microprocessor and its logic, and a read-only memory (ROM) 18 for containing the operations program and subroutines for the CPU 17. The microprocessor could also include additional memory in, for example, the form of a RAM (a read and write memory) if desired for additional storage or manipulative flexibility. Although the invention can couple various general purpose microprocessors to a scanning system, a suitable one which is available and inexpensive is the one designated "F-8" produced both by Mostek Corporation, Carrollton, Texas, and the Fairchild Semi-conductor Components Group of Fairchild Camera and Instrument Corporation, Mountain View, California.

The input/output instrumentalities of the processing unit are represented in FIG. 1 by block 19 and their nature will depend on the particular use to which the system is placed. For example, in game applications the input will include manipulative controls such as "joy sticks" and/or alpha-numeric keyboards enabling one or more players to direct movement of display objects on the TV receiver in accordance with playing of a game. The input will also include initiating mechanism, such as a manually operable or coin-actuated OFF-ON switch. The output represented by block 19 includes all desired output from the system except for that to be displayed on the TV receiver 11. For example, during game play this output may include flashing lights, sounds, etc., to indicate reaching of a goal.

The CPU, ROM, and input/output blocks of the processing unit are connected together by a bus system 20 made up of an address bus 21, a data bus 22, and a control bus 23. This bus system will be referred to hereinafter as the microprocessor bus. The utilization of a bus concept makes it possible to add other microprocessor components as desired to increase the capability of the apparatus.

The coupler of the invention appears to the CPU 17 as merely addressable memory, and when it is combined with digital to analog converter 12 and modulator 13 it appears to the TV receiver merely as an incoming video composite signal on an RF carrier. In this connection, the coupler is connected to microprocessor 16 basically only through the bus system 20, and it includes a display composer bus system 24. Bus system 24 is similar to system 20 in that it includes an address bus 26, a data bus 27 and a control bus 28. One or more display composers 29 which will be described in more detail hereinafter connect the bus system 24 to the scanning system 15. The display composers generate and provide to the scanning system 15 digital signals defining desired display picture information. A replaceable cartridge 30 also communicates with the bus system 24. Such cartridge includes memory providing sets of information in the form of digital data respectively defining a plurality of spatial display segments, each of which contains information defining object images it is expected to be desired to be displayed on the receiver 11. The memory within the cartridge further contains the programming necessary to define the specific game or other operations to be performed in connection with such display segments. For example, if the unit is to be used to play a modified sport game, such as a game of football or hockey, each of the players will be provided in the cartridge memory 30 as one or more object images in spatial display segments. The programming provided by such memory will include microprocessor instructions for playing the game.

The utilization of a replaceable cartridge as part of the invention adds significant versatility to it. For one thing, different spatial display segments defining differing object images and specific operating instructions tailored therefor can be provided. That is, merely by replacing one cartridge with another the function for which the microprocessor is coupled to the TV receiver can be changed.

Resident memory 35 is also shown communicating with the bus system 24. Such memory provides the same functions described above for the memory of cartridge 30, except that it is incorporated permanently into the remainder of the apparatus. That is, it is often desirable for the apparatus to be able to perform one or more specific function requiring a plurality of spatial display segments and programming, without the necessity of a cartridge being added to the system. The use of a cartridge, though, enables any additional hardware that may be necessary for a specific function to be added. In this connection, it is contemplated that any cartridge associated with a function requiring more than the normal complement of display composers will include extra display composers. This is represented in the drawing by the flow line 31 extending from the cartridge to the input line 36.

The coupler of the invention includes a timing and sync signal generator 32 which develops and delivers to the digital-to-analog converter 12 the timing and synchronization signals required to produce a composite video signal for TV receiver 11. Such signals include all composite sync information, i.e., the directions required by the converter 12 to generate the synchronization and equalizing pulses required in a composite video signal, as well as color burst and color burst window information. The rate at which the generator 32 operates is controlled by the primary clock or timer of the coupler represented in FIG. 1 by block 33. The signals developed by generator 32 are delivered to digital-to-analog converter 12, as represented by flow line 34, to be added to the picture information also delivered to such converter by one or more of the display composers 29 as indicated by its input line 36.

Generator 32 also controls timing of the composition of displayed pictures by the display composers 29. In this connection, it delivers to such display composers the horizontal and vertical blanking signals which it also delivers to the converter 12. It also provides a bit rate clock for the output of the display composers. This flow of information to the display composers is represented in the flow diagram by the line 37 extending from the generator 32 to the control bus 28 of bus system 24.

Communication between the microprocessor bus system 20 and the display composer bus system 24 is controlled by a system controller enclosed within the dotted line block 38. Such system controller is basically comprised of two major components, interrupt logic represented at 39 and address and data latching registers represented by the block 41. The interrupt logic represented by block 39 provides control of communication between the bus systems 20 and 24, as well as intercommunication between components on the display composer bus system. The timing of the logic is correlated with the CPU timing. More specifically, timer 33 provides the CPU clock as represented by the flow line 42 extending between such timer and CPU 17. The logic timing is also controlled by the timer 33 as represented by flow line 43. As will be discussed hereinafter, line 43 also represents clock control by the interrupt logic.

Basically, the microprocessor 16 (particularly the CPU 17 thereof) requests use of the address and data buses of either of the bus systems 20 and 26. In this connection, the CPU initiates communication not only with each of the other components of the microprocessor, but also with the display composers 29 and the cartridge connected to the bus system 24. The display composers, on the other hand, initiate communication only with the cartridge 30 and resident memory 35. In general, use of the address or data buses of either of the bus systems is given to the first requestor. If there is a conflict between a request made by the CPU and one of the display composers, the CPU has priority. Any conflicting requests made by different display composers is resolved by alternating cycles of use between the conflicting requestors.

The interrupt logic is designed to satisfy the following algorithm:

BUS CONTROL ALGORITHM

CPU Requests for Bus Use

The CPU can communicate through the bus system 20 with the microprocessor components connected thereto in a conventional manner. That is, it is only when the CPU wants to communicate with any of the components connected to the sequencer bus 24 that the system controller 38 is activated. As will become apparent hereinafter, at all times controller 38 is so activated its first instruction is to the timer 33 to stop delivering clocking pulses on line 42 to the CPU during the transfer of information between the bus systems. This will prevent the CPU from reacting to address or data information in the process of being changed.

When interrupt logic 39 receives a request from CPU 17 for data contained in the memory in cartridge 30, such interrupt logic 39 will first instruct the timer 33 to discontinue sending clocking pulses to the CPU as discussed above. This has the effect of suspending operation of the microprocessor. When the composer bus system 24 is free (the immediately preceding grant cycle is finished), the interrupt logic 39 will gate through latching registers represented by block 41, the cartridge memory address provided by the CPU on line 21 to address bus 26 of the composer bus system. Once such address is on bus 26, the logic will initiate a cartridge memory reading cycle so that the data at such address will be fed by the cartridge onto the data bus 27. At the end of a predetermined time interval selected to assure complete readout of data at any address of the cartridge memory, the content of the data bus is gated into data latches in block 41 for subsequent delivery to the data bus 22 of the microprocessor bus system. The address and data buses of the bus system 24 are thereby freed for subsequent use. Simultaneously therewith, the interrupt logic directs the timer 33 to again deliver clock pulses to the CPU 17 to continue its sequence of operation.

As will become clearer from the later detailed description of one of the display composers, the CPU 17 transfers information into and out of such composers through memory registers and other memory locations. Each of the display composers has a distinctive selection address. When the CPU 17 initiates a request to read a memory location in a display composer so addressed, the request is made to the interrupt logic 39 through control bus 23 of bus system 20. The interrupt logic reacts to such a request by directing timer 33 to discontinue sending clocking pulses to the CPU with the result that further execution of instructions by the CPU will be suspended. At the earliest time the address and data buses of the composer bus system 24 is free, the interrupt logic will gate the composer address desired from the address bus 21 through an address latch of registers 41 to the address bus 26 of the composer bus system 24.

When CPU 17 initiates a request to enter information into a memory location of one of the display composers 29, its request is applied to the control bus 23 and is received by the interrupt logic 39. The interrupt logic again initially reacts to a request from the CPU for use of the bus system 24 by directing timer 33 to discontinue sending clocking pulses to such CPU in order to suspend its operation. At the earliest time the bus system 24 is free, the interrupt logic will direct gating to address bus 26 through an address latch of registers 41 of the address present on bus 21 it is desired information be entered. Such logic will also indicate which display composer is being addressed. The selected composer will react to the address by entering into the addressed memory location the information then on data bus 27. At the end of a preselected write time cycle, the composer will pulse the interrupt logic to indicate that it has received the addressed data. The interrupt logic will react thereto by directing timer 33 to again deliver clocking pulses to the CPU so that its operation is continued.

Frame Composer Requests for Bus Use

As mentioned previously, initiation of reading of information from the memory of the cartridge 30 by a display composer is also controlled by the interrupt logic 39. When one of such display composers desires data from the cartridge memory, the interrupt logic 39 reacts to a request for such data on the control bus 28 by permitting the particular display composer to output the desired cartridge memory address onto the address bus 26. The interrupt logic further initiates a read-out cycle from the cartridge memory and directs the display composer to gate in such data. At the end of the preselected period, the interrupt logic is strobed to indicate that the bus system 24 is free for other use.

DISPLAY COMPOSERS

The frame or display composers 29 compose the control signals for each frame to be displayed substantially simultaneously with the display of such frame. The composers accomplish this function by listing where on the receiver display area each spatial segment containing a desired object image is to be shown during a frame; reading from the cartridge or resident memory and delivering to the scanning system 15 information defining each spatial segment as it is required during a scan; and producing and delivering to the scanning system background control signals at all other time during a frame scan. In this connection, it should be noted that an object image contained in a spatial segment stored in the cartridge or resident memory is not necessarily an image of a full object when it is displayed on the screen of receiver 11. For example, the object image in a selected spatial segment could be an image of a leg of a football player at a particular orientation, e.g., kicking a football, which will be displayed with another spatial segment from the cartridge or resident memory providing the body of the player. A spatial segment can also include two or more separately identifiable images, such as that of a projectile hitting a tank, or of a word or a line of text. The spatial segment may also be one which requires another spatial segment to be superimposed thereon before an identifiable object image is provided, e.g., one spatial segment could define green pants and helmet for a football player while another could define a red jersey for such player. Thus when it is stated a spatial display segment having an object image is stored in the cartridge or resident memory, it is meant that information is stored in such memory which can be manipulated by a frame composer to produce the control signals for the scanning system necessary to compose a preselected spatial display on the TV receiver 11 having dimensions significantly less than those of the full display area of the receiver. Each of such display segments typically includes information at least partially defining an object image. In the particular implementation of the concept of the invention provided by the preferred embodiment being described, each of such spatial display segments is rectangular and often includes information defining background surrounding the object image.

It should be noted in connection with the following that each television raster scan or, in other words, frame, is made up of two interlaced fields, an odd and an even field. Thus, whereever hereinafter reference is made to a "field display", one of the fields of a television frame display is being discussed.

Each of the display composers 29 is capable in this preferred embodiment of directing the display of 16 different spatial segments during each television field display. Thus when it is expected that more than 16 segments may be displayed during one frame, such as during a modified football game between two eleven-man teams (one man per segment), a sufficient number of display composers can be applied to the composer bus 24, either directly or via a cartridge, to accommodate all of such segments.

In this connection, it should be noted that each display composer is capable of directing the display of any particular spatial segment more than once during a single television field display, by changing (under CPU control) dynamically the position of such spatial segment during a field. Thus, even in this preferred embodiment each display composer, in a sense can direct the display of more than sixteen spatial elements during a display.

Separate display composers are used in this preferred embodiment to superimpose one segment on another during a raster scan. It will be recognized that the number of display composers which can be included in an embodiment of the invention is not limited except by the processing and communication capability of the particular embodiment.

Figure 2:
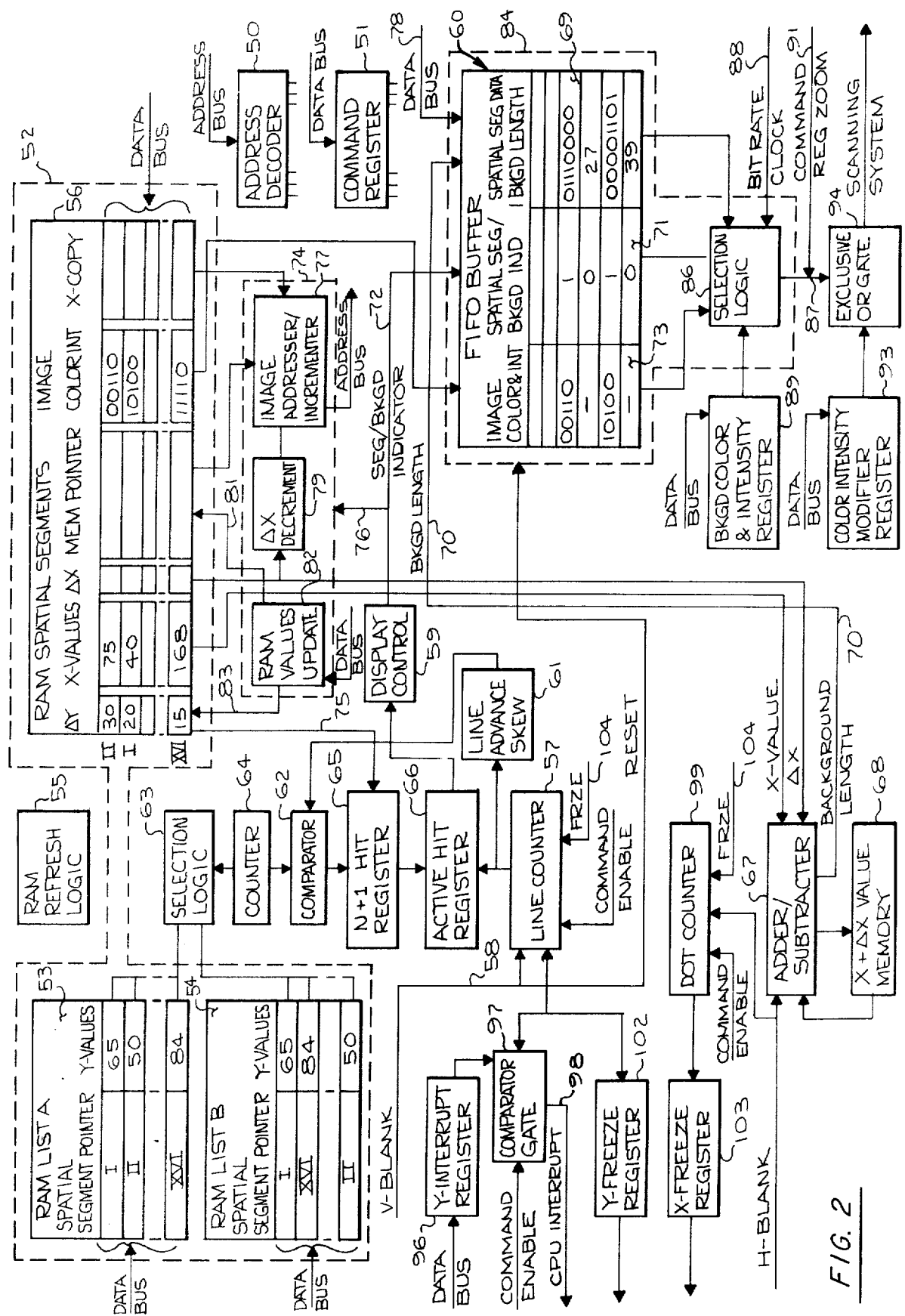
FIG. 2 is a detailed functional block diagram of a portion of the preferred embodiment depicted in FIG. 1.

FIG. 2 is a functional block diagram of a preferred display composer for the invention. The spatial position nomenclature used therein is based on Cartesian coordinates with "X" representing the direction of each scan line and "Y" the direction orthogonal to the scan lines. Each dot on a scan line represents a count of one in the X direction, and each scan line represents a count of one in the Y direction.

Each display composer includes an address decoder 50 which intercepts all requests to address any of the registers or memory locations to be described. In this connection, the address decoder input is connected to the address bus 26 of the bus system 24, and the decoder is provided with a multiplicity of ENABLE outputs which are individually connected (not shown) to the various registers and memory locations of the display composer. Each display composer further includes a command register 51 which not only enables or disables the entire composer as an entity, it also enables or selects various functions within the display composer as will be described. It is loaded from the data bus 27 of bus system 24 under the control of the CPU 17.

Each composer of the invention includes means for delivering background defining information and sets of information defining the spatial display segments to the scanning system. Such means includes a dynamic RAM memory arrangement set apart in FIG. 2 by the dotted line block 52. As is known, a dynamic RAM is a read/write memory which requires periodic refreshing of the information contained therein. Conventional refresh logic for the same is represented by block 55.

RAM 52, among other things, lists the spatial display segments to be shown during any specified frame display, and the spatial location desired for each in such display. It should be noted that a determination of a desired spatial location for a segment is also a determination of when the segment is to be displayed during the scanning operation for the frame. Information defining the location desired for a segment on the display surface area thus can be referred to as "time-distance" information. The dynamic RAM also lists the attributes, such as color and intensity, the object images of the display segments are to have in the specified frame display.

As a particularly salient feature of the instant invention, RAM 52 is arranged to list those spatial display segments to be shown during a specified frame display in a manner which greatly simplifies identification of the sets of information required from the cartridge or resident memory to control the scanning system to produce desired display segments. More particularly, indicia uniquely associated with the display segments to be included in a display are placed in the RAM 52 in a predetermined order, which order preferably is correlated with the order of appearance of display segments in such display. Placing the indicia in such order facilitates extraction of the information sets from the cartridge when needed without the necessity of searching through all of the sets for the right set. In this connection, it would be quite difficult and expensive to provide fast enough logic to complete such a one-by-one comparison in any situation in which it was desired that spatial display segments be displayed quite close to one another on a screen.

Most desirably, the predetermined order used for the indicia is the order of appearance of the display segments in the X direction. Since each line of the display is formed by scanning in the X direction, the order of the indicia will then also be the time order of extraction of the information sets for the display, to the extent the sets of information defining the display segments are required for a particular scan line forming the display.

From the broad standpoint, any indicia can be chosen to be associated with the sets of information. It is preferred, however, that the indicia be a portion of the information defining each of the display segments and, in fact, most desirable it is the line on which it is desired the segment in question first appear during a scan or, in other words, its "Y" value, which actually provides the indicia. The indicia then can function not only to identify the particular set of information required for the spatial display segment to be extracted, it can also be used to aid in distinguishing those display segments which are to appear on a particular line from those which are not.

In accordance with the above, the dynamic RAM memory 52 is functionally separated into a pair of list portions 53 and 54 setting forth the predetermined order in which the sets of information are to be extracted from the RAM, and a main portion 56 containing location and attribute information relating to the display segments. As mentioned previously, while the sets of information are listed in the order of the appearance of the display segments in the X direction, it is the segment location Y-values used as the indicia to identify the information sets.

To simplify an understanding of the above, the representation in FIG. 2 of the lists and main portion of the RAM include an example of a typical display arrangement. With reference to list portion 53 (List A), it will be seen that the X order of three of the spatial segments to appear in the frame display in question have, in order, the Y-value of 65, 50 ... 84. There is associated in the logical sense with each of such Y-values, a "spatial segment pointer". Such pointers are represented by Roman numerals and coincide with corresponding Roman numerals identifying specific segment location and attribute information in the RAM main portion 56. Thus, the Y-location value 65 is the Y-value of a spatial segment having an X-location value of 40, the Y-value 50 is the Y-value of a spatial segment having an X-value of 75, etc.

As will be described more fully below, the list portions 53 and 54 are to be used alternately, depending on whether or not there is a change in the X-order of the segments between successive frame displays. Moreover, there is provided in the RAM memory, locations enabling the listing of sixteen different spatial segments in each of such lists even though only three, the first two and the last one, are illustrated in each of the lists of FIG. 2. The RAM main portion 56 also includes memory locations accommodating information for sixteen different spatial segments. And as discussed above, while such entries in the main portion are not in any particular order, each is distinctively associated with its Y-value or values in the RAM list 53 or 54 being used at the time.

The main portion of the memory 56 includes for each of the spatial segments, the information illustrated in FIG. 2. That is, it includes for each segment, the number of scanning lines that have information defining the particular spatial segment ($\Delta Y$); the location along each of the lines first encountered by the scanning system requiring information on the spatial segment (its X value); the length, in bytes, of the segment along each of the lines ($\Delta X$); the address in the memory of the cartridge 30 or in the resident memory giving at any given time the location of the segment information which will be required next (the memory pointer); and the attributes, e.g., color and intensity, desired for the object image or images in the segment. The list in the main portion of the RAM further includes for each of the spatial segments, an "X copy" bit which will be explained hereinafter.

Means are included which reacts to the predetermined order of indicia in the one of the lists A or B activated at the time, by extracting from the cartridge memory in their order of appearance in the display, those sets of information defining the spatial display segments to be included in such display. In this connection, means are included for tracking the scan of the scanning system as it produces each frame display. That is, a line counter 57 is used to keep track of the position of the scanning system in the line or "Y" direction by counting the lines scanned during each field. Counter 57 is reset by the vertical retrace pulse of the timing signal as indicated by the "V-blank" input 58.

Counter 57 cooperates with a display control 59 to direct delivery to a first in-first out (FIFO) buffer 60, digital information defining the line to be scanned. That is, the count output of such counter is fed through a line advance skew 61 to a comparator 62. The purpose of skew 61 is to advance by one the count being delivered to the comparator by the counter 57. Comparator 62 will sequentially compare at the beginning of each horizontal retrace, the advance by one count (N+1) with all of the Y values listed in the particular RAM list A or B which is to be compared therewith during a specified frame as determined by selection logic 63. In this connection, the comparisons are most simply made as part of the access to the RAM for refreshing. Moreover, it is made during memory cycles when the RAM is otherwise not being accessed. A counter 64 is therefore included to sequence through the addresses of all of the Y-values of the list selected during each N+1 count fed to the comparator 62 to assure that the Y-values of all of the listed segments are compared with the advanced count.

Each favorable comparison made by the comparator 62 will result in a "hit" being fed into the advanced line hit register 65. As an example, if line counter 57 is registering the count "64" which results in the next succeeding count, count "65" being compared by comparator 62 with RAM list A, a favorable comparison will be registered for the spatial segment denoted "I". This will result in setting of advanced hit register 65 to indicate a comparison.

Advanced hit register 65 has additional activating input from the main portion 56 of RAM 52. That is, it continues to be set for any of the spatial segments which were first displayed on earlier scan lines during the frame but have a length in the Y direction ($\Delta Y$) which requires information defining the same to also be displayed on the particular scan line being loaded into register 65. This is represented by the flow line 75 extending to such register from the $\Delta Y$ segment of the main portion 56 of the RAM. In the particular example being used, the $\Delta Y$ portion will indicate to the hit register 65 that segment II is also to be displayed on scan line 65. That is, such segment first appeared on line 50 as is evidenced by the Y-value for the same located in RAM portion list A. Its length in the Y direction, however, is twenty lines, as indicated in the $\Delta Y$ portion of the main portion of the RAM, with the result that information defining the segment also appears on scan line 65. This $\Delta Y$ value is decremented after each line an object is displayed. And when the $\Delta Y$ value is equal to one, the bit in the hit register 65 corresponding to the segment represented thereby is reset.

At the start of each scan line, the N+1 hit register 65 is strobed by the horizontal retrace pulse to dump its contents into the active hit register 66. It is such register which directs the display control 59 on a real time basis, i.e., during actual scanning of the line. Upon receiving a hit signal from register 66, display control 59 will respond thereto by initiating several operations. It will first direct RAM 56 main portion to deliver to an adder/subtracter 67 the X value of the first spatial segment to be displayed on the line in question. The adder/subtracter will utilize such information along with the horizontal retrace pulse to calculate the length of background at the beginning of the line prior to the first spatial segment to be displayed on the line. In this connection, a cursor register 68 is used to maintain the X value and ΔX for the most recently displayed segments, to be used by the adder/subtracter in making such calculations. This background length or, in other words, time-distance information, will be delivered by the adder/subtractor to an information section 69 of the FIFO buffer in numeric form, as represented by flow line 70. In the example being used, the adder/subtracter 67 will deliver the number "39" in binary form to the section 69 since there are 39 dots of background which are to be produced in the specified frame prior to the appearance of the first spatial segment, segment I. The display control 59 will also deliver to an indication section 71 of the FIFO buffer a symbolic bit (in the example, an "0") which indicates that the information delivered to section 69 by the adder/subtracter is background information. This is represented by the flow line 72 extending from the display to such buffer section.

Once the information defining the initial background, if any, is deliverd to FIFO buffer 60, the information required by such buffer to display the portion of the first spatial segment appearing on the line is then loaded. More particularly, in receiving a hit from register 66, display control 59 directs RAM main portion 56 to deliver to the attribute section 73 of the buffer 60, the digital information in such RAM main portion defining the color and color intensity the object image or images within the first segment are to have on each line during the frame display. RAM main portion 56 also delivers a segment indicator (a "1" in the case of the example) to FIFO buffer section 71.

The information in the cartridge memory is also delivered to the buffer at such time. That is, the segment indicator is also sensed by direct memory access (DMA) logic set apart by dotted line outline 74. Such sensing is represented by information flow line 76.

DMA logic 74 acts, in effect, as means responsive to the scan tracking indicating that the scanning system is approaching a desired spatial position for a selected spatial segment by directing the cartridge or resident memory to deliver information required to produce such segment to the information discharging means 84 of the composer. Such DMA logic 74 therefore includes an image addresser/incrementer 77 which takes from the memory pointer section of the RAM 56, the address in the memory for the first information defining that portion of the segment which is to appear on the line being scanned and delivers it via the address bus to such memory. The cartridge or resident memory reacts thereto by delivering the information at such address for the line being scanned to the information section 69 of the buffer 60, as is represented by flow line 78. In this connection, the information defining a segment is stored in the cartridge or resident memory as symbolic digital data in one byte sections, one at each address. The DMA logic therefore includes a delta X decrement 79 which reacts to the number of bytes defining the segment in the X direction by advancing the image addresser/incrementer from one address to another until such time as the number of bytes of information required to define the spatial segment on the line is delivered to the buffer 60. Once the information is so delivered, the address specified for the segment in the RAM portion 56 is updated to the address which provides the first information required for the next line of the segment to be produced. This is represented by flow line 81 extending to the cartridge pointer portion of the RAM 56 from a RAM values update block 82 within the DMA logic 74. The delta Y for the segment is also decremented by the DMA logic at this time for the purpose discussed earlier. Such decrementation is represented by the flow line 83 extending from the update block 82 to the delta Y section of the main portion 56 of the RAM.

It should be noted that although the above described updating can be accomplished in the DMA logic 74 as described, it is also possible to do so under the control of software. The software would have to satisfy the same algorithm as described above in connection with the DMA logic.

In the particular example being used in which the spatial display segment labelled "I" follows the first background information, image color and intensity indicia "10100" will be delivered to attribute section 73 of buffer 60, the binary bit "1" will be delivered to the indicator section, and the binary data "00001101" defining the segment will be delivered to the information section of such buffer. In this connection, it should be noted that the information set defining the segment includes information defining the background for object images within the segment. In this example, a binary "0" represents a background dot whereas a binary "1" defines an object dot.

After the information required to display spatial segment I at the proper location is loaded into buffer 60, information defining the background, if any, between it and the next segment in sequence is loaded into the buffer. To this end, display control 59 directs that the X value of the next segment be delivered to adder/subtracter 67 along with the X value and the delta X from the segment just loaded. Adder/subtracter 67 calculates from such information the time-distance or, in other words, length between the segments which are to be sequentially displayed, and delivers the results of such calculation to the information section 69 of FIFO buffer 60. In the example being used, such length is 27 dots, the difference between the end of spatial segment I and the beginning of spatial segment II. Again, this information is provided to the information section in numeric form, and the display control delivers to the indication section 71 a symbolic bit which indicates that the number represents background information rather than spatial segment data.

Information defining spatial segment II can then be delivered to buffer 60 in accordance with the procedure discussed above in connection with segment I. Additional background and segments to complete the line will sequentially be delivered to the buffer. In this connection, the time-distance or length for the last background in the line is calculated by the adder/subtracter 67 from the delta X of the previous segment and the horizontal retrace pulse at the end of the line.

This sequential operation of delivering to the buffer 60 all of the information needed by it to define a line can be completed in a relatively short time. Depending on the depth of the FIFO buffer, and bandwidth of the cartridge or resident memory available to the display composer, some displays may require the information delivery to be completed after the actual scan of the line has started. The provision of a FIFO buffer 60 as part of the information discharge means prevents such a delay from affecting the operation of the scan system. More particularly, it is only necessary that the information be delivered to the buffer prior to the time it is actually required during the scan since a FIFO buffer will immediately deliver to its output any information which is received by it.

The information discharge means of which the buffer 60 is a part is contained within the dotted line section 84. Such discharge means assures that the information defining a line being scanned will be delivered to the scanning system at a regular rate correlated with the rate at which such scanning system scans the display surface area of the TV receiver to produce a frame display. More particularly, the buffer 60 delivers in sequence to selection logic 86 the background defining information and the symbolic information defining the individual segments. The rate of output of such selection logic on line 87 is correlated with the bit rate, as represented by bit rate clock input 88 thereto.

At the beginning of a line scan, the first information delivered to the selection logic by buffer 60 will be the information defining the length of background before spatial segment I is displayed. The selection logic 86 will decode the background length numeral and cause delivery to the scanning system of background information for the number of dots so designated. The background information for the display surface area is provided by a background color and intensity register 89 which is loaded via the data bus 27 under the control of the CPU. Immediately after delivery of the first designated background information is finished, the buffer 60 will serially deliver to logic 86 both the data defining the spatial segment I and, when required, the color and intensity information for the object image or images therein. When the spatial segment data indicates background, the selection logic will direct register 89 to deliver information defining the same to the scanning system; whereas when the segment data indicates an object image, the selection logic 86 will direct to the scanning system the color and intensity information for the spatial segment contained in the attribute section 73 of the buffer.

The discharge arrangement will continue to serially direct to the scanning system information defining the line being scanned until such time as the line is finished. The entire process will then be repeated for the next line. In this connection, when a field for a frame display is completed in accordance with the above, both the buffer 60 and line counter 57 will be reset by the vertical blank pulse. Also, those values relating to spatial segments which have been changed during the field scan will be updated by the CPU under software control. That is, the delta Y's of the segments which have been displayed will be returned to their full value and the cartridge pointer address of each displayed segment will be updated to that address in the cartridge memory which contains the first information which will be required for the segment in question during the new field.

The delta Y and cartridge pointer addresses will be similarly updated between frame displays. Moreover, if there is a difference in the X order of the segements to be displayed, command register 51 will issue a selection bit to selection logic 63 to change the list which is compared during the frame scans. In this connection, providing a pair of lists enables the X order set forth in one to be updated while the other is being used for comparisons.

The simultaneous composition of a display at basically the same time the display is produced by a scanning system provides significant versatility to the kinds of information which can be displayed. Moreover, it enables manipulations and other functions related to the display to be carried out in relatively straight-forward manners. The preferred embodiments of the invention being described includes arrangements for performing certain functions and manipulations relating to the display which are expecially desirable. For example, with the instant invention it is a simple matter to "zoom" or, in other words, enlarge or contract, the spatial segments which are displayed. To this end, command register 51 includes bits which indicate whether or not a spatial segment to be displayed is to be multiplied by an integer, e.g., by 2. When command register 51 is programmed to indicate that a multiplication is to take place, it will deliver enable signals to logic (not shown) at the output of the buffer which will multiply the spatial segment data accordingly. A command register input line 91 is illustrated communicating with the output line 87 of the selection logic 86 to represent such a multiplication.

The apparatus of the invention also includes an arrangement for modifying the color and/or color intensity information emanating from the selection logic 86. More particularly, a color and intensity modifier register 93 is provided to store color and intensity information which is exclusively OR'ED, as represented by gate 94, with the display color and intensity information prior to its delivery to the scanning system. Thus, the color or intensity of either the object images or the background can be changed as desired. In this connection, it may be desired to change the same between sequential frame displays or sets of frame displays in order to present to the viewer a flashing color display.

The composer also includes means which will cause a display segment to be repeatedly displayed. More particularly, the "X copy" section of RAM main portion 56 is for the purpose of containing a symbolic bit of information associated with each of the segments indicating whether such segment is to be repeated when it is addressed. If it is to be so repeated, the bit of information is conveyed to the image addresser/incrementer 77 of the DMA logic to direct the same not to be incremented during a line scan but rather to repeat the address contained within the cartridge pointer section until such time as the delta X for the segment is exhausted. The RAM value update 82 will then update the cartridge pointer to the address for information appearing on the next scan line, which address will again be repeated during the succeeding line scan for the number of times indicated by the delta X decrement. Thus the information delivered from the memory of cartridge 30 to the spatial segment data section 69 of the buffer 60 during each line scan will be repeated so the scanning system will produce the selected segment a plurality of times adjacent to one another on the display surface area. This function of the apparatus is particularly useful in producing a repetitive background on the display area, such as a checkerboard background.

The preferred embodiment of the invention also enables an interrupt signal to be generated for application to the CPU interrupt pin at any designated scan line. To this end, it includes a Y interrupt register 96 which receives from the data bus 27 under control of the CPU 17 information designating a line at which the interrupt signal is desired to be issued during a given frame display. Upon receiving an enabling command from command register 51, a comparator gate 97 compares the value in Y-interrupt register 96 with the count of counter 57. Upon comparison of equality, gate 97 will issue an interrupt signal for application to the CPU interrupt pin as represented by flow line 98. The CPU can react thereto in any desired way determined by the programming, such as by shifting from one set of instructions to another.

In some games and other potential applications of the apparatus of the invention, it is desirable to be able to store a location on the display area being scanned at a particular time when an external command signal is received. For example, in a war game it may be desirable to be able to point or "shoot at" a location on the display surface with a light pen or the like to indicate a "hit" at such location. A simple means for storing or, in other words, freezing such a location is also included in the preferred embodiment. To this end, the composer includes a dot counter 99 in addition to the line counter 57. Whereas line counter 57 keeps track of the line being scanned at any given time, dot counter 99 keeps track of the dot or location in the X direction along each line as it is being scanned. In this connection, dot counter 99 receives reset input as represented by the flow line from the horizontal retrace signal.

After receiving a freeze ENABLE signal from command register 51, both line counter 57 and dot counter 99 will dump respectively into Y freeze registers 102 and 103 their values on receiving external stimuli as represented by the "freeze" flow lines 104. The content of the freeze registers 102 and 103 can be interrogated by the CPU to initiate an action based on the values therein. For example, if the external stimuli is provided by a light pen acting as a gun in the manner set forth earlier, the action initiated by the CPU may be the presentation of a spatial display segment in the next frame showing as an object image an explosion at the frozen location.

SYSTEM PROGRAMMING

As mentioned previously, all of the registers and other memory locations within each of the composers 29 is accessed by the CPU through the address decoder of the particular composer in question, and for each composer there are 16 potential objects that can be displayed, and hence the RAM main portion 56 and each list 53 and 54 are 16 entries long. Any entry in a list that is within the range of actual Y (line) values visible on the screen will be interpreted as a segment to be displayed on the screen. For NTSC systems this range is 0–263 lines. Thus, if fewer than 16 objects are being displayed at a given time, some of the list entries contain values outside of the appropriate range; this in effect disables that entry.

In one specific implementation of the invention, the registers in each display composer are classified into three categories; WRITE ONLY, READ ONLY and READ/WRITE. The WRITE ONLY and READ ONLY registers perform mainly control and status functions. The READ/WRITE registers are used to describe the segments being displayed. All of these registers are accessed by the CPU 17 through its memory address space. When accessing composer registers in such implementation, the following rules should be observed:

(1) Adding a new segment to the screen (or at least placing it on the active list in RAM 52) should be done only during the V-blank between even-to-odd field transitions. This also applies to control bits of the command register.

(2) The optimal time to move a segment on the display area by switching from one of the lists 53 and 54 to the other and changing the X value of the segment if necessary is during the vertical blank of either field.

Display Composer Address Assignments-Specific Implementation

|  | ADDRESS |
|---|---|
| Write Only Registers: | |
| Command Register | 1 1 1 1 0 1 1 1 |
| Background Register | 1 1 1 1 0 1 0 1 |
| Finald Modifier Register | 1 1 1 1 0 0 1 0 |
| Y-Interrupt Register | 1 1 1 1 0 0 0 0 |
| Read Only Registers: | |
| X-Freeze Register | 1 1 1 1 1 0 0 0 |
| Y-Freeze Low Order Register | 1 1 1 1 1 0 0 1 |
| Y-Freeze High Order Reg. | 1 1 1 1 1 0 1 0 |
| Current Y Low Order Reg. | 1 1 1 1 1 0 1 1 |
| Read/Write Registers-RAM Memory: | |
| Cartridge Pointer Low Order | 0 0 0 0 X X X X |
| Cartridge Pointer High Order and Color | 0 0 0 1 X X X X |
| ΔX, Intensity & X-Copy | 0 0 1 0 X X X X |
| ΔY Register | 0 0 1 1 X X X X |
| X Value Register | 0 1 0 0 X X X X |
| Y Value Low Order List A | 0 1 0 1 X X X X |
| Y Value Low Order List B | 0 1 1 0 X X X X |
| Y Value High Order and X Order List A | 0 1 1 1 X X X X |
| Y Value High Order and X Order List B | 1 0 0 0 X X X X |

Write Only Registers:

Command Register—Address=F7

| BIT | 7 | 6 | 5 | 4 | 3 | 2 | 1 | 0 |
|---|---|---|---|---|---|---|---|---|
| | YINT H.O. | A/B̄ | Y-ZM | KBD | INT. | ENB | FRZ | X-ZM |

X-ZM: X-Zoom bit X-ZM=0=No zoom in X direction X-ZM=1=zoom in X direction by factor of 2

FRZ: Freeze bit defines CPU Interrupt Pin as an input (FRZ=1) such that when it is stimulated externally, the contents of the Dot Counter and Line Counter are instantaneously copied into the freeze registers which can be interrogated by the CPU.

ENB: Enable bit, 0=all DMA, Video and X logic activities of composer are disabled. 1=composer is enabled.

INT: Interrupt bit, this bit only has affect when the FRZ bit equals 0. In this case, the Interrupt pin is defined as an output. INT=0=interrupt disabled INT=1=interrupt enabled, and interrupt source is defined by INT. SEL. bit.

KBD: Used as a general purpose output port. It is electrically connected to a pin on the composer package.

Y-ZM: Y-Zoom bit Y-ZM=0=no zoom in Y direction Y-ZM=1—zoom in Y direction by a factor of 2.

A/B̄: Specifies which list, A or B is to be used by X and RAM logic. A/B̄=0=B list active A/B̄=-1=A list active YINT H. O.: This is the high order bit of the Y-Interrupt Register.

Background Register—Address=F5

| BIT | 7 | 6 | 5 | 4 | 3 | 2 | 1 | 0 |
|---|---|---|---|---|---|---|---|---|
| | X | X | X | INT 1 | INT 0 | BLU | GRN | RED |

This register specifies the color and intensity of the screen background. INT 1 and INT 0 are the intensity bits to be interrupted as follows:

| INT 1 | INT 0 | |
|---|---|---|
| 0 | 0 | Lowest Intensity |
| 0 | 1 | ↓ |
| 1 | 0 | ↓ |
| 1 | 1 | Highest Intensity |

RED, BLUE and GREEN are the color bits, presenting eight possible colors:

| RED | GREEN | BLUE | |
|---|---|---|---|
| 0 | 0 | 0 | Black |
| 0 | 0 | 1 | Blue |
| 0 | 1 | 0 | Green |
| 0 | 1 | 1 | Green-Blue |
| 1 | 0 | 0 | Red |
| 1 | 0 | 1 | Red-Blue |
| 1 | 1 | 0 | Red-Green |
| 1 | 1 | 1 | White |

Final Modifier Register—Address=F2

| BIT | 7 | 6 | 5 | 4 | 3 | 2 | 1 | 0 |
|---|---|---|---|---|---|---|---|---|
| | X | X | X | INT 1 | INT 0 | BLUE | GREEN | RED |

The final video output pins are always exclusive OR'ed with the contents of this register.

Y-Interrupt Register—Address=F0

| BIT | 7 | 6 | 5 | 4 | 3 | 2 | 1 | 0 |
|---|---|---|---|---|---|---|---|---|
| | MSB−1 | | | | | | | LSB |

This registers contents (plus the Y INT H. O. bit in the Command Register) are compared with the current line counter contents and if the INT. bit=1 and INT SEL bit=1 then a true comparison will result in a lower voltage state being placed on the CPU interrupt pin.

READ ONLY REGISTERS

X-Freeze Register—Address=F8

| BIT | 7 | 6 | 5 | 4 | 3 | 2 | 1 | 0 |
|---|---|---|---|---|---|---|---|---|
| | MSB | | | | | | | LSB |

This register receives a copy of the current dot counter (the current X co-ordinate of the scanning beam) when the FRZ bit=1 and a negative transition is detected on the CPU interrupt pin.

Y-Freeze Low Order Register—Address=F9

| BIT | 7 | 6 | 5 | 4 | 3 | 2 | 1 | 0 |
|---|---|---|---|---|---|---|---|---|
| | MSB−1 | | | | | | | LSB |

Receives a copy of the current Y-counter (current line number) when the FRZ bit=1 and a negative transition is detected on the CPU interrupt pin.

Y-Freeze High Order and Odd/$\overline{\text{Even}}$ Register—Address=FA

| BIT | 7 | 6 | 5 | 4 | 3 | 2 | 1 | 0 |
|---|---|---|---|---|---|---|---|---|
| | O/$\overline{\text{E}}$ | X | X | X | X | X | Y-C8 | Y-F8 |

Y-F8: This bit is the Y-Freeze high order (MSB) bit which should be concatenated with the Y-Freeze Low Order Register contents to form the complete 9-bit Y-Freeze address. As with the Y-Freeze Low Order Register, this bit is loaded with the value of the current Y-counter when the FRZ bit=1 and a negative transition is detected on the Interrupt Pin.

Y-C8: This is the MSB of the current Y-counter, i.e., the current line number, and should be concatenated with the current Y-Freeze Low Order Register to determine the line number.

O/$\overline{\text{E}}$: Indicates whether the screen is currently displaying the odd field or even field.
O/$\overline{\text{E}}$=0=Even Field
O/$\overline{\text{E}}$=1=Odd Field

Current Y Low Order Register—Address=FB

| BIT | 7 | 6 | 5 | 4 | 3 | 2 | 1 | 0 |
|---|---|---|---|---|---|---|---|---|
| | MSB−1 | | | | | | | LSB |

Low order bits of the current Y (line) counter. This counter is reset on the leading edge of V-blank, and incremented by each succeeding H-blank pulse.

Read/Write Registers

Each segment to be displayed on the screen has a set of Registers in the composer which are used to describe the coordinates of that segment on the screen and the attributes of the object image or images in such segment. A total of 16 objects can be displayed using one composer. The set of registers for each segment are as follows (the XXXX is used to designate one of the 16 objects):

Cartridge Pointer Low Order—Address=0000 XXXX

| BIT | 7 | 6 | 5 | 4 | 3 | 2 | 1 | 0 |
|---|---|---|---|---|---|---|---|---|
| | RP7 | RP6 | RP5 | RP4 | RP3 | RP2 | RP1 | RP0 |

RP0—RP7—the low-order eight bits of the first cartridge memory address containing the segment information.

Cartridge Pointer High Order and
Color—Address=0001 XXXX

BIT  7    6    5    4    3    2    1    0
    |RED|GRN|BLU|RP12|RP11|RP10|RP9|RP8|

RP8—RP12—the high-order five bits of the first cartridge Address containing segment information. These bits are concatenated with the Cartridge Pointer Low Order bits.
BLU, GRN, RED—bits defining the color of the object image. A "0" means that color is off, a "1" means that color is on.

ΔX, Intensity and X-Copy—Address=0010 XXXX

BIT  7      6     5    4   3   2   1   0
    |X-COPY|INT 1|INT 0|ΔX4|ΔX3|ΔX2|ΔX1|ΔX0|

ΔX0-ΔX4—These five bits specify how many bytes wide the segment is.
INT 1 and INT 0—Specify the intensity of the object in the segment. Four levels of intensity, with 00 being the lowest level and 11 being the brightest.
X-COPY—When this bit equals zero, the cartridge pointer is incremented after each byte fetch until ΔX is decremented to zero. When this bit equals one, the cartridge pointer is not decremented after each byte fetch (only after the last fetch).

ΔY Register—Address=0011 XXXX

BIT 7 6 5 4 3 2 1 0
   |MSB         LSB|

This register indicates the height of the segment or, in other words, how many scan lines include information defining it. For example, if ΔX=5 and ΔY=20 for a particular object, then the object is described by a five byte (40 dot) by 20 line (in each field) array in the memory of cartridge 31.

X-Value Register—Address=0100 XXXX

BIT 7 6 5 4 3 2 1 0
   |MSB         LSB|

X-ORDA0—X-ORDA3—X-order entry for List A.
Y-VAMSB—The most significant bit of the Y-coordinate of the object for List A.

Y Value High Order and X-Order List
B—Address=1000 XXXX

BIT  7    6 5 4   3      2      1      0
    |Y-VB MSB|X X X|X ORD B3|X ORD B2|X ORD B1|X ORD B0|

X-ORDB0 through X-ORDB3—X-order entry for List B.
Y-UBMSB—The most significant bit of the Y-coordinate of the object—List B.

The coupler of the invention has been programmed, utilizing the specific register implementation described above, to display a "tennis" video game which is externally controlled by a user. The following pages is program listing of the assembled language for such game. The microprocessor utilized is the previously mentioned F-8 microprocessor available from Mostek Corporation and the Fairchild Semiconductor Components Group of Fairchild Camera and Instrument Corporation. It was programmed in accordance with the *F-8 User's Guide* and *Guide to Programming* available in 1976 from Fairchild; and the 1975 *F-8 Preliminary Data Book* available from Mostek. The memory allocations (in hexadecimal) for the following are:

| Cartridge "Tennis" Program | F800–FFAF |
| Display Composer | 0800–08FF |
| Cartridge Segment Information | 1200–1F9A |

Also, the designation UM1 is used to refer to the display composer; and the designation UM 2 is used to refer collectively to the system controller, the timer and the timing and sync signal generator.

```
0000     ****************************
0001     *PROGRAM                   *
0002     ****************************
0003     *
0004     *
0005     *
0006     ****************************************************
0007     *                                                  *
0008     *        DECLARATIONS                              *
0009     *                                                  *
000A     ****************************************************
000B     *
000C     *
000D     HU     EQU      H'A'
000E     HL     EQU      H'B'
000F     S      EQU      H'C'
0010     *
0011     *UM1 REGISTERS*
0012     ***************
```

```
0013            COM     EQU     H'8F7'
0014            ZOOM    EQU     H'8F6'
0015            BGPN    EQU     H'8F5'
0016            YOFF    EQU     H'8F4'
0017            XOFF    EQU     H'8F3'
0018            FMOD    EQU     H'8F2'
0019            TXT     EQU     H'8F1'
001A            YINT    EQU     H'8F0'
001B            *
001C            XFRZ    EQU     H'8F8'
001D            YFRZ    EQU     H'8F9'
001E            ODD     EQU     H'8FA'
001F            YCUR    EQU     H'8FB'
0020            *
0021            FPL     EQU     H'800'
0022            FPH     EQU     H'810'
0023            DELX    EQU     H'820'
0024            DELY    EQU     H'830'
0025            XV      EQU     H'840'
0027            YVLB    EQU     H'860'
0028            YXA     EQU     H'870'
0029            YXB     EQU     H'880'
002A            *
002B            *UM1 REGISTER BITS*
002C            ********************
002D            SELA    EQU     H'40'
002E            INT     EQU     H'08'
002F            ENB     EQU     H'04'
0030            FRZ     EQU     H'02'
0031            RED     EQU     H'80'    FOR OBJECTS ONLY!
0032            GRN     EQU     H'40'
0033            BLU     EQU     H'20'
0034            COPY    EQU     H'80'
0035            HI      EQU     H'40'
0036            LO      EQU     H'00'
0037            FB      EQU     H'01'    FOR BACKGROUND ONLY!
0038            GB      EQU     H'02'
0039            BB      EQU     H'04'
003A            HIB     EQU     H'10'
003B            LOB     EQU     H'00'
003C            *
003D            *SYSTEM I/O CONSTANTS*
003E            **********************
003F            OPSU    EQU     H'06'    PSU INT CNTRL PORT
0040            IVU     EQU     H'0C'    SMI INT VECTOR UP
0041            IVL     EQU     H'0D'    SMI INT VECTOR LO
0042            OSMI    EQU     H'0E'    SMI OUTPUT PORT
0043            ESMI    EQU     H'01'    ENABLE SMI EXTERNAL INT
0044            EJOY    EQU     H'80'    ENABLE JOYSTICK INPUT
0045            *
0047            ********************
0048            SUB     EQU     39       SCREEN UPPER BOUNDARY
0049            CH2     EQU     90       COURT HIGHT / 2
004A            CH      EQU     CH2+CH2  COURT HIGHT
004B            CW2     EQU     88       COURT WIDTH / 2
004C            CW      EQU     CW2+CW2  COURT WIDTH
004D            CUB     EQU     54       COURT UPPER BOUNDARY
004E            CBB     EQU     CUB+CH   COURT BOTTOM
004F            CLB     EQU     6        COURT LEFT BOUNDARY
0051            *
0052            BW2     EQU     2        BALL WIDTH / 2
0053            BW      EQU     BW2+BW2  BALL WIDTH
0054            BH2     EQU     3        BALL HIGHT / 2
0055            BH      EQU     BH2+BH2  BALL HIGHT
0056            *
0057            NW2     EQU     1        NET WIDTH / 2
0058            NX      EQU     CLB+CW2  NET X-POSITION
0059            NH      EQU     60       NET HIGHT (2 OBJECTS)
```

```
005A         •
005B         PW2   EQU   4           PADDLE WIDTH / 2
005C         PH2   EQU   16          PADDLE HIGHT / 2
005D         PH    EQU   PH2+PH2     PADDLE HIGHT
005E         LPX   EQU   NX-60       LEFT PADDLE X-POSITION
005F         RPX   EQU   NX+60       RIGHT PADDLE X-POSITION
0060         •
0061         CBH   EQU   4           COURT BOUNDARY HIGHT
0062         •
0063         SCH   EQU   7           SCORE HIGHT
0064         LSX   EQU   NX-8-16     LEFT SCORE X-VAL
0065         RSX   EQU   NX+8        RIGHT SCORE X-VAL
0066         SY    EQU   CUB+4       SCORE Y-VAL
0067         •
0068         BBH2  EQU   16          BALLBOY HIGHT / 2
0069         BBH   EQU   BBH2+BBH2   BALLBOY HIGHT
006A         BBW2  EQU   8           BALLBOY WIDTH / 2
006B         •
006C         CRW   EQU   40          CROWD WIDTH
006D         CRH   EQU   12          CROWD HIGHT
006E         LCRX  EQU   CLB+CW2-7-CRW    LEFT CROWD X
006F         RCRX  EQU   CLB+CW2+8        RIGHT CROWD X
0070         •
0071         HBY5  EQU   8           HBY5 = (PH + BH) / 5
0072         •
0073         VX0   EQU   H'0180'     BALL VELOCITY
0074         VY40  EQU   H'0256'
0075         VY20  EQU   H'0103'
0076         BBVX  EQU   H'01'       BALLBOY VELOCITY
0077         BBVY  EQU   H'02'
0078         PEN   EQU   6           PENETRATION DEPTH
0079         PENS  EQU   2           PENETRATION DEPTH--SIDE COLLISIO
007A         VP    EQU   6     $     PADDLE VELOCITY
007C         •
007D         LSVB  EQU   H'01'       LEFT SERVE BUTTON
007E         RSVB  EQU   H'04'       RIGHT SERVE BUTTON
007F         LDVJ  EQU   H'01'       LEFT DOWN VERTICAL JOYSTICK
0080         RDVJ  EQU   H'10'       RIGHT DOWN VERTICAL JOYSTICK
0081         •
0082         SERV  EQU   H'7F'       MODE = SERVE
0083         PLAY  EQU   H'80'       MODE = PLAY
0084         LSV   EQU   H'BF'       NEXT TO SERVE = LEFT
0085         RSV   EQU   H'40'       NEXT TO SERVE = RIGHT
0086         CLBN  EQU   H'CF'       CLEAR BALL & NET SETTINGS
0087         LBLN  EQU   H'20'       LEFT BALL LEFT NET
0088         RBLN  EQU   H'00'       RIGHT BALL LEFT NET
0089         LBRN  EQU   H'30'       LEFT BALL RIGHT NET
008A         RBRN  EQU   H'10'       RIGHT BALL RIGHT NET
008B         HBF   EQU   H'08'       HIDE BALL FLAG
008C         HBFN  EQU   H'F7'       HIDE BALL FLAG NOT
008D         BBYH  EQU   H'04'       BALLBOY Y-H.O.
008E         BYHN  EQU   H'FB'       BALLBOY Y-H.O. NOT
008F         BBIM  EQU   H'02'       BALLBOY IMAGE 2 BIT
0090         UPFL  EQU   H'80'       UPDATE FLAG
0091         LPIM  EQU   H'40'       LEFT PADDLE IMAGE 2 BIT
0092         RPIM  EQU   H'20'       RIGHT PADDLE IMAGE 2 BIT
0093         PIMN  EQU   H'9F'
0094         •
0095         PERB  EQU   16          PERIOD BOUNDARY COLLISION
0096         PEPH  EQU   8           PERIOD PADDLE HIT
0097         PERS  EQU   4           PERIOD SCORE
0098         •
0099         LTER  EQU   -1          LONG UPDATE TERMINATOR
009A         STER  EQU   -2          SHORT UPDATE TERMINATOR
009B         EVNF  EQU   -3          EVEN FIELD MARKER
009C         NOBJ  EQU   13          NUMBER OF OBJECTS
009D         •
009E         *PROGRAM VARIABLES*
```

```
009F          ************************
00A0          XP      EQU     D'0'
00A1          X       EQU     D'1'
00A2          YP      EQU     D'2'
00A3          Y       EQU     D'3'
00A4          VXP     EQU     D'4'
00A5          VX      EQU     D'5'
00A6          VYP     EQU     D'6'
00A7          VY      EQU     D'7'
00A8          SACC    EQU     D'10'
00A9          TEMP    EQU     HU
00AA          TMP2    EQU     HL
00AB          PCOM    EQU     S        S.P. D'20'
00AC          PSTA    EQU     S        S.P. D'21'
00AD          LPY     EQU     S        S.P. D'22'
00AE          RPY     EQU     S        S.P. D'23'
00AF          PY      EQU     S        S.P. D'22'--D'23'
00B0          PST1    EQU     S        S.P. D'24'
00B1          HITK    EQU     S        S.P. D'25'
00B2          BBK1    EQU     S        S.P. D'26'
00B3          BBK2    EQU     S        S.P. D'27'
00B4          PXLS    EQU     D'30'    ^S.P. D'30'
00B5          XLST    EQU     S        S.P. D'30'--D'47'
00B6          LSCD    EQU     S        S.P. D'50'
00B7          RSCD    EQU     S        S.P. D'51'
00B8          BVX     EQU     S        S.P. D'52'
00B9          BBX     EQU     S        S.P. D'53'
00BA          BVY     EQU     S        S.P. D'54'
00BB          BBY     EQU     S        S.P. D'55'
00BC          SNDP    EQU     S        S.P. D'60'
00BD          SNDD    EQU     S        S.P. D'61'
00BE          SNDL    EQU     S        S.P. D'62'
00BF          SIS     EQU     S        S.P. D'70'
00C0          SJ      EQU     S        S.P. D'71'
00C1          SHU     EQU     S        S.P. D'72'
00C2          SHL     EQU     S        S.P. D'73'
00C3          *
00C4          *MEMORY ALLOCATION*
00C5          *********************
00C6          BASE    EQU     H'1800'         LOADING ORIGIN
00C7          DDAT    EQU     H'1200'         DATA ORIGIN
00C8          RAM     EQU     H'0C00'         RAM
00C9          *
00CA          *
00CB          *********************************************
00CC          *                                             *
00CD          *       DATA                                  *
00CE          *                                             *
00CF          *********************************************
00D0          *
00D1          *
00D2                  ORG     DDAT
00D3          *
00D4          *VELOCITY TABLE*
00D5          ******************
00D6 1200 56  VTBL    DC      VY40.
00D7 1201 02          DC      VY40:
00D8 1202 03          DC      VY20.
00D9 1203 01          DC      VY20:
00DA          *
00DB          *BALL BOY ROM-POINTER TABLE*
00DC          *****************************
00DD 1204 F5  BBTB    DC      LB1E:+RED+GRN+BLU
00DE 1205 25          DC      LB1E.
00DF 1206 F4          DC      LB1O:+RED+GRN+BLU
00E0 1207 E5          DC      LB1O.
```

```
00E1 1208 F5            DC      LB2E:+RED+GRN+BLU
00E2 1209 A5            DC      LB2E.
00E3 120A F5            DC      LB2D:+RED+GRN+BLU
00E4 120B 65            DC      LB2D.
00E5 120C F6            DC      RB1E:+RED+GRN+BLU
00E6 120D 25            DC      RB1E.
00E7 120E F5            DC      RB1D:+RED+GRN+BLU
00E8 120F E5            DC      RB1D.
00E9 1210 F6            DC      RB2E:+RED+GRN+BLU
00EA 1211 A5            DC      RB2E.
00EB 1212 F6            DC      RB2D:+RED+GRN+BLU
00EC 1213 65            DC      RB2D.
00ED                *
00EE                *DIGITS*
00EF                ********
00F0 1214 3E    DIGS    DC      H'3E'   ZERO
00F1 1215 22            DC      H'22'
00F2 1216 22            DC      H'22'
00F3 1217 22            DC      H'22'
00F4 1218 22            DC      H'22'
00F5 1219 22            DC      H'22'
00F6 121A 3E            DC      H'3E'
00F7                *
00F8 121B 38            DC      H'38'   ONE
00F9 121C 08            DC      H'08'
00FA 121D 08            DC      H'08'
00FB 121E 08            DC      H'08'
00FC 121F 08            DC      H'08'
00FD 1220 08            DC      H'08'
00FE 1221 3E            DC      H'3E'
00FF                *
0100 1222 3C            DC      H'3C'   TWO
0101 1223 06            DC      H'06'
0102 1224 02            DC      H'02'
0103 1225 04            DC      H'04'
0104 1226 18            DC      H'18'
0105 1227 30            DC      H'30'
0106 1228 3E            DC      H'3E'
0107                *
0108 1229 3E            DC      H'3E'   THREE
0109 122A 02            DC      H'02'
010A 122B 02            DC      H'02'
010B 122C 1C            DC      H'1C'
010C 122D 02            DC      H'02'
010D 122E 02            DC      H'02'
010E 122F 3E            DC      H'3E'
010F                *
0110 1230 24            DC      H'24'   FOUR
0111 1231 24            DC      H'24'
0112 1232 24            DC      H'24'
0113 1233 3E            DC      H'3E'
0114 1234 04            DC      H'04'
0115 1235 04            DC      H'04'
0116 1236 04            DC      H'04'
0117                *
0118 1237 3E            DC      H'3E'   FIVE
0119 1238 20            DC      H'20'
011A 1239 20            DC      H'20'
011B 123A 1E            DC      H'1E'
011C 123B 02            DC      H'02'
011D 123C 22            DC      H'22'
011E 123D 1E            DC      H'1E'
011F                *
0120 123E 1C            DC      H'1C'   SIX
0121 123F 20            DC      H'20'
0122 1240 20            DC      H'20'
0123 1241 3C            DC      H'3C'
0124 1242 22            DC      H'22'
```

```
0125 1243 22           DC      H'22'
0126 1244 1C           DC      H'1C'
0127            *
0128 1245 3E           DC      H'3E'      SEVEN
0129 1246 02           DC      H'02'
012A 1247 04           DC      H'04'
012B 1248 08           DC      H'08'
012C 1249 10           DC      H'10'
012D 124A 20           DC      H'20'
012E 124B 20           DC      H'20'
012F            *
0130 124C 1C           DC      H'1C'      EIGHT
0131 124D 22           DC      H'22'
0132 124E 22           DC      H'22'
0133 124F 1C           DC      H'1C'
0134 1250 22           DC      H'22'
0135 1251 22           DC      H'22'
0136 1252 1C           DC      H'1C'
0137            *
0138 1253 1C           DC      H'1C'      NINE
0139 1254 22           DC      H'22'
013A 1255 22           DC      H'22'
013B 1256 1E           DC      H'1E'
013C 1257 02           DC      H'02'
013D 1258 02           DC      H'02'
013E 1259 1C           DC      H'1C'
013F            *
0140           *INITIAL DISPLAY DATA*
0141           *********************
0142            *
0143 125A 20   DAT0    DC      DELX-RPL   DELTA-X + INTENSITY
0144 125B 41           DC      1+HI
0145 125C 41           DC      1+HI
0146 125D 41           DC      1+HI
0147 125E 41           DC      1+HI
0148 125F 41           DC      1+HI
0149 1260 41           DC      1+HI
014A 1261 D7           DC      H'97'+HI
014B 1262 D7           DC      H'97'+HI
014C 1263 42           DC      2+HI
014D 1264 42           DC      2+HI
014E 1265 42           DC      2+HI
014F 1266 C5           DC      5+COPY+HI
0150 1267 C5           DC      5+COPY+HI
0151            *
0152 1268 30           DC      DELY-RPL   DELTA-Y
0153 1269 06           DC      BH
0154 126A 20           DC      PH
0155 126B 20           DC      PH
0157 126D 3C           DC      NH
0158 126E 3C           DC      NH
0159 126F 04           DC      CBH
015A 1270 04           DC      CBH
015B 1271 07           DC      SCH
015C 1272 07           DC      SCH
015D 1273 20           DC      BBH
015E 1274 0C           DC      CRH
015F 1275 0C           DC      CRH
0160            *
0161 1276 40           DC      XV-RPL     X-VALUE
0162 1277 B4           DC      CRB-BW2
0163 1278 1E           DC      LPX-PW2
0164 1279 96           DC      RPX-PW2
0165 127A 5D           DC      NX-NW2
0166 127B 5D           DC      NX-NW2
0167 127C 5D           DC      NX-NW2
0168 127D 01           DC      H'01'
0169 127E 01           DC      H'01'
```

```
016A 127F 46           DC    LSX
016B 1280 66           DC    RSX
016C 1281 56           DC    CLB+CW2-BBW2
016D 1282 2F           DC    LCRX
016E 1283 66           DC    RCRX
016F              *
0170 1284 FD           DC    EVNF       EVEN FIELD OFFSET
0171 1285 3A           DC    EVNR-*-1
0172              *
0173 1286 00           DC    RPL-RPL              RPL -- ODD FIELD
0174 1287 DD           DC    BL.
0175 1288 E9           DC    LP10.
0176 1289 A9           DC    RP10.
0177 128A 69           DC    NL.
0178 128B 69           DC    NL.
0179 128C 69           DC    NL.
017A 128D E1           DC    CB.
017B 128E E1           DC    CB.
017C 128F 00           DC    LSCR.
017D 1290 0E           DC    RSCR.
017E 1291 E5           DC    LB10.
017F 1292 E5           DC    CR10.
0180 1293 E5           DC    CR10.
0181              *
0182 1294 10           DC    RPH-RPL              RPH + COLOR
0183 1295 F2           DC    BL:+RED+GRN+BLU
0184 1296 D2           DC    LP10:+RED+GRN
0185 1297 33           DC    RP10:+BLU
0186 1298 F4           DC    NL:+RED+GRN+BLU
0187 1299 F4           DC    NL:+RED+GRN+BLU
0188 129A F4           DC    NL:+RED+GRN+BLU
0189 129B F4           DC    CB:+RED+GRN+BLU
018A 129C F4           DC    CB:+RED+GRN+BLU
018B 129D 00           DC    LSCR:
018C 129E 2C           DC    RSCR:+BLU
018D 129F F4           DC    LB10:+RED+GRN+BLU
018E 12A0 D6           DC    CR10:+RED+GRN
0190              *
0191 12A2 FE           DC    STER       SHORT UPDATE TERMINATOR
0192              *
0193 12A3 50           DC    YVLA-RPL             Y-VALUE A
0194 12A4 26           DC    CUB-CBH-CRH
0195 12A5 26           DC    CUB-CBH-CRH
0196 12A6 32           DC    CUB-CBH
0197 12A7 EA           DC    CBB
0198 12A8 80           DC    CUB+CH2-PH2
0199 12A9 3A           DC    SY
019A 12AA FF           DC    H'FF'
019B 12AB 36           DC    CUB
019C 12AC 72           DC    CUB+NH
019D 12AD AE           DC    CUB+NH+NH
019F 12AF 80           DC    CUB+CH2-PH2
01A0 12B0 8D           DC    CUB+CH2-BH2
01A1              *
01A2 12B1 70           DC    YXA-RPL              X-ORDER A
01A3 12B2 0B           DC    11
01A4 12B3 0C           DC    12
01A5 12B4 06           DC    6
01A6 12B5 07           DC    7
01A7 12B6 01           DC    1
01A8 12B7 88           DC    8+H'80'
01A9 12B8 8A           DC    10+H'80'
01AA 12B9 03           DC    3
01AB 12BA 04           DC    4
01AC 12BB 05           DC    5
01AD 12BC 89           DC    9+H'80'
01AE 12BD 02           DC    2
01AF 12BE 00           DC    0
```

```
01B0           •
01B1 12BF FF          DC      LTER      LONG UPDATE TERMINATOR
01B2           •
01B3 12C0 00   EVNR   DC      RPL-RPL             RPL -- EVEN FIELD
01B4 12C1 DD          DC      BL.
01B5 12C2 09          DC      LP1E.
01B6 12C3 C9          DC      RP1E.
01B7 12C4 69          DC      NL.
01B8 12C5 69          DC      NL.
01B9 12C6 69          DC      NL.
01BA 12C7 E1          DC      CB.
01BB 12C8 E1          DC      CB.
01BC 12C9 00          DC      LSCR.
01BD 12CA 0E          DC      RSCR.
01BE 12CB 25          DC      LB1E.
01BF 12CC F1          DC      CR1E.
01C0 12CD F1          DC      CR1E.
01C1           •
01C2 12CE 10          DC      RPH-RPL             RPH + COLOR
01C3 12CF F2          DC      BL:+RED+GRN+BLU
01C4 12D0 D3          DC      LP1E:+RED+GRN
01C5 12D1 33          DC      RP1E:+BLU
01C6 12D2 F4          DC      NL:+RED+GRN+BLU
01C7 12D3 F4          DC      NL:+RED+GRN+BLU
01C8 12D4 F4          DC      NL:+RED+GRN+BLU
01C9 12D5 F4          DC      CB:+RED+GRN+BLU
01CA 12D6 F4          DC      CB:+RED+GRN+BLU
01CB 12D7 0C          DC      LSCR:
01CC 12D8 2C          DC      RSCR:+BLU
01CD 12D9 F5          DC      LB1E:+RED+GRN+BLU
01CE 12DA D6          DC      CR1E:+RED+GRN
01CF 12DB 36          DC      CR1E:+BLU
01D0           •
01D1 12DC FE          DC      STER      SHORT UPDATE TERMINATOR
01D2           •
01D3           •••••••••••••••••••••••••••••••••••••••••••••
01D4           •                                            •
01D5           •     ROM OBJECTS                            •
01D6           •                                            •
01D7           •••••••••••••••••••••••••••••••••••••••••••••
01D8           •
01D9           •BALL
01DA 12DD 60   BL     DC      H'60'               LEFT IMAGE
01DB 12DE F0          DC      H'F0'
01DC 12DF F0          DC      H'F0'
01DD 12E0 F0          DC      H'F0'
01DE 12E1 F0          DC      H'F0'
01DF 12E2 60          DC      H'60'
01E0           •      DC      BL+BL+BL+BL+BL+BL+BL+BL:
01E1           •      DC      BL+BL+BL+BL+BL+BL+BL+BL.
01E2           •      DC      BH
01E3           •
01E4 12E3 06   BR     DC      H'06'               RIGHT IMAGE
01E5 12E4 0F          DC      H'0F'
01E6 12E5 0F          DC      H'0F'
01E7 12E6 0F          DC      H'0F'
01E8 12E7 0F          DC      H'0F'
01E9 12E8 06          DC      H'06'
01EA           •      DC      BR+BR+BR+BR+BR+BR+BR+BR:
01EB           •      DC      BR+BR+BR+BR+BR+BR+BR+BR,
01EC           •      DC      BH
01ED           •
01EE           •LEFT PADDLE--IMAGE 1
01EF 12E9 1C 1C 1C LP1O  DC   5,H'1C'             ODD FIELD
     12EC 1C 1C
01F0 12EE 18          DC      H'18'
01F1 12EF 38          DC      H'38'
01F3 12F1 FE FE       DC      H'FEFE'
```

```
01F4 12F3 BA BA BA          DC      6,H'BA'
     12F6 BA BA BA
01F5 12F9 38                 DC      H'38'
01F6 12FA BA                 DC      H'BA'
01F7 12FB 3A                 DC      H'3A'
01F8 12FC 3F                 DC      H'3F'
01F9 12FD 2F 2F 2F           DC      4,H'2F'
     1300 2F
01FA 1301 28 28 28           DC      3,H'28'
01FB 1304 28 28              DC      H'2828'
01FC 1306 28                 DC      H'28'
01FD 1307 3C                 DC      H'3C'
01FE 1308 3C                 DC      H'3C'
01FF                *        DC      LP1E+LP1E+LP1E+LP1E+LP1E+LP1E+LP1E+LP1E;
0200                *        DC      LP1E+LP1E+LP1E+LP1E+LP1E+LP1E+LP1E+LP1E.
0201                *        DC      PH
0202                *
0203 1309 1C        LP1E     DC      H'1C'           EVEN FIELD
0204 130A 3E                 DC      H'3E'
0205 130B 1C 1C 1C           DC      3,H'1C'
0206 130E 18                 DC      H'18'
0207 130F 7C                 DC      H'7C'
0208 1310 7E                 DC      H'7E'
0209 1311 FE                 DC      H'FE'
020A 1312 FA                 DC      H'FA'
020B 1313 BA BA BA           DC      8,H'BA'
     1316 BA BA BA
     1319 BA BA
020C 131B 3A 3F              DC      H'3A3F'
020D 131D 2F 2F 2F           DC      3,H'2F'
020E 1320 28 28 28           DC      3,H'28'
020F 1323 28 28              DC      H'2828'
0210 1325 28 28              DC      H'2828'
0212                *        DC      LP1O+LP1O+LP1O+LP1O+LP1O+LP1O+LP1O+LP1O;
0213                *        DC      LP1O+LP1O+LP1O+LP1O+LP1O+LP1O+LP1O+LP1O.
0214                *        DC      PH
0215                *
0216                *LEFT PADDLE--IMAGE 2
0217 1329 1C E0     LP2O     DC      H'1CE0'         ODD FIELD
0218 132B 1C E0              DC      H'1CE0'
0219 132D 1C E0              DC      H'1CE0'
021A 132F 1C E0              DC      H'1CE0'
021B 1331 1C E0              DC      H'1CE0'
021C 1333 18 40              DC      H'1840'
021D 1335 38 40              DC      H'3840'
021E 1337 7C 40              DC      H'7C40'
021F 1339 FF C0              DC      2,H'FFC0'
0220 133B FF 00              DC      2,H'FF00'
0221 133D B8 00              DC      H'B800'
0222 133F B8 00              DC      H'B800'
0223 1341 B8 00              DC      H'B800'
0224 1343 B8 00              DC      H'B800'
0225 1345 B8 00              DC      H'B800'
0226 1347 B8 00              DC      H'B800'
0227 1349 38 00              DC      H'3800'
0228 134B B8 00              DC      H'B800'
0229 134D 3E 00              DC      H'3E00'
022A 134F 3E 00              DC      H'3E00'
022B 1351 22 00              DC      H'2200'
022C 1353 22 00              DC      H'2200'
022D 1355 22 00              DC      H'2200'
022E 1357 22 00              DC      H'2200'
022F 1359 22 00              DC      H'2200'
0230 135B 22 00              DC      H'2200'
0231 135D 22 00              DC      H'2200'
0232 135F E2 00              DC      H'E200'
0233 1361 E2 00              DC      H'E200'
0234 1363 82 00              DC      H'8200'
```

```
0235 1365 83 00           DC      H'8300'
0236 1367 03 00           DC      H'0300'
0237              •       DC      LP2E+LP2E+LP2E+LP2E+LP2E+LP2E+LP2E+LP2E:
0238              •       DC      LP2E+LP2E+LP2E+LP2E+LP2E+LP2E+LP2E+LP2E.
0239              •       DC      PH
023A 1369 1C E0   LP2E    DC,     H'1CE0'               EVEN FIELD
023B 136B 3E E0           DC      H'3EE0'
023C 136D 1C E0           DC      H'1CE0'
023D 136F 1C E0           DC      H'1CE0'
023E 1371 1C 40           DC      H'1C40'
023F 1373 18 40           DC      H'1840'
0240 1375 7C 40           DC      H'7C40'
0241 1377 7E 00           DC      H'7E00'
0242 1379 FF C0           DC      2,H'FFC0'
0243 137B FA 00           DC      H'FA00'
0244 137D B8 00           DC      H'B800'
0245 137F B8 00           DC      H'B800'
0246 1381 B8 00           DC      H'B800'
0247 1383 B8 00           DC      H'B800'
0248 1385 B8 00           DC      H'B800'
024A 1389 B8 00           DC      H'B800'
024B 138B BE 00           DC      H'BE00'
024C 138D 3E 00           DC      H'3E00'
024D 138F 3E 00           DC      H'3E00'
024E 1391 22 00           DC      H'2200'
024F 1393 22 00           DC      H'2200'
0250 1395 22 00           DC      H'2200'
0251 1397 22 00           DC      H'2200'
0252 1399 22 00           DC      H'2200'
0253 139B 22 00           DC      H'2200'
0254 139D E2 00           DC      H'E200'
0255 139F E2 00           DC      H'E200'
0256 13A1 82 00           DC      H'8200'
0257 13A3 82 00           DC      H'8200'
0258 13A5 03 00           DC      H'0300'
0259 13A7 03 00           DC      H'0300'
025A              •       DC      LP2D+LP2D+LP2D+LP2D+LP2D+LP2D+LP2D+LP2D:
025B              •       DC      LP2D+LP2D+LP2D+LP2D+LP2D+LP2D+LP2D+LP2D.
025D              •
025E              *RIGHT PADDLE--IMAGE 1
025F 13A9 38 38 38 RP1O   DC      5,H'38'               ODD FIELD
     13AC 38 38
0260 13AE 18              DC      H'18'
0261 13AF 1C              DC      H'1C'
0262 13B0 7E              DC      H'7E'
0263 13B1 7F 7F           DC      H'7F7F'
0264 13B3 5D 5D 5D        DC      6,H'5D'
     13B6 5D 5D 5D
0265 13B9 1C              DC      H'1C'
0266 13BA 5D              DC      H'5D'
0267 13BB 5C              DC      H'5C'
0268 13BC FC              DC      H'FC'
0269 13BD F4 F4 F4        DC      4,H'F4'
     13C0 F4
026A 13C1 14 14 14        DC      3,H'14'
026B 13C4 14 14           DC      H'1414'
026C 13C6 14              DC      H'14'
026D 13C7 3C              DC      H'3C'
026E 13C8 3C              DC      H'3C'
026F              •       DC      RP1E+RP1E+RP1E+RP1E+RP1E+RP1E+RP1E+RP1E:
0270              •       DC      RP1E+RP1E+RP1E+RP1E+RP1E+RP1E+RP1E+RP1E.
0271              •       DC      PH
0272              •
0273 13C9 38      RP1E    DC      H'38'                 EVEN FIELD
0274 13CA 7C              DC      H'7C'
0275 13CB 38 38 38        DC      3,H'38'
0276 13CE 18              DC      H'18'
0277 13CF 3E              DC      H'3E'
```

```
0278 13D0 7E              DC      H'7E'
0279 13D1 7F              DC      H'7F'
027A 13D2 5F              DC      H'5F'
027B 13D3 5D 5D 5D        DC      8,H'5D'
     13D6 5D 5D 5D
     13D9 5D 5D
027C 13DB 5C FC           DC      H'5CFC'
027D 13DD F4 F4 F4        DC      3,H'F4'
027E 13E0 14 14 14        DC      3,H'14'
027F 13E3 14 14           DC      H'1414'
0280 13E5 14 14           DC      H'1414'
0281 13E7 3C 3C           DC      H'3C3C'
0282                *     DC      RP10+RP10+RP10+RP10+RP10+RP10+RP10+RP10;
0283                *     DC      RP10+RP10+RP10+RP10+RP10+RP10+RP10+RP10.
0284                *     DC      PH
0285                *
0286                *RIGHT PADDLE--IMAGE 2
0287 13E9 07 38     RP2O  DC      H'0738'         ODD FIELD
0288 13EB 07 38           DC      H'0738'
0289 13ED 07 38           DC      H'0738'
028A 13EF 07 38           DC      H'0738'
028B 13F1 07 38           DC      H'0738'
028C 13F3 02 18           DC      H'0218'
028D 13F5 02 1C           DC      H'021C'
028E 13F7 02 3E           DC      H'023E'
028F 13F9 03 FF           DC      H'03FF'
0290 13FB 00 FF           DC      2,H'00FF'
0291 13FD 00 1D           DC      2,H'001D'
0292 13FF 00 1D           DC      2,H'001D'
0293 1401 00 1D           DC      2,H'001D'
0294 1403 00 1D           DC      2,H'001D'
0295 1405 00 1D           DC      2,H'001D'
0296 1407 00 1D           DC      2,H'001D'
0297 1409 00 1C           DC      2,H'001C'
0298 140B 00 1D           DC      2,H'001D'
0299 140D 00 7C           DC      2,H'007C'
029A 140F 00 7C           DC      2,H'007C'
029B 1411 00 44           DC      2,H'0044'
029C 1413 00 44           DC      2,H'0044'
029D 1415 00 44           DC      2,H'0044'
029E 1417 00 44           DC      2,H'0044'
029F 1419 00 44           DC      2,H'0044'
02A0 141B 00 44           DC      2,H'0044'
02A1 141D 00 44           DC      2,H'0044'
02A2 141F 00 47           DC      2,H'0047'
02A3 1421 00 47           DC      2,H'0047'
02A4 1423 00 41           DC      2,H'0041'
02A5 1425 00 C1           DC      2,H'00C1'
02A6 1427 00 C0           DC      2,H'00C0'
02A7                *     DC      RP2E+RP2E+RP2E+RP2E+RP2E+RP2E+RP2E+RP2E;
02A8                *     DC      RP2E+RP2E+RP2E+RP2E+RP2E+RP2E+RP2E+RP2E.
02A9                *     DC      PH
02AA 1429 07 38     RP2E  DC      H'0738'         EVEN FIELD
02AB 142B 07 7C           DC      H'077C'
02AC 142D 07 38           DC      H'0738'
02AD 142F 07 38           DC      H'0738'
02AE 1431 02 38           DC      H'0238'
02AF 1433 02 18           DC      H'0218'
02B0 1435 02 3E           DC      H'023E'
02B1 1437 00 7E           DC      2,H'007E'
02B2 1439 03 FF           DC      H'3FF'
02B3 143B 00 5F           DC      2,H'005F'
02B4 143D 00 1D           DC      2,H'001D'
02B5 143F 00 1D           DC      2,H'001D'
02B6 1441 00 1D           DC      2,H'001D'
02B7 1443 00 1D           DC      2,H'001D'
02B8 1445 00 1D           DC      2,H'001D'
02B9 1447 00 1D           DC      2,H'001D'
```

```
02BA 1449 00 1D              DC      2,H'001D'
02BB 144B 00 7D              DC      2,H'007D'
02BC 144D 00 7C              DC      2,H'007C'
02BD 144F 00 7C              DC      2,H'007C'
02BE 1451 00 44              DC      2,H'0044'
02BF 1453 00 44              DC      2,H'0044'
02C0 1455 00 44              DC      2,H'0044'
02C2 1459 00 44              DC      2,H'0044'
02C3 145B 00 44              DC      2,H'0044'
02C4 145D 00 47              DC      2,H'0047'
02C5 145F 00 47              DC      2,H'0047'
02C6 1461 00 41              DC      2,H'0041'
02C7 1463 00 41              DC      2,H'0041'
02C8 1465 00 C0              DC      2,H'00C0'
02C9 1467 00 C0              DC      2,H'00C0'
02CA                    *    DC      RP20+RP20+RP20+RP20+RP20+RP20+RP20+RP20:
02CB                    *    DC      RP20+RP20+RP20+RP20+RP20+RP20+RP20+RP20.
02CC                    *    DC      PH
02CD                    *
02CE                    *NET
02CF 1469 C0 C0 C0  NL  DC      NH,H'C0'          LEFT IMAGE
     146C C0 C0 C0
     146F C0 C0 C0
     1472 C0 C0 C0
     1475 C0 C0 C0
     1478 C0 C0 C0
     147B C0 C0 C0
     147E C0 C0 C0
     1481 C0 C0 C0
     1484 C0 C0 C0
     1487 C0 C0 C0
     148A C0 C0 C0
     148D C0 C0 C0
     1490 C0 C0 C0
     1493 C0 C0 C0
     1496 C0 C0 C0
     1499 C0 C0 C0
     149C C0 C0 C0
     149F C0 C0 C0
     14A2 C0 C0 C0
02D0                    *    DC      NL+NL+NL+NL+NL+NL+NL+NL:
02D1                    *    DC      NL+NL+NL+NL+NL+NL+NL+NL.
02D2                    *    DC      NH
02D3                    *
DC       NH,H'03'       RIGHT IMAGE
     14A8 03 03 03
     14AB 03 03 03
     14AE 03 03 03
     14B1 03 03 03
     14B4 03 03 03
     14B7 03 03 03
     14BA 03 03 03
     14BD 03 03 03
     14C0 03 03 03
     14C3 03 03 03
     14C6 03 03 03
     14C9 03 03 03
     14CC 03 03 03
     14CF 03 03 03
     14D2 03 03 03
     14D5 03 03 03
     14D8 03 03 03
     14DB 03 03 03
     14DE 03 03 03
02D5                    *    DC      NR+NR+NR+NR+NR+NR+NR+NR:
02D6                    *    DC      NR+NR+NR+NR+NR+NR+NR+NR.
02D7                    *    DC      NH
02D8                    *
```

```
02D9                    *COURT BOUNDARIES
02DA  14E1 FF FF FF CB      DC    CBH,H'FF'
      14E4 FF
02DB                    *         DC    CB+CB+CB+CB+CB+CB+CB+CB:
02DC                    *         DC    CB+CB+CB+CB+CB+CB+CB+CB.
02DD                    *         DC    CBH
02DE                    *
02DF                    *LEFT BALL BOY--IMAGE 1
02E0  14E5 0E 00       LB1O  DC    H'0E00'           ODD FIELD
02E1  14E7 0E 00             DC    H'0E00'
02E2  14E9 0E 00             DC    H'0E00'
02E3  14EB 0E 00             DC    H'0E00'
02E4  14ED 0E 00             DC    H'0E00'
02E5  14EF 06 00             DC    H'0600'
02E6  14F1 07 00             DC    H'0700'
02E7  14F3 0F C0             DC    H'0FC0'
02E8  14F5 0F C0             DC    H'0FC0'
02E9  14F7 1F 40             DC    H'1F40'
02EA  14F9 37 40             DC    H'3740'
02EB  14FB E7 40             DC    H'E740'
02EC  14FD 07 C0             DC    H'07C0'
02ED  14FF 07 00             DC    H'0700'
02EE  1501 07 00             DC    H'0700'
02EF  1503 07 00             DC    H'0700'
02F0  1505 07 00             DC    H'0700'
02F1  1507 07 00             DC    H'0700'
02F2  1509 07 00             DC    H'0700'
02F3  150B 07 00             DC    H'0700'
02F4  150D 05 00             DC    H'0500'
02F5  150F 05 00             DC    H'0500'
02F6  1511 05 00             DC    H'0500'
02F7  1513 05 00             DC    H'0500'
02F8  1515 05 00             DC    H'0500'
02F9  1517 05 00             DC    H'0500'
02FA  1519 05 00             DC    H'0500'
02FB  151B 05 00             DC    H'0500'
02FC  151D 05 00             DC    H'0500'
02FD  151F 05 00             DC    H'0500'
02FE  1521 0F 00             DC    H'0F00'
02FF  1523 0F 00             DC    H'0F00'
0300                    *         DC    LB1E+LB1E+LB1E+LB1E+LB1E+LB1E+LB1E+LB1E:
0301                    *         DC    LB1E+LB1E+LB1E+LB1E+LB1E+LB1E+LB1E+LB1E.
0302                    *         DC    BBH
0303                    *
0304  1525 0E 00       LB1E  DC    H'0E00'           EVEN FIELD
0305  1527 0E 00             DC    H'0E00'
0306  1529 0E 00             DC    H'0E00'
0307  152B 0E 00             DC    H'0E00'
0308  152D 0E 00             DC    H'0E00'
0309  152F 06 00             DC    H'0600'
030A  1531 0F C0             DC    H'0FC0'
030B  1533 0F C0             DC    H'0FC0'
030C  1535 0F C0             DC    H'0FC0'
030D  1537 17 40             DC    H'1740'
030E  1539 F7 40             DC    H'F740'
030F  153B 27 C0             DC    H'27C0'
0310  153D 07 C0             DC    H'07C0'
0311  153F 07 00             DC    H'0700'
0312  1541 07 00             DC    H'0700'
0313  1543 07 00             DC    H'0700'
0314  1545 07 00             DC    H'0700'
0315  1547 07 00             DC    H'0700'
0316  1549 07 00             DC    H'0700'
0317  154B 07 00             DC    H'0700'
0318  154D 05 00             DC    H'0500'
0319  154F 05 00             DC    H'0500'
```

```
031A 1551 05 00           DC    H'0500'
031B 1553 05 00           DC    H'0500'
031C 1555 05 00           DC    H'0500'
031D 1557 05 00           DC    H'0500'
031E 1559 05 00           DC    H'0500'
031F 155B 05 00           DC    H'0500'
0320 155D 05 00           DC    H'0500'
0321 155F 05 00           DC    H'0500'
0322 1561 0F 00           DC    H'0F00'
0323 1563 0F 00           DC    H'0F00'
0324              *       DC    LB10+LB10+LB10+LB10+LB10+LB10+LB10+LB10:
0325              *       DC    LB10+LB10+LB10+LB10+LB10+LB10+LB10+LB10.
0326              *       DC    BBH
0327              *
0328              *LEFT BALL BOY--IMAGE 2
0329 1565 0E 00   LB20    DC    H'0E00'        ODD FIELD
032A 1567 0E 00           DC    H'0E00'
032B 1569 0E 00           DC    H'0E00'
032C 156B 0E 00           DC    H'0E00'
032D 156D 0E 00           DC    H'0E00'
032E 156F 06 00           DC    H'0600'
032F 1571 07 00           DC    H'0700'
0330 1573 0F 80           DC    H'0F80'
0331 1575 0F C0           DC    H'0FC0'
0332 1577 1F C0           DC    H'1FC0'
0333 1579 37 40           DC    H'3740'
0334 157B E7 40           DC    H'E740'
0335 157D 07 40           DC    H'0740'
0336 157F 07 40           DC    H'0740'
0337 1581 07 40           DC    H'0740'
0338 1583 07 40           DC    H'0740'
0339 1585 07 40           DC    H'0740'
033A 1587 07 40           DC    H'0740'
033B 1589 1F 40           DC    H'1F40'
033C 158B 1F 40           DC    H'1F40'
033E 158F 12 00           DC    H'1200'
033F 1591 12 00           DC    H'1200'
0340 1593 12 00           DC    H'1200'
0341 1595 12 00           DC    H'1200'
0342 1597 12 00           DC    H'1200'
0343 1599 12 00           DC    H'1200'
0344 159B 13 C0           DC    H'13C0'
0345 159D 13 C0           DC    H'13C0'
0346 159F 10 40           DC    H'1040'
0347 15A1 30 40           DC    H'3040'
0348 15A3 30 00           DC    H'3000'
0349              *       DC    LB2E+LB2E+LB2E+LB2E+LB2E+LB2E+LB2E+LB2E:
034A              *       DC    LB2E+LB2E+LB2E+LB2E+LB2E+LB2E+LB2E+LB2E.
034B              *       DC    BBH
034C              *
034D 15A5 0E 00   LB2E    DC    H'0F00'        EVEN FIELD
034E 15A7 0E 00           DC    H'0E00'
034F 15A9 0E 00           DC    H'0E00'
0350 15AB 0E 00           DC    H'0E00'
0351 15AD 0E 00           DC    H'0E00'
0352 15AF 06 00           DC    H'0600'
0353 15B1 0F 80           DC    H'0F80'
0354 15B3 0F C0           DC    H'0FC0'
0355 15B5 1F C0           DC    H'1FC0'
0356 15B7 17 40           DC    H'1740'
0357 15B9 F7 40           DC    H'F740'
0358 15BB 27 40           DC    H'2740'
0359 15BD 07 40           DC    H'0740'
035A 15BF 07 40           DC    H'0740'
035B 15C1 07 40           DC    H'0740'
035C 15C3 07 40           DC    H'0740'
035D 15C5 07 40           DC    H'0740'
```

```
035E  15C7  1F 40            DC      H'1F40'
035F  15C9  1F 40            DC      H'1F40'
0360  15CB  1F 40            DC      H'1F40'
0361  15CD  12 00            DC      H'1200'
0362  15CF  12 00            DC      H'1200'
0363  15D1  12 00            DC      H'1200'
0364  15D3  12 00            DC      H'1200'
0365  15D5  12 00            DC      H'1200'
0366  15D7  12 00            DC      H'1200'
0367  15D9  13 C0            DC      H'13C0'
0368  15DB  13 C0            DC      H'13C0'
0369  15DD  10 40            DC      H'1040'
036A  15DF  10 40            DC      H'1040'
036B  15E1  30 00            DC      H'3000'
036C  15E3  30 00            DC      H'3000'
036D                 *       DC      LB2O+LB2O+LB2O+LB2O+LB2O+LB2O+LB2O:
036E                 *       DC      LB2O+LB2O+LB2O+LB2O+LB2O+LB2O+LB2O.
036F                 *       DC      BBH
0370                 *
0371                 *RIGHT BALL BOY--IMAGE 1
0372  15E5  00 70    RB1O    DC      2,H'0070'         ODD FIELD
0373  15E7  00 70            DC      2,H'0070'
0374  15E9  00 70            DC      2,H'0070'
0375  15EB  00 70            DC      2,H'0070'
0376  15ED  00 70            DC      2,H'0070'
0377  15EF  00 60            DC      2,H'0060'
0378  15F1  00 E0            DC      2,H'00E0'
0379  15F3  03 F0            DC      H'03F0'
037A  15F5  03 F0            DC      H'03F0'
037B  15F7  02 F8            DC      H'02F8'
037C  15F9  02 EC            DC      H'02EC'
037D  15FB  02 E7            DC      H'02E7'
037E  15FD  03 E0            DC      H'03E0'
037F  15FF  00 E0            DC      2,H'00E0'
0380  1601  00 E0            DC      2,H'00E0'
0381  1603  00 E0            DC      2,H'00E0'
0382  1605  00 E0            DC      2,H'00E0'
0383  1607  00 E0            DC      2,H'00E0'
0384  1609  00 E0            DC      2,H'00E0'
0385  160B  00 E0            DC      2,H'00E0'
0386  160D  00 A0            DC      2,H'00A0'
0387  160F  00 A0            DC      2,H'00A0'
0388  1611  00 A0            DC      2,H'00A0'
0389  1613  00 A0            DC      2,H'00A0'
038A  1615  00 A0            DC      2,H'00A0'
038B  1617  00 A0            DC      2,H'00A0'
038C  1619  00 A0            DC      2,H'00A0'
038D  161B  00 A0            DC      2,H'00A0'
038E  161D  00 A0            DC      2,H'00A0'
038F  161F  00 A0            DC      2,H'00A0'
0390  1621  00 F0            DC      2,H'00F0'
0391  1623  00 F0            DC      2,H'00F0'
0392                 *       DC      RB1E+RB1E+RB1E+RB1E+RB1E+RB1E+RB1E+RB1E:
0393                 *       DC      RB1E+RB1E+RB1E+RB1E+RB1E+RB1E+RB1E+RB1E.
0394                 *       DC      BBH
0395                 *
0396  1625  00 70    RB1E    DC      2,H'0070'         EVEN FIELD
0397  1627  00 70            DC      2,H'0070'
0398  1629  00 70            DC      2,H'0070'
0399  162B  00 70            DC      2,H'0070'
039A  162D  00 70            DC      2,H'0070'
039B  162F  00 60            DC      2,H'0060'
039C  1631  03 F0            DC      H'03F0'
039D  1633  03 F0            DC      H'03F0'
039E  1635  03 F0            DC      H'03F0'
039F  1637  02 E8            DC      H'02E8'
03A0  1639  02 EF            DC      H'02EF'
```

```
03A1 163B 03 E4         DC      H'03E4'
03A2 163D 03 E0         DC      H'03E0'
03A3 163F 00 E0         DC      2,H'00E0'
03A4 1641 00 E0         DC      2,H'00E0'
03A5 1643 00 E0         DC      2,H'00E0'
03A6 1645 00 E0         DC      2,H'00E0'
03A7 1647 00 E0         DC      2,H'00E0'
03A8 1649 00 E0         DC      2,H'00E0'
03A9 164B 00 E0         DC      2,H'00E0'
03AA 164D 00 A0         DC      2,H'00A0'
03AB 164F 00 A0         DC      2,H'00A0'
03AC 1651 00 A0         DC      2,H'00A0'
03AD 1653 00 A0         DC      2,H'00A0'
03AE 1655 00 A0         DC      2,H'00A0'
03AF 1657 00 A0         DC      2,H'00A0'
03B0 1659 00 A0         DC      2,H'00A0'
03B1 165B 00 A0         DC      2,H'00A0'
03B2 165D 00 A0         DC      2,H'00A0'
03B3 165F 00 A0         DC      2,H'00A0'
03B4 1661 00 F0         DC      2,H'00F0'
03B5 1663 00 F0         DC      2,H'00F0'
03B6              *     DC      RB10+RB10+RB10+RB10+RB10+RB10+RB10+RB10:
03B7              *     DC      RB10+RB10+RB10+RB10+RB10+RB10+RB10+RB10.
03B8                    DC      BBH
03B9              *
03BA              *RIGHT BALL BOY--IMAGE 2
03BB 1665 00 70   RB2D  DC      2,H'0070'       ODD FIELD
03BC 1667 00 70         DC      2,H'0070'
03BD 1669 00 70         DC      2,H'0070'
03BE 166B 00 70         DC      2,H'0070'
03BF 166D 00 70         DC      2,H'0070'
03C0 166F 00 60         DC      2,H'0060'
03C1 1671 00 E0         DC      2,H'00E0'
03C2 1673 01 F0         DC      H'01F0'
03C3 1675 03 F0         DC      H'03F0'
03C4 1677 03 F8         DC      H'03F8'
03C5 1679 02 EC         DC      H'02EC'
03C6 167B 02 E7         DC      H'02E7'
03C7 167D 02 E0         DC      H'02E0'
03C8 167F 02 E0         DC      H'02E0'
03C9 1681 02 E0         DC      H'02E0'
03CA 1683 02 E0         DC      H'02E0'
03CB 1685 02 E0         DC      H'02E0'
03CC 1687 02 E0         DC      H'02E0'
03CD 1689 02 F8         DC      H'02F8'
03CE 168B 02 F8         DC      H'02F8'
03CF 168D 00 48         DC      2,H'0048'
03D0 168F 00 48         DC      2,H'0048'
03D1 1691 00 48         DC      2,H'0048'
03D2 1693 00 48         DC      2,H'0048'
03D3 1695 00 48         DC      2,H'0048'
03D4 1697 00 48         DC      2,H'0048'
03D5 1699 00 48         DC      2,H'0048'
03D6 169B 03 C8         DC      H'03C8'
03D7 169D 03 C8         DC      H'03C8'
03D8 169F 02 08         DC      H'0208'
03D9 16A1 02 0C         DC      H'020C'
03DA 16A3 00 0C         DC      2,H'000C'
03DB              *     DC      RB2E+RB2E+RB2E+RB2E+RB2E+RB2E+RB2E+RB2E:
03DC              *     DC      RB2E+RB2E+RB2E+RB2E+RB2E+RB2E+RB2E+RB2E.
03DD                    DC      BBH
03DE              *
03DF 16A5 00 70   RB2E  DC      2,H'0070'       EVEN FIELD
03E0 16A7 00 70         DC      2,H'0070'
03E1 16A9 00 70         DC      2,H'0070'
03E2 16AB 00 70         DC      2,H'0070'
03E3 16AD 00 70         DC      2,H'0070'
```

```
03E4  16AF 00 60              DC     2,H'0060'
03E5  16B1 01 F0              DC     H'01F0'
03E6  16B3 03 F0              DC     H'03F0'
03E7  16B5 03 F8              DC     H'03F8'
03E8  16B7 02 E8              DC     H'02E8'
03E9  16B9 02 EF              DC     H'02EF'
03EA  16BB 02 E4              DC     H'02E4'
03EB  16BD 02 E0              DC     H'02E0'
03EC  16BF 02 E0              DC     H'02E0'
03ED  16C1 02 E0              DC     H'02E0'
03EE  16C3 02 E0              DC     H'02E0'
03EF  16C5 02 E0              DC     H'02E0'
03F0  16C7 02 F8              DC     H'02F8'
03F1  16C9 02 F8              DC     H'02F8'
03F2  16CB 02 F8              DC     H'02F8'
03F3  16CD 00 48              DC     2,H'0048'
03F4  16CF 00 48              DC     2,H'0048'
03F5  16D1 00 48              DC     2,H'0048'
03F6  16D3 00 48              DC     2,H'0048'
03F7  16D5 00 48              DC     2,H'0048'
03F8  16D7 00 48              DC     2,H'0048'
03F9  16D9 03 C8              DC     H'03C8'
03FA  16DB 03 C8              DC     H'03C8'
03FB  16DD 02 08              DC     H'0208'
03FC  16DF 02 08              DC     H'0208'
03FD  16E1 00 0C              DC     2,H'000C'
03FE  16E3 00 0C              DC     2,H'000C'
03FF                 •        DC     RB20+RB20+RB20+RB20+RB20+RB20+RB20+RB20:
0400                 •        DC     RB20+RB20+RB0+RB20+RB20+RB20+RB20+RB20.
0401                 •        DC     BBH
0402                 •
0403         *CROWD--IMAGE 1
0404  16E5 38 38     CR10     DC     H'3838'              ODD FIELD
0405  16E7 FE                 DC     H'FE'
0406  16E8 38                 DC     H'38'
0407  16E9 28                 DC     H'28'
0408  16EA 78                 DC     H'78'
0409  16EB 38                 DC     H'38'
040A  16EC 18                 DC     H'18'
040B  16ED 38                 DC     H'38'
040C  16EE 18                 DC     H'18'
040D  16EF 7E 7E              DC     H'7E7E'
040E                 •        DC     CR1E+CR1E+CR1E+CR1E+CR1E+CR1E+CR1E+CR1E:
040F                 •        DC     CR1E+CR1E+CR1E+CR1E+CR1E+CR1E+CR1E+CR1E.
0410                 •        DC     CRH
0411                 •
0412  16F1 38 38     CR1E     DC     H'3838'              EVEN FIELD
0413  16F3 FE                 DC     H'FE'
0414  16F4 38 38              DC     H'3838'
0415  16F6 78                 DC     H'78'
0416  16F7 38 38 38           DC     3,H'38'
0417  16FA 18                 DC     H'18'
0418  16FB 7E 7E              DC     H'7E7E'
0419                 •        DC     CR10+CR10+CR10+CR10+CR10+CR10+CR10+CR10:
041A                 •        DC     CR10+CR10+CR10+CR10+CR10+CR10+CR10+CR10.
041B                 •        DC     CRH
041C                 •
041D         *CROWD--IMAGE 2
041E  16FD 1C 1C     CR20     DC     H'1C1C'              ODD FIELD
041F  16FF 7F                 DC     H'7F'
0420  1700 1C                 DC     H'1C'
0421  1701 14                 DC     H'14'
0422  1702 1E                 DC     H'1E'
0423  1703 1C                 DC     H'1C'
0424  1704 18                 DC     H'18'
0425  1705 1C                 DC     H'1C'
0426  1706 18                 DC     H'18'
0427  1707 7E 7E              DC     H'7E7E'
```

```
0428                    •       DC      CR2E+CR2E+CR2E+CR2E+CR2E+CR2E+CR2E+CR2E:
0429                    •       DC      CR2E+CR2E+CR2E+CR2E+CR2E+CR2E+CR2E+CR2E.
042A                    •       DC      CRH
042B                    •
042C  1709 1C 1C  CR2E  DC      H'1C5C'                     EVEN FIELD
042E  170C 1C 1C        DC      H'1C1C'
042F  170E 1E           DC      H'1E'
0430  170F 1C 1C 1C     DC      3,H'1C'
0431  1712 18           DC      H'18'
0432  1713 7E 7E        DC      H'7E7E'
0433                    •       DC      CR20+CR20+CR20+CR20+CR20+CR20+CR20+CR20
0434                    •       DC      CR20+CR20+CR20+CR20+CR20+CR20+CR20+CR20
0435                    •       DC      CRH
0436                    •
0437                    •
0438                    •••••••••••••••••••••••••••••••••••••••••
0439                    •                                       •
043A                    •       MAIN PROGRAM                    •
043B                    •                                       •
043C                    •••••••••••••••••••••••••••••••••••••••••
043D
043E                    •INITIALIZE•
043F                    ••••••••••••
0440                            ORG     BASE
0441                    •
0442                    •CLEAR I/O SYSTEM
0443  1800 70                   CLR
0444  1801 B6                   OUTS    OPSU
0445  1802 BE                   OUTS    OSMI
0446  1803 B1                   OUTS    1           DISABLE JOYSTICKS
0447  1804 1A                   DI                  DISABLE CPU INTERRUPTS
0448                    •
0449                    •INITIALIZE SCRATCH PAD VARIABLES
044A  1805 62                   LISU    2
044B  1806 69                   LISL    1
044D  1808 5D                   LR      PSTA+1,A         PSTA = BBHY
044E                    •
044F  1809 20 B4                LI      CRB-BW2
0450  180B 51                   LR      X,A              X <= CRB-BW/2
0451  180C 20 90                LI      CUB+CH2
0452  180E 5D                   LR      LPY+1,A          LPY = CUB+CH/2
0453  180F 5D                   LR      RPY+1,A          RPY = CUB+CH/2
0454                    •
0455  1810 70                   CLR
0456  1811 5C                   LR      PST1,A           PST1 <= 0
0457  1812 6E                   LISL    6
0458  1813 20 3C                LI      60
0459  1815 5C                   LR      BBK1,A           BBK1 <= 60
045A                    •
045B  1816 65                   LISU    5
045C  1817 68                   LISL    0
045D  1818 70                   CLR
045E  1819 5D                   LR      LSCD+1,A         LSCD <= 0
045F  181A 5D                   LR      RSCD+1,A         RSCD <= 0
0460  181B 5D                   LR      BVX+1,A          BVX <= 0
0461  181C 20 56                LI      CLB+CW2-BBW2
0462  181E 5D                   LR      BBX+1,A          BBX <= CLB+CW/2+BBW/2
0463  181F 70                   CLR
0464  1820 5D                   LR      BVY+1,A          BVY <= 0
0465  1821 18                   COM
0466  1822 5D                   LR      BBY+1,A          BBY <= H'FF'
0467  1823 66                   LISU    6
0468  1824 68                   LISL    0
0469  1825 70                   CLR
046A  1826 5C                   LR      SNDP,A           SNDP <= 0
046B                    •
046C  1827 20 18                LI      PXLS
046D  1829 0B                   LR      IS,A
```

```
046E  182A 7C                LIS     12
046F  182B 5D                LR      XLST+1,A        BALL
0470  182C 74                LIS     4
0471  182D 5D                LR      XLST+1,A        LEFT PADDLE
0472  182E 7B                LIS     11
0473  182F 5D                LR      XLST+1,A        RIGHT PADDLE
0474  1830 77                LIS     7
0475  1831 5D                LR      XLST+1,A        NET
0476  1832 78                LIS     8
0477  1833 5D                LR      XLST+1,A        NET
0478  1834 79                LIS     9
0479  1835 5D                LR      XLST+1,A        NET
047A  1836 72                LIS     2
047B  1837 5D                LR      XLST+1,A        UPPER BOUNDARY
047C  1838 73                LIS     3
047D  1839 5D                LR      XLST+1,A        LOWER BOUNDARY
047E  183A 64                LISU    4
047F  183B 75                LIS     5
0480  183C 5D                LR      XLST+1,A        LEFT SCORE
0481  183D 7A                LIS     10
0482  183E 5D                LR      XLST+1,A        RIGHT SCORE
0483  183F 76                LIS     6
0484  1840 5D                LR      XLST+1,A        BALL BOY
0485  1841 70                LIS     0
0486  1842 5D                LR      XLST+1,A        LEFT CROWD
0487  1843 71                LIS     1
0488  1844 5D                LR      XLST+1,A        RIGHT CROWD
0489              *
048A              *ZERO UM-1 WRITE ONLY REGISTERS
048B  1845 2A 08 F0           DCI     YINT
048C  1848 77                LIS     COM-YINT
048D  1849 5A                LR      TEMP,A
048E  184A 28 1D DA           PI      ZERO
048F              *
0490              *CLEAR UM-1 READ/WRITE REGISTERS
0491  184D 2A 08 00           DCI     RPL
0492  1850 20 90              LI      H'90'
0493  1852 5A                LR      TEMP,A
0494  1853 28 1D CA           PI      CLER
0495              *
0496              *MOVE INITIAL UPDATE DATA INTO RAM
0497  1856 2A 0C 1C           DCI     DATU
0498  1859 2C                XDC
0499  185A 2A 12 5A           DCI     DAT0
049A  185D 20 83              LI      NOBJ+NOBJ+NOBJ+NOBJ+NOBJ+NOBJ
049B  185F 5A                LR      TEMP,A
049C  1860 28 1D D1           PI      MOVE
049D              *
049E              *LOAD UM-1 READ/WRITE REGISTERS & DISPLAY
049F              *
04A0  1863 2A 12 5A           DCI     DAT0    INITIALIZE UM-1 REGISTERS
04A1  1866 28 1E 50           PI      UPDT
04A2  1869 70                CLR
04A3  186A 5A                LR      TEMP,A  SYNC ON LINE 0
04A4  186B 28 1D E0           PI      SYNC
04A5  186E 20 44              LI      SELA+ENB
04A6  1870 2A 08 F7           DCI     COM     SELECT LIST A AND
04A8              *
04A9  1874 62                LISU    2
04AA  1875 68                LISL    0
04AB  1876 5D                LR      PCOM+1,A        SET PROGRAM COPY OF COM
04AC              *

04AE              *******
04AF              *
04B0  1877 62       SE0       LISU    2
04B1  1878 69                LISL    1
04B2  1879 70                CLR
```

```
04B3  187A EC              XS    PSTA
04B4  187B 91 79           BM    SE01         IF MODE = SERVE [
04B5                 *
04B6  187D 41              LR    A,X
04B7  187E 25 08           CI    CLB+BW2
04B8  1880 84 05           BZ    SE1          IF X=CLB+BW2
04B9  1882 25 B4           CI    CRB-BW2
04BA  1884 94 72           BNZ   SE2          OR X=CRB-BW2 [
04BB  1886 6E       SE1    LISL  6
04BC  1887 62              LISU  2
04BD  1888 3C              DS    BBK1         BBK1 <= BBK1-1
04BE  1889 84 2D           BZ    SE1A         IF BBK1.NE.0 [
04BF                 *
04C0                 *BUILD SCORE OBJECTS
04C1  188B 65       BSCO   LISU  5
04C2  188C 68              LISL  0
04C3  188D 4C              LR    A,LSCD
04C4  188E 14              SR    4
04C5  188F 5A              LR    TEMP,A
04C6  1890 2A 0C 00        DCI   LSCR
04C7  1893 28 1E 96        PI    MOVD         CALL MOVD(LSCD/16,LSCR)
04C8  1896 4C              LR    A,LSCD
04C9  1897 15              SL    4
04CA  1898 14              SR    4
04CB  1899 5A              LR    TEMP,A
04CC  189A 2A 0C 01        DCI   LSCR+1
04CD  189D 28 1E 96        PI    MOVD         CALL MOVD(LSCD.MOD.16,LSCR+1
04CE  18A0 69              LISL  1
04CF  18A1 4C              LR    A,RSCD
04D0  18A2 14              SR    4
04D1  18A3 5A              LR    TEMP,A
04D2  18A4 2A 0C 0E        DCI   RSCR
04D3  18A7 28 1E 96        PI    MOVD         CALL MOVD(RSCD/16,RSCR)
04D4  18AA 4C              LR    A,RSCD
04D5  18AB 15              SL    4
04D6  18AC 14              SR    4
04D8  18AE 2A 0C 0F        DCI   RSCR+1
04D9  18B1 28 1E 96        PI    MOVD         CALL MOVD(RSCR.MOD.16,RSCR+1
04DA  18B4 29 19 96        JMP   MP0               GOTO MP0]
04DB  18B7 71       SE1A   LIS   1
04DC  18B8 5C              LR    BBK1,A       BBK1 <= 1
04DD  18B9 69              LISL  1
04DE  18BA 4C              LR    A,PSTA
04DF  18BB 13              SL    1
04E0  18BC 20 55           LI    NX-NW2-8
04E1  18BE 81 03           BP    *+4
04E2  18C0 20 67           LI    NX+NW2+8
04E3  18C2 65              LISU  5
04E4  18C3 6B              LISL  3
04E5  18C4 5C              LR    BBX,A
04E6  18C5 20 CA    SE1B   LI    CBB-BBH
04E7  18C7 6D              LISL  5
04E8  18C8 5C              LR    BBY,A        BBY <= CBB-BBH
04E9  18C9 20 F9           LI    BYHN-BBIM
04EA  18CB 62              LISU  2
04EB  18CC 69              LISL  1
04EC  18CD FC              NS    PSTA
04ED  18CE 5D              LR    PSTA+1,A     PSTA <= PSTA-BBYH-BBI
04EF  18D0 71              LIS   BBVX         BVX <= BBVX
04EF  18D1 65              LISU  5
04F1  18D2 91 03           BM    SE1C         IF NXTS=L [
04F2  18D4 20 FF           LI    -BBVX           BVX<=-BBVX
04F3  18D6 5C       SE1C   LR    BVX,A        ]
04F4  18D7 20 FE           LI    -BBVY
04F5  18D9 6C              LISL  4
04F6  18DA 5E              LR    BVY+2,A      BVY <= -BBVY
04F7  18DB 4C              LR    A,BBX
04F8  18DC 91 05           BM    SE1D         IF NXTS=L [
```

```
04F9  18DE 24 F6              AI     -BBW2-BW2           BBX<=BBX-BBW2-BW2 )
04FA  18E0 90 03              BR     SE1E                ELSE [
04FB  18E2 24 0A      SE1D    AI     BBW2+BW2            BBX<=BBX+BBW2+BW2 )
04FC  18E4 51         SE1E    LR     X,A
04FD  18E5 20 D2              LI     CBB-BBH+11-BH2
04FE  18E7 53                 LR     Y,A                 Y <= CBB-BBH+11-BH2
04FF  18E8 70                 CLR
0500  18E9 54                 LR     VXP,A
0501  18EA 56                 LR     VYP,A
0502  18EB 6A                 LISL   2
0503  18EC 4C                 LR     A,BVX
0504  18ED 55                 LR     VX,A                VX <= BVX
0505  18EE 20 FE              LI     -BBVY
0506  18F0 57                 LR     VY,A                VY <= -BBVY
0507  18F1 62                 LISU   2
0508  18F2 6F                 LISL   7
0509  18F3 77                 LIS    7
050A  18F4 5C                 LR     BBK2,A              BBK2 <= 7
050B  18F5 90 28      SE01    BR     SE02                )
050C  18F7 70         SE2     CLR
050D  18F8 65                 LISU   5
050E  18F9 6A                 LISL   2
050F  18FA EC                 XS     BVX
0510  18FB 81 07              BP     SE3                 ELSEIF BVX<0
0511  18FD 6B                 LISL   3
0512  18FE CE                 AS     BBX+2               ANDIF BBX+BVX>=
0513  18FF 25 35              CI     LPX+PW2+8+BBW2-1
0514  1901 92 1C              BNC    SE02                LPX+PW2+8+BBW2 [
0515                                                     )
0516  1903 70         SE3     CLR
0517  1904 EC                 XS     BVX
0518  1905 84 09              BZ     SE4                 ELSEIF BVX>0
0519  1907 91 07              BM     SE4
051A  1909 6B                 LISL   3
051B  190A CE                 AS     BBX+2               ANDIF BBX+BVX<=
051C  190B 25 86              CI     RPX-PW2-8-BBW2
051D  190D 82 10              BC     SE02                RPX-PW2-8-BBW2 [
051E                                                     )
051F  190F 70         SE4     CLR
0520  1910 EC                 XS     BVX
0521  1911 84 0E              BZ     SE5                 ELSEIF BVX.NE.0 [
0522                                                     X <= LPX+PW2+BW2
0523  1913 20 28              LI     LPX+PW2+BW2
0524  1915 91 03              BM     SE4A                IF BVX>0 [
0525  1917 20 94              LI     RPX-PW2-BW2
0526  1919 51         SE4A    LR     X,A                 X<=RPX-PW2-BW2
0527  191A 70                 CLR                        )
0528  191B 55                 LR     VX,A                VX <= 0
0529  191C 57                 LR     VY,A                VY <= 0
052A  191D 5C                 LR     BVX,A               BVX <= 0
052B  191E 90 26      SE02    BR     SE03                )
052C  1920 6D         SE5     LISL   5
052D  1921 4C                 LR     A,BBY
052E  1922 25 FF              CI     H'FF'
052F  1924 84 07              BZ     SE6                 ELSEIF BBY.NE.H'FF'
0530  1926 6C                 LISL   4
0531  1927 CD                 AS     BVY+1
0532  1928 25 35              CI     CUB-1
0533  192A 92 1A              BNC    SE03                ANDIF BBY+BVY>=CUB [
0534                                                     )
0535  192C 4C         SE6     LR     A,BBY
0536  192D 25 FF              CI     H'FF'
0537  192F 84 17              BZ     SE7                 ELSEIF BBY.NE.H'FF' [
0538  1931 20 5E              LI     NX
0539  1933 6B                 LISL   3
053A  1934 5C                 LR     BBX,A               BBX <= NX
053B  1935 20 FF              LI     H'FF'
053C  1937 6D                 LISL   5
```

```
053D 1938 5C              LR     BBY,A              BBY <= H'FF'
053E 1939 62              LISU   2
053F 193A 69              LISL   1
0540 193B 4C              LR     A,PSTA
0541 193C 22 04           OI     BBYH
0542 193E 5C              LR     PSTA,A             PSTA <= PSTA+BBYH
0543 193F 70              CLR
0544 1940 65              LISU   5
0545 1941 6A              LISL   2
0546 1942 5C              LR     BVX,A              BVX <= 0
0547 1943 6C              LISL   4
0548 1944 5C              LR     BVY,A              BVY <= 0
0549 1945 90 42    SE03   BR     MB0                ]
054A                *                                ELSE [
054B 1947 62      SE7     LISU   2
054C 1948 69              LISL   1
054D 1949 4C              LR     A,PSTA
054E 194A 13              SL     1
054F 194B 20 28           LI     LPX+PW2+BW2        IF NEXT TO SERVE = LEFT
0550 194D 81 03           BP     *+4                  X = LPX+PW/2+BW/2]
0551 194F 20 94           LI     RPX-PW2-BW2        ELSE [
0552 1951 51              LR     X,A                  X = RPX-PW/2-BW/2]
0553                *
0554 1952 6D              LISL   5
0555 1953 74              LIS    4
0556 1954 5D              LR     HITK+1,A           HITK <= 4
0557 1955 20 3C           LI     60
0558 1957 5C              LR     BBK1,A             BBK1 <= 60
0559                *
055A 1958 70              CLR
055B 1959 B1              OUTS   1
055C 195A A1              INS    1
055D 195B 5A              LR     TEMP,A             TEMP <= BUTTONS INPUT
055E 195C 21 01           NI     LSVB
055F 195E 84 09           BZ     SE7A               IF LSVB PRESSED
0560 1960 70              CLR                         ANDIF X>=0 [
0561 1961 E1              XS     X                    X <= X-1
0562 1962 91 05           BM     SE7A               IF EOG [SCORE <= 0]
0564 1966 90 0B           BR     SE7B               ]
0565 1968 4A      SE7A    LR     A,TEMP
0566 1969 21 04           NI     RSVB
0567 196B 84 2A           BZ     MP0                ELSEIF RSVB PRESSED
0568 196D 70              CLR
0569 196E E1              XS     X
056A 196F 81 26           BP     MP0                ANDIF X<0 [
056B 1971 1F              INC
056C 1972 51      SE7B    LR     X,A                  X <= X+1
056D 1973 69              LISL   1
056E 1974 4C              LR     A,PSTA
056F 1975 22 80           OI     PLAY               MODE <= PLAY
0570 1977 5C              LR     PSTA,A
0571                *
0572 1978 65              LISU   5
0573 1979 68              LISL   0
0574 197A 4D              LR     A,LSCD+1
0575 197B 25 15           CI     MAXS
0576 197D 84 06           BZ     SE7C               IF LSCD=MAXS
0577 197F 4C              LR     A,RSCD
0578 1980 25 15           CI     MAXS
0579 1982 94 13           BNZ    MP0                OR RSCD=MAXS [
057A 1984 68      SE7C    LISL   0
057B 1985 70              CLR
057C 1986 5D              LR     LSCD+1,A           LSCD <= 0
057D 1987 5C              LR     RSCD,A             RSCD <= 0
057E                *                                ]
057F                *                              ]
0580                *                            ]
0581                *
0582              *MOVE BALL*
```

```
0583                          ***********
0584  1988  40        MB0     LR      A,XP
0585  1989  C4                AS      VXP
0586  198A  50                LR      XP,A      XP = XP + VXP
0587  198B  41                LR      A,X
0588  198C  19                LNK
0589  198D  C5                AS      VX
058A  198E  51                LR      X,A       X = X + VX + LNK
058B  198F  42                LR      A,YP
058C  1990  C6                AS      VYP
058D  1991  52                LR      YP,A      YP = YP + VYP
058E  1992  43                LR      A,Y
058F  1993  19                LNK
0590  1994  C7                AS      VY
0591  1995  53                LR      Y,A       Y = Y + VY + LNK
0592                          *
0593                          *MOVE PADDLES*
0594                          **************
0595  1996  62        MP0     LISU    2
0596  1997  71                LIS     LDVJ
0597  1998  5A                LR      TEMP,A    TEMP <= LDVJ
0598                          *
0599  1999  2A 08 FB          DCI     YCUR
059A  199C  16                LM
059B  199D  24 03             AI      3
059C  199F  5B                LR      TMP2,A    TMP2 <= YCUR+3
059D                          *
059E  19A0  28 1F 2B          PI      JOYI      ACC <= JOYI(TEMP,TMP2)
059F  19A3  24 27             AI      SUB       IF ACC<CUB+PH/2 [
05A0  19A5  25 45             CI      CUB+PH2-1
05A1  19A7  92 05             BNC     MP1       LPY <= CUB+PH/2
05A2  19A9  20 46             LI      CUB+PH2
05A3  19AB  90 07             BR      MP2       ELSEIF ACC>CBB-PH/2 [
05A4  19AD  25 DA     MP1     CI      CBB-PH2   LPY <= CBB-PH/2
05A5  19AF  82 03             BC      MP2       ]
05A6  19B1  20 DA             LI      CBB-PH2   ELSE [
05A7  19B3  6A        MP2     LISL    2
05A8  19B4  5C                LR      LPY,A     LPY <= ACC
05A9                          *                 ]
05AA  19B5  20 10             LI      RDVJ
05AB  19B7  5A                LR      TEMP,A    TEMP <= RDVJ
05AC                          *
05AD  19B8  2A 08 FB          DCI     YCUR
05AE  19BB  16                LM
05AF  19BC  24 03             AI      3
05B0  19BE  5B                LR      TMP2,A    TMP2 <= YCUR+3
05B1                          *
05B2  19BF  28 1F 2B          PI      JOYI      ACC <= JOYI(TEMP,TMP2)
05B3  19C2  24 27             AI      SUB       IF ACC<CUB+PH/2 [
05B4  19C4  25 45             CI      CUB+PH2-1
05B5  19C6  92 05             BNC     MP3       RPY <= CUB+PH/2
05B6  19C8  20 46             LI      CUB+PH2   ]
05B7  19CA  90 07             BR      MP4       ELSEIF ACC>CBB-PH/2 [
05B8  19CC  25 DA     MP3     CI      CBB-PH2   RPY <= CBB-PH/2
05B9  19CE  82 03             BC      MP4       ]
05BA  19D0  20 DA             LI      CBB-PH2   ELSE [
05BB  19D2  6B        MP4     LISL    3
05BC  19D3  5C                LR      RPY,A     RPY <= ACC
05BD                          *                 ]
05BE                          *
05BF                          *GENERATE SOUND*
05C0                          ****************
05C1  19D4  28 1E F5          PI      SOND      CALL SOND
05C2                          *
05C3                          *MOVE BALL BOY*
05C4                          ***************
05C5  19D7  65        MBB     LISU    5
05C6  19D8  6A                LISL    2
```

```
05C7  19D9 4D            LR      A,BVX+1
05C8  19DA CC            AS      BBX
05C9  19DB 5D            LR      BBX+1,A    BBX <= BBX+BVX
05CA             *
05CB  19DC 4D            LR      A,BVY+1
05CC  19DD CC            AS      BBY
05CD  19DE 5C            LR      BBY,A      BBY <= BBY+BVY
05CE             *
05CF             *CHECK FOR COLLISIONS*
05D0             ************************
05D1             *
05D2             *COURT UPPER BOUNDARY
05D3  19DF 43     C0     LR      A,Y        IF Y-BH/2<CUB [
05D4  19E0 25 38         CI      CUB+BH2-1
05D5  19E2 92 05         BNC     C1
05D6  19E4 20 39         LI      CUB+BH2    Y=CUB+BH/2
05D7  19E6 90 07         BR      C1A        VY=-VY]
05D8             *
05D9             *COURT BOTTOM BOUNDARY
05DA  19E8 25 E7  C1     CI      CBB-BH2
05DB  19EA 82 0C         BC      C2         ELSEIF Y+BH/2>CBB [
05DC  19EC 20 E7         LI      CBB-BH2
05DD  19EE 53     C1A    LR      Y,A        Y=CBB-BH/2
05DE  19EF 28 1D E9      PI      VYCH       VY=-VY
05DF  19F2 20 10         LI      PERB
05E0  19F4 66            LISU    6
05E1  19F5 68            LISL    0
05E2  19F6 5C            LR      SNDP,A     SNDP <= PERB
05E3             *                          ]
05E4             *
05E5             *BELLOW NET
05E6  19F7 69     C2     LISL    1
05E7  19F8 62            LISU    2
05E8  19F9 41            LR      A,X        IF X+BW/2>NX-NW/2
05E9  19FC 25 5B         CI      NX-NW2-BW2
05EA  19FC 82 0C         BC      C2A
05EB  19FE 25 60         CI      NX+NW2+BW2-1
05EC  1A00 92 08         BNC     C2A        .AND. X-BW/2<NX+NW/2 [
05ED  1A02 20 F7         LI      HBFN
05EE  1A04 FC            NS      PSTA
05EF  1A05 22 08         OI      HBF        SET HIDE BALL FLAG
05F0  1A07 90 04         BR      C2B        ]
05F1  1A09 20 F7  C2A    LI      HBFN       ELSE [
05F2  1A0B FC            NS      PSTA       RESET HIDE BALL FLAG
05F3  1A0C 5C     C2B    LR      PSTA,A     ]
05F4             *
05F5             *IN FRONT OF PADDLE
05F6  1A0D 6C     C3     LISL    4
05F7  1A0E 4C            LR      A,PST1
05F8  1A0F 21 9F         NI      PIMN       LPIM <= 0
05F9  1A11 5C            LR      PST1,A     RPIM<= 0
05FA  1A12 41            LR      A,X
05FB  1A13 25 33         CI      LPX+PW2+7-BW2+8
05FC  1A15 82 0E         BC      C3A        IF LPX+PW/2+8<=X+BW/2-8
05FD  1A17 25 5D         CI      NX-1
05FE  1A19 92 0A         BNC     C3A        AND X<NX
05FF  1A1B 70            CLR     X
0601  1A1D 91 06         BM      C3A        ANDIF VX>=0 [
0602  1A1F 4C            LR      A,PST1
0603  1A20 22 40         OI      LPIM       LPIM <= 1
0604  1A22 90 11         BR      C3B        ]
0605  1A24 41     C3A    LR      A,X
0606  1A25 25 5D         CI      NX-1
0607  1A27 82 0D         BC      C4         ELSEIF NX<=X
0608  1A29 25 88         CI      RPX-PW2-8+BW2-8
0609  1A2B 92 09         BNC     C4         AND X-BW/2+8<=RPX-PW/2-8
060A  1A2D 70            CLR
```

```
060B  1A2E  E5              XS     VX
060C  1A2F  81 05           BP     C4         ANDIF VX<0 [
060D  1A31  4C              LR     A,PST1
060E  1A32  22 20           OI     RPIM       RPIM <= 1
060F  1A34  5C      C3B     LR     PST1,A     ]
0610                   •
0611                   *ON COURT
0612  1A35  41      C4      LR     A,X
0613  1A36  25 27           CI     LPX+PW2+BW2-1
0614  1A38  82 05           BC     C5         IF LPX+PW/2<=X-BW/2
0615  1A3A  25 94           CI     RPX-PW2-BW2
0616  1A3C  82 28           BC     CD1        .AND. X+BW/2<=RPX-PW/2 [ ]
0617                   •
0618                   *LEFT COURT BOUNDARY
0619  1A3E  69      C5      LISL   1
061A  1A3F  25 07           CI     CLB+BW2-1
061B  1A41  92 0C           BNC    C6         ELSEIF X-BW/2<CLB [
061C  1A43  4C              LR     A,PSTA
061D  1A44  21 7F           NI     SERV       MODE = SERVE
061E  1A46  22 40           OI     RSV        NEXT TO SERVE = RIGHT
061F  1A48  5C              LR     PSTA,A
0620  1A49  20 08           LI     CLB+BW2
0621  1A4B  51              LR     X,A        X = CLB+BW/2
0622  1A4C  90 0F           BR     C6A        UPDATE SCORE ]
0623                   •
0624                   *RIGHT COURT BOUNDARY
0626  1A50  82 16           BC     C7         ELSEIF X+BW/2>CRB
0627  1A52  4C              LR     A,PSTA
0628  1A53  21 7F           NI     SERV       MODE = SERVE
0629  1A55  21 BF           NI     LSV        NEXT TO SERVE = LEFT
062A  1A57  5C              LR     PSTA,A
062B  1A58  20 B4           LI     CRB-BW2
062C  1A5A  51              LR     X,A        X = CRB-BW/2
062D  1A5B  68              LISL   0
062E  1A5C  65      C6A     LISU   5
062F  1A5D  20 67           LI     H'66'+1
0630  1A5F  DC              ASD    RSCD
0631  1A60  5C              LR     RSCD,A     RSCD <= RSCD+1
0632  1A61  74              LIS    PERS
0633  1A62  66              LISU   6
0634  1A63  68              LISL   0
0635  1A64  5C              LR     SNDP,A     SNDP <= PERS
0636  1A65  90 60   CD1     BR     CD2        ]
0637                   •
0638                   *BEYOND LEFT PADDLE
0639  1A67  25 1C   C7      CI     LPX-PW2-BW2
063A  1A69  82 5C           BC     CD2        ELSEIF X+BW/2<=LPX-PW/2 [ ]
063B                   •
063D  1A6B  25 9F   C8      CI     RPX+PW2+BW2-1
063E  1A6D  92 58           BNC    CD2        ELSEIF X-BW/2>=RPX+PW/2 [ ]
063F                   •
0640                   *BALL IN PADDLE REGION
0641                   •                       ELSE [
0642  1A6F  18              COM                IF X>=0 [
0643  1A70  6A              LISL   2             PY = LPY]
0644  1A71  91 02           BM     *+3        ELSE [
0645  1A73  6B              LISL   3             PY = RPY]
0646                   •
0647                   *BALL ABOVE PADDLE
0648  1A74  43      C9      LR     A,Y        IF Y+BH/2<PY-PH/2-1 [
0649  1A75  18              COM
064A  1A76  24 ED           AI     -PH2-BH2
064B  1A78  CC              AS     PY
064C  1A79  82 4C           BC     CD2        ]
064D                   •
064E                   *BALL BELLOW PADDLE
064F  1A7B  4C      C10     LR     A,PY       ELSEIF Y-BH/2>=PY+PH/2+1 [
0650  1A7C  18              COM
```

```
0651  1A7D  24 ED              AI        -PH2-BH2
0652  1A7F  C3                 AS        Y
0653  1A80  82 45              BC        C02        ]
0654              ♦
0655              *SIDE COLLISION--TOP OF PADDLE
0656  1A82  43          C11    LR        A,Y        ELSEIF Y+BH/2<=PY-PH/2-1+PEN
0657  1A83  18                 COM
0658  1A84  24 EE              AI        -PH2-BH2-1+PENS
0659  1A86  CC                 AS        PY
065A  1A87  92 13              BNC       C12
065B  1A89  70                 CLR                  .AND. VY>0 [
065C  1A8A  E7                 XS        VY
065D  1A8B  91 0F              BM        C12
065E  1A8D  84 0D              BZ        C12
065F  1A8F  4C                 LR        A,PY       IF PY-PH/2<CUB+BH [
0660  1A90  25 4B              CI        CUB+BH+PH2-1
0661  1A92  92 04              BNC       C11A
0662  1A94  20 4C              LI        CUB+BH+PH2
0663  1A96  5C                 LR        PY,A       PY = CUB+BH+PH/2]
0664  1A97  24 ED       C11A   AI        -PH2-BH2   Y = PY-PH/2-BH/2
0665  1A99  90 16              BR        C12B       VY = -VY]
0666              ♦
0667              *SIDE COLLISION--BOTTOM OF PADLE
0668  1A9B  4C          C12    LR        A,PY       ELSEIF Y-BH/2>=PY+PH/2+1-PEN
0669  1A9C  18                 COM
066A  1A9D  24 EE              AI        -PH2-BH2-1+PENS
066B  1A9F  C3                 AS        Y
066C  1AA0  92 15              BNC       C13
066D  1AA2  70                 CLR                  .AND. VY<0 [
066E  1AA3  E7                 XS        VY
066F  1AA4  81 11              BP        C13
0670  1AA6  4C                 LR        A,PY       IF PY+PH/2>CBB-BH [
0671  1AA7  25 D4              CI        CBB-BH-PH2
0672  1AA9  82 04              BC        C12A
0673  1AAB  20 D4              LI        CBB-BH-PH2
0674  1AAD  5C                 LR        PY,A       PY = CBB-PH/2-BH]
0675  1AAE  24 13       C12A   AI        PH2+BH2
0676  1AB0  53          C12B   LR        Y,A        Y = PY+PH/2+BH/2
0677  1AB1  28 1D E9           PI        VYCH       VY = -VY
0678              ♦                                 SNDP <= PEPH
0679  1AB4  90 5A              BR        C15G       ]
067A              ♦
067B              *THROUGH LEFT PADDLE
067C  1AB6  41          C13    LR        A,X        ELSEIF X-BW/2<LPX+PW/2-PEN
067D  1AB7  25 21              CI        LPX+PW2+BW2-PEN-1
067E  1AB9  92 05              BNC       C14
067F  1ABB  20 1C              LI        LPX-PW2-BW2
0680  1ABD  90 07              BR        C14A       X = LPX-PW/2-BW/2]
0681
0682              *THROUGH RIGHT PADDLE
0683  1ABF  25 9A       C14    CI        RPX-PW2+PEN-BW2
0684  1AC1  82 06              BC        C15        ELSEIF X+BW/2>RPX-PW/2+PEN
0685  1AC3  20 A0              LI        RPX+PW2+BW2
0686  1AC5  51          C14A   LR        X,A        X = RPX+PW/2+BW/2]
0687  1AC6  90 5B       C02    BR        CHIM
0688              ♦
0689              *FRONT HIT
068A  1AC8  75          C15    LIS       5          ELSE [
068B  1AC9  5A                 LR        TEMP,A
068C  1ACA  4C                 LR        A,PY       TEMP = 5
068D  1ACB  18                 COM                  DISP = PH/2+BH/2+1
068E  1ACC  C3                 AS        Y          REPEAT [
068F  1ACD  24 ED              AI        -PH2-BH2     TEMP = TEMP-1
0690  1ACF  3A          C15A   DS        TEMP         DISP = DISP-H/5]
0691  1AD0  24 08              AI        HBY5       UNTIL
0692  1AD2  91 FC              BM        C15A         Y-PY-DISP>=0
0693  1AD4  2A 12 00           DCI       VTBL
```

```
0694 1AD7 70                 CLR
0695 1AD8 EA                 XS    TEMP
0696 1AD9 25 02              CI    2
0697 1ADB 94 06              BNZ   C15B        IF TEMP=2 [
0698 1ADD 70                 CLR
0699 1ADE 56                 LR    VYP,A
069A 1ADF 57                 LR    VY,A        VY = 0
069B 1AE0 90 17              BR    C15D           ]
069C 1AE2 92 0C      C15B    BNC   C15C        ELSEIF TEMP<2 [
069D 1AE4 13                 SL    1
069E 1AE5 8E                 ADC
069F 1AE6 16                 LM
06A0 1AE7 56                 LR    VYP,A
06A1 1AE8 16                 LM
06A2 1AE9 57                 LR    VY,A
06A3 1AEA 28 1D E9           PI    VYCH        VY = -VTBL(2*TEMP)
06A4 1AED 90 0A              BR    C15D           ]
06A5 1AEF 18      C15C       COM               ELSE [
06A6 1AF0 24 05              AI    5
06A7 1AF2 13                 SL    1
06A9 1AF4 16                 LM
06AA 1AF5 56                 LR    VYP,A
06AB 1AF6 16                 LM               VY = +VTBL(2*(4-TEMP))
06AC 1AF7 57                 LR    VY,A           ]
06AD 1AF8 70     C15D        CLR
06AE 1AF9 E1                 XS    X
06AF 1AFA 91 0B              BM    C15E        IF X>=0 [
06B0 1AFC 20 80              LI    VX0.
06B1 1AFE 54                 LR    VXP,A
06B2 1AFF 20 01              LI    VX0:
06B3 1B01 55                 LR    VX,A        VX = VX0
06B4 1B02 20 28              LI    LPX+PW2+BW2 X = LPX+PW/2+BW/2
06B5 1B04 90 09              BP    C15F           ]
06B6 1B06 20 80    C15E      LI    -VX0.       ELSE [
06B7 1B08 54                 LR    VXP,A
06B8 1B09 20 FE              LI    -VX0:
06B9 1B0B 55                 LR    VX,A        VX = -VX0
06BA 1B0C 20 94              LI    RPX-PW2-BW2 X = RPX-PW/2-BW/2
06BB 1B0E 51     C15F        LR    X,A            ]
06BC              *
06BD 1B0F 78     C15G        LIS   PERH
06BE 1B10 66                 LISU  6
06BF 1B11 68                 LISL  0
06C0 1B12 5C                 LR    SNDP,A      SNDP <= PERH
06C1 1B13 6D                 LISL  5
06C2 1B14 62                 LISU  2
06C3 1B15 3C                 DS    HITK        HITK <= HITK-1
06C4 1B16 94 0B              BNZ   CHIM        IF HITK=0 [
06C5 1B18 71                 LIS   1
06C6 1B19 5C                 LR    HITK,A      HITK <= 1
06C7 1B1A 74                 LIS   4
06C8 1B1B 0B                 LR    IS,A        VX <= 2*VX
06C9 1B1C 28 1D F5           PI    MPY2        VY <= 2*VY
06CA 1B1F 28 1D F5           PI    MPY2           ]
06CB              *                                ]
06CC              *                                ]
06CD              *
06CE              *OUTPUT*
06CF              *********
06D0              *
06D1              *CHOOSE BALL & NET IMAGES
06D2 1B22 41     CHIM        LR    A,X
06D3 1B23 25 21              CI    LPX+PW2-PEN+BW2-1
06D4 1B25 92 05              BNC   CHI1        IF X-BW/2<LPX+PW/2-PEN [
06D5 1B27 20 00              LI    RBLN        RBLN <= 1
06D6 1B29 90 23              BR    CHIE           ]
06D7 1B2B 25 2B   CHI1       CI    LPX+PW2+8-BW2-1
06D8 1B2D 92 05              BNC   CHI2        ELSEIF X<LPX+PW/2+8-BW/2 [
```

```
06D9 1B2F 20 20            LI     LBLN       LBLB <= 1
06DA 1B31 90 1B            BR     CHIE       ]
06DB 1B33 25 5E    CHI2    CI     NX
06DC 1B35 92 05            BNC    CHI3       ELSEIF X<=NX [
06DD 1B37 20 00            LI     RBLN       RBLN <= 1
06DE 1B39 90 13            BR     CHIE       ]
06DF 1B3B 25 90    CHI3    CI     RPX-PW2-8+BW2
06E0 1B3D 92 05            BNC    CHI4       ELSEIF X<=RPX-PW/2-8+BW/2 [
06E1 1B3F 20 30            LI     LBRN       LBRN <= 1
06E2 1B41 90 0B            BR     CHIE       ]
06E3 1B43 25 9A    CHI4    CI     RPX-PW2+PEN-BW2
06E4 1B45 92 05            BNC    CHI5       LESEIF S+BW/2<=RPX-PW/2+PEBN
06E5 1B47 20 10            LI     RBRN       RBRN <= 1
06E6 1B49 90 03            BR     CHIE       ]
06E7 1B4B 20 30    CHI5    LI     LBRN       ELSE [
06E8 1B4D 69      CHIE    LISL   1          LBRN <= 1
06E9 1B4E 62              LISU   2          ]
06EA 1B4F 5A              LR     TEMP,A
06EC 1B51 21 CF           NI     CLBN
06ED 1B53 EA              XS     TEMP
06EE 1B54 5C              LR     PSTA,A
06EF                   *
06F0                   *UPDATE ROM POINTERS, X-VALUES & DELTA-X
06F1 1B55 69      UPRX    LISL   1          SELECT LEFT/RIGHT BALL
06F2 1B56 62              LISU   2
06F3 1B57 4C              LR     A,PSTA
06F4 1B58 21 20           NI     LBLN
06F5                   *
06F6 1B5A 20 DD           LI     BL.        UPDATE RPL(0)
06F7 1B5C 94 03           BNZ    *+4
06F8 1B5E 20 E3           LI     BR.
06F9 1B60 2A 0C 83        DCI    RPLE
06FA 1B63 17              ST
06FB 1B64 2A 0C 49        DCI    RPLO
06FC 1B67 17              ST
06FD                   *
06FE 1B68 20 F2           LI     BL:+RED+GRN+BLU
06FF 1B6A 94 03           BNZ    *+4        UPDATE RPH(0)
0700 1B6C 20 F2           LI     BR:+RED+GRN+BLU
0701 1B6E 2A 0C 91        DCI    RPHE
0702 1B71 17              ST
0703 1B72 2A 0C 57        DCI    RPHO
0704 1B75 17              ST
0705                   *
0706 1B76 20 FE           LI     -BW2       UPDATE XVAL(0)
0707 1B78 94 03           BNZ    *+4
0708 1B7A 20 FA           LI     BW2-8
0709 1B7C C1              AS     X
070A 1B7D 2A 0C 39        DCI    XVU
070B 1B80 17              ST
070C                   *
070D 1B81 6C              LISL   4
070E 1B82 4C              LR     A,PST1     SELECT LEFT PADDLE IMAGE
070F 1B83 21 40           NI     LPIM
0710 1B85 20 09           LI     LP1E.      UPDATE RPL(1)
0711 1B87 84 03           BZ     *+4
0712 1B89 20 69           LI     LP2E.
0713 1B8B 2A 0C 84        DCI    RPLE+1
0714 1B8E 17              ST
0715 1B8F 20 E9           LI     LP1O.
0716 1B91 84 03           BZ     *+4
0717 1B93 20 29           LI     LP2O.
0718 1B95 2A 0C 4A        DCI    RPLO+1
0719 1B98 17              ST
071A 1B99 20 D3           LI     LP1E:+RED+GRN
071B 1B9B 84 03           BZ     *+4        UPDATE RPH(1)
071C 1B9D 20 D3           LI     LP2E:+RED+GRN
071D 1B9F 2A 0C 92        DCI    RPHE+1
```

```
071E 1BA2 17            ST
071F 1BA3 20 D2         LI      LP1O:+RED+GRN
0720 1BA5 84 03         BZ      *+4
0721 1BA7 20 D3         LI      LP2O:+RED+GRN
0722 1BA9 2A 0C 58      DCI     RPHO+1
0723 1BAC 17            ST
0724 1BAD 20 41         LI      1+HI        UPDATE DELX(1)
0725 1BAF 84 03         BZ      *+4
0726 1BB1 20 42         LI      2+HI
0727 1BB3 2A 0C 1E      DCI     DLXU+1
0728 1BB6 17            ST
0729 1BB7 4C            LR      A,PST1  SELECT RIGHT PADDLE IMAGE
072A 1BB8 21 20         NI      RPIM
072B 1BBA 20 C9         LI      RP1E.       UPDATE RPL(2)
072C 1BBC 84 03         BZ      *+4
072D 1BBE 20 29         LI      RP2E.
072E 1BC0 2A 0C 85      DCI     RPLE+2
072F 1BC3 17            ST
0730 1BC4 20 A9         LI      RP1O.
0731 1BC6 84 03         BZ      *+4
0732 1BC8 20 E9         LI      RP2O.
0733 1BCA 2A 0C 4B      DCI     RPLO+2
0734 1BCD 17            ST
0735 1BCE 20 33         LI      RP1E:+BLU
0736 1BD0 84 03         BZ      *+4         UPDATE RPH(2)
0737 1BD2 20 34         LI      RP2E:+BLU
0738 1BD4 2A 0C 93      DCI     RPHE+2
0739 1BD7 17            ST
073A 1BD8 20 33         LI      RP1O:+BLU
073B 1BDA 84 03         BZ      *+4
073C 1BDC 20 33         LI      RP2O:+BLU
073D 1BDE 2A 0C 59      DCI     RPHO+2
073E 1BE1 17            ST
073F 1BE2 20 96         LI      RPX-PW2
0740 1BE4 84 03         BZ      *+4
0741 1BE6 20 8E         LI      RPX-PW2-8
0742 1BE8 2A 0C 3B      DCI     XVU+2
0743 1BEB 17            ST
0744 1BEC 20 41         LI      1+HI        UPDATE DELX(2)
0745 1BEE 84 03         BZ      *+4
0746 1BF0 20 42         LI      2+HI
0747 1BF2 2A 0C 1F      DCI     DLXU+2
0748 1BF5 17            ST
0749                *
074A 1BF6 69            LISL    1
074B 1BF7 4C            LR      A,PSTA  SELECT LEFT/RIGHT NET
074C 1BF8 21 10         NI      RBRN
074D                *
074E 1BFA 20 69         LI      NL.         UPDATE RPL(3,4,5)
074F 1BFC 84 03         BZ      *+4
0750 1BFE 20 A5         LI      NR.
0751 1C00 2A 0C 86      DCI     RPLE+3
0752 1C03 17            ST
0753 1C04 17            ST
0754 1C05 17            ST
0755 1C06 2A 0C 4C      DCI     RPLO+3
0756 1C09 17            ST
0757 1C0A 17            ST
0758 1C0B 17            ST
0759                *
075A 1C0C 20 F4         LI      NL:+RED+GRN+BLU
075B 1C0E 84 03         BZ      *+4         UPDATE RPH(3,4,5)
075C 1C10 20 F4         LI      NR:+RED+GRN+BLU
075D 1C12 2A 0C 94      DCI     RPHE+3
075E 1C15 17            ST
075F 1C16 17            ST
0760 1C17 17            ST
0761 1C18 2A 0C 5A      DCI     RPHO+3
```

```
0762  1C1B 17                    ST
0763  1C1C 17                    ST
0764  1C1D 17                    ST
0765                     *
0766  1C1E 20 FF                 LI    -NW2      UPDATE XVAL(3,4,5)
0767  1C20 84 03                 BZ    *+4
0768  1C22 20 F9                 LI    NW2-8
0769  1C24 24 5E                 AI    NX
076A  1C26 2A 0C 3C              DCI   XVU+3
076B  1C29 17                    ST
076C  1C2A 17                    ST
076D  1C2B 17                    ST
076E                     *
076F  1C2C 4C                    LR    A,PSTA    SELECT LEFT/RIGHT BALL BOY
0770  1C2D 12                    SR    1
0771  1C2E 14                    SR    4
0772  1C2F 21 02                 NI    H'02'
0773  1C31 5A                    LR    TEMP,A
0774  1C32 4C                    LR    A,PSTA    SELECT BALL BOY IMAGE
0775  1C33 12                    SR    1
0776  1C34 21 01                 NI    H'01'
0777  1C36 CA                    AS    TEMP
0778  1C37 13                    SL    1
0779  1C38 13                    SL    1
077A  1C39 2A 12 04              DCI   BBTB
077B  1C3C 8E                    ADC
077C  1C3D 16                    LM
077D  1C3E 2C                    XDC
077E  1C3F 2A 0C 9B              DCI   RPHE+10   UPDATE RPL(10) & RPH(10)
0780  1C43 2C                    XDC
0781  1C44 16                    LM
0782  1C45 2C                    XDC
0783  1C46 2A 0C 8D              DCI   RPLE+10
0784  1C49 17                    ST
0785  1C4A 2C                    XDC
0786  1C4B 16                    LM
0787  1C4C 2C                    XDC
0788  1C4D 2A 0C 61              DCI   RPHO+10
0789  1C50 17                    ST
078A  1C51 2C                    XDC
078B  1C52 16                    LM
078C  1C53 2A 0C 53              DCI   RPLO+10
078D  1C56 17                    ST
078E                     *
078F  1C57 6F                    LISL  7
0790  1C58 3C                    DS    BBK2      BBK2 <= BBK2-1
0791  1C59 94 08                 BNZ   SBB1      IF BBK2=0 [
0792  1C5B 77                    LIS   7
0793  1C5C 5C                    LR    BBK2,A    BBK2 <= 7
0794  1C5D 20 02                 LI    BBIM
0795  1C5F 69                    LISL  1
0796  1C60 EC                    XS    PSTA
0797  1C61 5C                    LR    PSTA,A    BBIM <= 1.XOR.BBIM
0798                     *                      ]
0799                     *
079A  1C62 20 F8     SBB1        LI    -BBW2     UPDATE XVAL(10)
079B  1C64 65                    LISU  5
079C  1C65 6B                    LISL  3
079D  1C66 CC                    AS    BBX
079E  1C67 2A 0C 43              DCI   XVU+10
079F  1C6A 17                    ST
07A0                     *
07A1  1C6B 41                    LR    A,X       SELECT LEFT/RIGHT CROWD
07A2  1C6C 25 5E                 CI    NX
07A3                     *
07A4  1C6E 20 F1                 LI    CR1E.     UPDATE RPL(11,12)
07A5  1C70 82 03                 BC    *+4
07A6  1C72 20 09                 LI    CR2E.
```

```
07A7  1C74 2A 0C 8E          DCI    RPLE+11
07A8  1C77 17                ST
07A9  1C78 17                ST
07AA  1C79 20 E5             LI     CR1O.
07AB  1C7B 82 03             BC     *+4
07AC  1C7D 20 FD             LI     CR2O.
07AD  1C7F 2A 0C 54          DCI    RPLO+11
07AE  1C82 17                ST
07AF  1C83 17                ST
07B0                   *
07B1  1C84 20 D6             LI     CR1E:+RED+GRN
07B2  1C86 82 03             BC     *+4     UPDATE RPH(11)
07B3  1C88 20 D7             LI     CR2E:+RED+GRN
07B4  1C8A 2A 0C 90          DCI    RPHE+11
07B5  1C8D 17                ST
07B6  1C8E 20 36             LI     CR1E:+BLU
07B7  1C90 82 03             BC     *+4     UPDATE RPH(12)
07B8  1C92 20 37             LI     CR2E:+BLU
07B9  1C94 17                ST
07BA  1C95 20 D6             LI     CR1O:+RED+GRN
07BB  1C97 82 03             BC     *+4
07BC  1C99 20 D6             LI     CR2O:+RED+GRN
07BD  1C9B 2A 0C 62          DCI    RPHO+11
07C0  1CA1 82 03             BC     *+4
07C1  1CA3 20 36             LI     CR2O:+BLU
07C2  1CA5 17                ST
07C3                   *
07C4                   *SELECT INACTIVE LIST
07C5  1CA6 62                LISU   2
07C6  1CA7 68                LISL   0
07C7  1CA8 4C                LR     A,PCOM   IF LIST B IS SELECTED [
07C8  1CA9 21 40             NI     SELA       Q<-DC0<-^X-ORD A
07C9  1CAB 2A 08 70          DCI    YXA
07CA  1CAE 84 04             BZ     *+5      ELSE [
07CB  1CB0 2A 08 80          DCI    YXB        Q<=DC0<=^X-ORD B
07CC  1CB3 0E                LR     Q,DC     ]
07CD                   *
07CE                   *COPY ACTIVE LIST INTO INACTIVE
07CF  1CB4 2A 08 60          DCI    YVLB
07D0  1CB7 2C                XDC
07D1  1CB8 2A 08 50          DCI    YVLA
07D3  1CBD 2C                XDC
07D4  1CBE 20 0D             LI     NOBJ
07D5  1CC0 5A                LR     TEMP,A
07D6  1CC1 28 1D D1          PI     MOVE
07D7  1CC4 20 13             LI     YXA-YVLA-NOBJ
07D8  1CC6 8E                ADC
07D9  1CC7 2C                XDC
07DA  1CC8 8E                ADC
07DB  1CC9 2C                XDC
07DC  1CCA 20 0D             LI     NOBJ
07DD  1CCC 5A                LR     TEMP,A
07DE  1CCD 28 1D D1          PI     MOVE
07DF                   *
07E0                   *SORT INACTIVE LIST
07E1  1CD0 7A        SORT    LIS    10       REPEAT [
07E2  1CD1 24 18             AI     PXLS
07E3  1CD3 0B                LR     IS,A
07E4  1CD4 0F                LR     DC,Q
07E5  1CD5 4C                LR     A,XLST
07E6  1CD6 24 FF             AI     -1
07E7  1CD8 8E                ADC
07E8  1CD9 28 1E 03          PI     COMP     IF XVAL(XORD(XLST(10)-1))>
07E9  1CDC 90 06             BR     SO1        XVAL(XORD(XLST(10))) [
07EA  1CDE 28 1E 24          PI     EXCH       EXCHANGE ENTRIES
07EB  1CE1 90 EE             BR     SORT     ]
07EC  1CE3 7A        SO1     LIS    10
```

```
07ED 1CE4 24 18           AI    PXLS
07EE 1CE6 0B              LR    IS,A
07EF 1CE7 0F              LR    DC,Q
07F0 1CE8 4C              LR    A,XLST
07F1 1CE9 8E              ADC
07F2 1CEA 28 1E 03        PI    COMP    IF XVAL(XORD(XLST(10)))
07F3 1CED 90 06           BR    SO2        XVAL(XORD(XLST(10)+1)) [
07F4 1CEF 28 1E 24        PI    EXCH       EXCHANGE ENTRIES
07F5 1CF2 90 F0           BR    SO1     ]
07F6                •                   ELSE [EXIT]
07F7                •                   ]
07F8 1CF4 20 18    SO2    LI    PXLS    REPEAT [
07F9 1CF6 0B              LR    IS,A
07FA 1CF7 0F              LR    DC,Q
07FB 1CF8 70              CLR
07FC 1CF9 EC              XS    XLST    IF XLST.NE.0
07FD 1CFA 84 0E           BZ    SO3
07FE 1CFC 24 FF           AI    -1
07FF 1CFE 8E              ADC
0800 1CFF 28 1E 03        PI    COMP    ANDIF XVAL(XORD(XLST-1))
0801 1D02 90 06           BR    SO3        XVAL(XORD(XLST)) [
0802 1D04 28 1E 24        PI    EXCH       EXCHANGE ENTRIES
0803 1D07 90 EC           BR    SO2     ]
0804 1D09 20 18    SO3    LI    PXLS    ELSEIF XLST<NOBJ-1
0805 1D0B 0B              LR    IS,A
0806 1D0C 0F              LR    DC,Q
0807 1D0D 4C              LR    A,XLST
0808 1D0E 25 0B           CI    NOBJ-2
0809 1D10 92 0C           BNC   UPYV
080A 1D12 8E              ADC
080B 1D13 28 1E 03        PI    COMP    ANDIF XVAL(XORD(XLST))
080C 1D16 90 06           BR    UPYV       XVAL(XORD(XLST+1)) [
080D 1D18 28 1E 24        PI    EXCH       EXCHANGE ENTRIES
080E 1D1B 90 ED           BR    SO3     ]
080F                •                   ELSE [EXIT]
0810                •                   ]
0811                •
0812                •UPDATE Y-VALUES
0813 1D1D 63     UPYV     LISU  3
0814 1D1E 68              LISL  0
0815 1D1F 4D              LR    A,XLST+1
0816 1D20 0F              LR    DC,Q
0817 1D21 8E              ADC
0818 1D22 2C              XDC
0819 1D23 0F              LR    DC,Q
081A 1D24 8E              ADC
081B 1D25 62              LISU  2
081C 1D26 4E              LR    A,PSTA+2
081D 1D27 21 08           NI    HBF     IF HIDE BALL FLAG = 1 [
081E 1D29 16              LM               XORD(XLST(0)) <=
081F 1D2A 84 05           BZ    UPY1       XORD(XLST(0))+H'80'
0820 1D2C 22 80           OI    H'80'   ]
0821 1D2E 90 03           BR    UPY2    ELSE [
0822 1D30 21 7F   UPY1    NI    H'7F'      XORD(XLST(0)) <=
0823 1D32 2C      UPY2    XDC              XORD(XLST(0)).AND.H'7F'
0824 1D33 17              ST              ]
0825                •
0826 1D34 64              LISU  4
0827 1D35 4D              LR    A,XLST+1
0828 1D36 0F              LR    DC,Q
0829 1D37 8E              ADC
082A 1D38 2C              XDC
082B 1D39 0F              LR    DC,Q
082C 1D3A 8E              ADC
082D 1D3B 62              LISU  2       IF MODE = SERVE [
082E 1D3C 70              CLR
082F 1D3D EC              XS    PSTA       XORD(XLST(8)) <=
0830 1D3E 16              LM
```

```
0831 1D3F 91 05              BM     UPY3           XORD(XLST(8)).AND.H'7F'
0832 1D41 21 7F              NI     H'7F'          ]
0834 1D45 22 80      UPY3    OI     H'80'          XORD(XLST(8)) <=
0835 1D47 2C        UPY4    XDC                    XORD(XLST(8))+H'80'
0836 1D48 17                 ST                    ]
0837                  •
0838 1D49 64                 LISU   4
0839 1D4A 4C                 LR     A,XLST
083A 1D4B 0F                 LR     DC,Q
083B 1D4C 8E                 ADC
083C 1D4D 2C                 XDC
083D 1D4E 0F                 LR     DC,Q
083E 1D4F 8E                 ADC
083F 1D50 62                 LISU   2              IF MODE=SERVE [
0840 1D51 70                 CLR
0841 1D52 EE                 XS     PSTA+2         XORD(XLST(9)) <=
0842 1D53 16                 LM
0843 1D54 91 05              BM     UPY5           XORD(XLST(9)).AND.H'7F'
0844 1D56 21 7F              NI     H'7F'          ]
0845 1D58 90 03              BR     UPY6           ELSE [
0846 1D5A 22 80      UPY5    OI     H'80'          XORD(XLST(9)) <=
0847 1D5C 2C        UPY6    XDC                    XORD(XLST(9))+H'80'
0848 1D5D 17                 ST                    ]
0849                  •
084A 1D5E 64                 LISU   4
084B 1D5F 6A                 LISL   2
084C 1D60 4E                 LR     A,XLST+2
084D 1D61 0F                 LR     DC,Q
084E 1D62 8E                 ADC
084F 1D63 2C                 XDC
0850 1D64 0F                 LR     DC,Q
0851 1D65 8E                 ADC
0852 1D66 62                 LISU   2
0853 1D67 4C                 LR     A,PSTA
0854 1D68 21 04              NI     BBYH           IF BBYH=1 [
0855 1D6A 16                 LM                    XORD(XLST(10)) <=
0856 1D6B 84 05              BZ     UPY7           XORD(XLST(10))+H'80'
0857 1D6D 22 80              OI     H'80'          ]
0858 1D6F 90 03              BR     UPY8           ELSE [
085A 1D73 2C        UPY8    XDC                    XORD(XLST(10)).AND.H'7F'
085B 1D74 17                 ST                    ]
085C                  •
085D 1D75 0F                 LR     DC,Q
085E 1D76 20 E0              LI     YVLA-YXA
085F 1D78 8E                 ADC
0860 1D79 0E                 LR     Q,DC
0861 1D7A 63                 LISU   3
0862 1D7B 68                 LISL   0
0863 1D7C 4D                 LR     A,XLST+1
0864 1D7D 8E                 ADC
0865 1D7E 20 FD              LI     -BH2
0866 1D80 C3                 AS     Y
0867 1D81 17                 ST                    YVAL(XLST(0)) <= Y-BH/2
0868 1D82 0F                 LR     DC,Q
0869 1D83 4C                 LR     A,XLST
086A 1D84 8E                 ADC
086B 1D85 62                 LISU   2
086C 1D86 6A                 LISL   2
086D 1D87 20 F1              LI     -PH2+1
086E 1D89 CC                 AS     LPY
086F 1D8A 17                 ST                    YVAL(XLST(1)) <= LPY-PH/2+1
0870 1D8B 0F                 LR     DC,Q
0871 1D8C 63                 LISU   3
0872 1D8D 6A                 LISL   2
0873 1D8E 4C                 LR     A,XLST
0874 1D8F 8E                 ADC
0875 1D90 62                 LISU   2
0876 1D91 6B                 LISL   3
```

```
0877 1D92 20 F1              LI      -PH2+1
0878 1D94 CC                 AS      RPY
                VAL(XLST(2)) <= RPY-PH/2+1
087A 1D96 0F                 LR      DC,Q
087B 1D97 64                 LISU    4
087C 1D98 6A                 LISL    2
087D 1D99 4C                 LR      A,XLST
087E 1D9A 8E                 ADC
087F 1D9B 65                 LISU    5
0880 1D9C 6D                 LISL    5
0881 1D9D 4C                 LR      A,BBY
0882 1D9E 17                 ST                      YVAL(XLST(10)) <= BBY
0883                *
0884                *RED BACKGROUND BELLOW COURT
0885 1D9F 20 EC    WCBB      LI      CBB+2
0886 1DA1 5A                 LR      TEMP,A
0887 1DA2 28 1D E0           PI      SYNC
0888 1DA5 2A 08 F5           DCI     BGRN
0889 1DA8 20 01              LI      RB+LOB
088A 1DAA 17                 ST                      BGRN = RED--LO INT
088B                *
088C                *UPDATE DEL-Y & ROM POINTERS
088D 1DAB 2A 0C 1C           DCI     DATU
088F                *
0890                *SWITCH LISTS
0891 1DB1 62                 LISU    2
0892 1DB2 68                 LISL    0
0893 1DB3 4C                 LR      A,PCOM
0894 1DB4 23 40              XI      SELA
0895 1DB6 5C                 LR      PCOM,A
0896 1DB7 2A 08 F7           DCI     COM
0897 1DBA 17                 ST
.0898               *
0899                *FRAME COMPUTED & DISPLAYED
089A                *         NOP               FOR BREAKPOINT
089B                *         NOP
089C                *         NOP
089D                *         NOP
089E                *
089F                *GREEN BACKGROUND FOR COURT
08A0 1DBB 20 34    WCUB      LI      CUB-2
08A1 1DBD 5A                 LR      TEMP,A
08A2 1DBE 28 1D E0           PI      SYNC
08A3 1DC1 2A 08 F5           DCI     BGRN
08A4 1DC4 20 02              LI      GB+LOB
08A5 1DC6 17                 ST                      BGRN = GREEN--LO INT
08A6                *
08A7 1DC7 29 18 77           JMP     SEO             CONTINUE MAIN LOOP
08A8                *
08A9                *
08AA                ***********************************
08AB                *                                 *
08AC                *         SUBROUTINES             *
08AD                *                                 *
08AE                ***********************************
08AF                *
08B0                *
08B1                *CLEAR UM-1 REGISTERS*
08B2                ***********************
08B3 1DCA 20 FF    CLER      LI      H'FF'           REPEAT [
08B4 1DCC 17                 ST                         MEM(DC0++) <= H'FF'
08B5 1DCD 3A                 DS      TEMP               TEMP <= TEMP-1]
08B6 1DCE 94 FD              BNZ     *-2             UNTIL TEMP=0
08B7 1DD0 1C                 POP                     RETURN
08B8                *
08B9                *MOVE DATA IN MEMORY*
08BA                *********************
08BB 1DD1 08       MOVE      LR      K,P
```

```
08BC  1DD2  16            LM
08BD  1DD3  2C            XDC
08BE  1DD4  17            ST                    REPEAT [
08BF  1DD5  2C            XDC                     MEM(DC1++) <= MEM(DC0++)
08C0  1DD6  3A            DS      TEMP            TEMP <= TEMP-1]
08C1  1DD7  94 FA         BNZ     MOVE+1        UNTIL TEMP=0
08C2  1DD9  0C            PK                    RETURN
08C3              *
08C4              *ZERO MEMORY*
08C5              *************
08C6  1DDA  70    ZERO    CLR                   REPEAT [
08C7  1DDB  17            ST                      MEM(DC0++) <= 0
08C8  1DDC  3A            DS      TEMP            TEMP <= TEMP-1
08C9  1DDD  94 FD         BNZ     *-2           UNTIL TEMP=0
08CA  1DDF  1C            POP                   RETURN
08CB              *
08CC              *SYNC ON A GIVEN LINE .GT. 7*
08CD              ******************************
08CE  1DE0  08    SYNC    LR      K,P
08CF  1DE1  4A            LR      A,TEMP
08D0  1DE2  2A 08 FB      DCI     YCUR
08D1  1DE5  8D            CM                    REPEAT []
08D2  1DE6  94 FB         BNZ     *-4           UNTIL YCUR=TEMP
08D3  1DE8  0C            PK                    RETURN
08D4              *
VY*
08D6              ***********
08D7  1DE9  08    VYCH    LR      K,P
08D8  1DEA  46            LR      A,VYP
08D9  1DEB  18            COM
08DA  1DEC  1F            INC
08DB  1DED  1E            LR      J,W
08DC  1DEE  56            LR      VYP,A
08DD  1DEF  47            LR      A,VY
08DE  1DF0  18            COM
08DF  1DF1  1D            LR      W,J
08E0  1DF2  19            LNK
08E1  1DF3  57            LR      VY,A
08E2  1DF4  0C            PK
08E3              *
08E4              *MULTIPLY BY 2*
08E5              ****************
08E6  1DF5  08    MPY2    LR      K,P
08E7  1DF6  70            CLR
08E8  1DF7  EC            XS      S
08E9  1DF8  1E            LR      J,W
08EA  1DF9  13            SL      1
08EB  1DFA  5D            LR      S+1,A
08EC  1DFB  4C            LR      A,S
08ED  1DFC  13            SL      1
08EE  1DFD  1D            LR      W,J
08EF  1DFE  81 02         BP      *+3
08F0  1E00  1F            INC
08F1  1E01  5D            LR      S+1,A
08F2  1E02  0C            PK
08F3              *
08F4              *COMPARE X-VALUE ENTRIES*
08F5              *************************
08F6  1E03  08    COMP    LR      K,P
08F7  1E04  16            LM
08F8  1E05  21 0F         NI      H'0F'
08F9  1E07  2C            XDC
08FA  1E08  2A 0C 39      DCI     XVU
08FB  1E0B  8E            ADC
08FC  1E0C  16            LM
08FD  1E0D  5A            LR      TEMP,A
08FE  1E0E  2C            XDC
08FF  1E0F  16            LM
```

```
0900 1E10 21 0F           NI      H'0F'
0901 1E12 2C              XDC
0902 1E13 2A 0C 39        DCI     XVU
0903 1E16 8E              ADC
0904 1E17 4A              LR      A,TEMP
0905 1E18 8D              CM                      IF X-VAL(X-ORD(DC0++)))
0906 1E19 2C              XDC
0907 1E1A 82 08           BC      CMP1            X-VAL(X-ORD(DC0++)) [
0908 1E1C 01              LR      A,KL            RETURN
0909 1E1D 24 02           AI      2               ]
090A 1E1F 05              LR      KL,A    ELSE [
090B 1E20 00              LR      A,KU
090C 1E21 19              LNK
090D 1E22 04              LR      KU,A            FRETURN
090E 1E23 0C      CMP1    PK                      ]
090F                •
0910              *EXCHANGE X-ORDER & Y-VALUE ENTRIES*
0911              ******************************
0912 1E24 08      EXCH    LR      K,P
0913 1E25 20 FE           LI      -2
0914 1E27 8E              ADC
0915 1E28 11              LR      H,DC
0916 1E29 2C              XDC
0917 1E2A 10              LR      DC,H
0918 1E2B 16              LM                      EXCHANGE X-ORD ENTRIES
0919 1E2C 5A              LR      TEMP,A
091A 1E2D 16              LM
091B 1E2E 2C              XDC
091C 1E2F 17              ST
091D                •
091E 1E30 24 18           AI      PXLS
091F 1E32 0B              LR      IS,A
0920 1E33 20 FF           LI      -1
0921 1E35 CC              AS      XLST
0922 1E36 5C              LR      XLST,A  XLST(ENT2) <= XLST(ENT2)-1
0923                •
0924 1E37 4A              LR      A,TEMP
0925 1E38 17              ST
0926                •
0927 1E39 24 18           AI      PXLS
0928 1E3B 0B              LR      IS,A
0929 1E3C 71              LIS     1
092A 1E3D CC              AS      XLST
092B 1E3E 5C              LR      XLST,A  XLST(ENT1) <= XLST(ENT1)+1
092C 1E3F 20 DE           LI      -2+YVLA-YXA
092D 1E41 8E              ADC
092E 1E42 11              LR      H,DC
092F 1E43 2C              XDC
0930 1E44 10              LR      DC,H
0931 1E45 16              LM                      EXCHANGE Y-VAL ENTRIES
0933 1E47 16              LM
0934 1E48 2C              XDC
0935 1E49 17              ST
0936 1E4A 4A              LR      A,TEMP
0937 1E4B 17              ST
0938 1E4C 20 20           LI      YXA-YVLA
0939 1E4E 8E              ADC
093A 1E4F 0C              PK
093B                •
093C              *UPDATE ROUTINE*
093D              ****************
093E 1E50 08      UPIT    LR      K,P
093F 1E51 62              LISU    2
0940 1E52 60              LISL    4
0941 1E53 2C              XDC
0942 1E54 20 F0           LI      CBB+CBH+2
0943 1E56 2A 08 FB        DCI     YCUR    SYNC ON LINE CBB+CBH+2
0944 1E59 8D              CM
```

```
0945 1E5A 94 FB            BNZ         *-4
0946 1E5C 2C               XDC
0947                 *
0948 1E5D 16       UPD0    LM                        REPEAT [
0949 1E5E 5A               LR    TEMP,A             TEMP <= MEM(DC0++)
094A 1E5F 25 FF    UPD1    CI    LTEP               IF TEMP=LTEP [
094B 1E61 94 06            BNZ   UPD2
094C 1E63 4C               LR    A,PST1
094D 1E64 22 80            OI    UPFL                  UPFL <= 1
094E 1E66 5C               LR    PST1,A                RETURN
094F 1E67 0C               PK                          ]
0950 1E68 25 FE    UPD2    CI    STER               ]
0951 1E6A 94 06            BNZ   UPD3               ELSEIF TEMP=STER [
0952 1E6C 70               CLR                         IF UPFL=1 [
0953 1E6D EC               XS    PST1                     RETURN
0954 1E6E 81 EE            BP    UPD0                     ]
0955 1E70 0C               PK                          ]
0956 1E71 4A       UPD3    LR    A,TEMP
0957 1E72 25 FD            CI    EVNF
0958 1E74 94 0E            BNZ   UPD4               ELSIF TEMP=ODDF [
0959 1E76 2C               XDC
095A 1E77 2A 08 FA         DCI   ODD
095B 1E7A 16               LM                          ACC <= MEM(DC0++)
095C 1E7B FC               NS    PST1
095D 1E7C 2C               XDC                         IF FLD=ODD
095F 1E7E 81 02            BP    *+3                       DC0<=DC0+ACC
0960 1E80 8E               ADC                           ]
0961 1E81 90 DB            BR    UPD0                  ]
0962 1E83 4A       UPD4    LR    A,TEMP             ELSE [
0963 1E84 2C               XDC
0964 1E85 2A 08 00         DCI   FPL
0965 1E88 8E               ADC
0966 1E89 2C               XDC                         DC1 <= FPL+TEMP
0967 1E8A 20 0D            LI    NOBJ                  MOVE(DC0,DC1,
0968 1E8C 5A               LR    TEMP,A                     NOBJ)
0969 1E8D 16               LM
096A 1E8E 2C               XDC
096B 1E8F 17               ST
096C 1E90 2C               XDC
096D 1E91 3A               DS    TEMP
096E 1E92 94 FA            BNZ   *-5                ]
096F 1E94 90 C8            BR    UPD0               ]
0970                 *
0971                 *MOVE SCORE DIGIT SUBROUTINE*
0972                 ******************************
0973 1E96 08       MOVD    LR    K,P
0974 1E97 2C               XDC
0975 1E98 2A 12 0D         DCI   DIGS-SCH
0976 1E9B 4A               LR    A,TEMP
0977 1E9C 1F               INC
0978 1E9D 5A               LR    TEMP,A
0979 1E9E 20 07            LI    SCH
097A 1EA0 8E               ADC
097B 1EA1 3A               DS    TEMP
097C 1EA2 94 FD            BNZ   *-2
097D 1EA4 20 07            LI    SCH
097F 1EA7 16       MVD1    LM
0980 1EA8 2C               XDC
0981 1EA9 17               ST
0982 1EAA 71               LIS   1
0983 1EAB 8E               ADC
0984 1EAC 2C               XDC
0985 1EAD 3A               DS    TEMP
0986 1EAE 94 F8            BNZ   MVD1
0987 1EB0 0C               PK
0988                 *
0989                 **SOUND GENERATION ROUTINES*
098A                 ******************************
```

```
098B                    •
098C                    •
098D  1EB1 58    SINT    LR      SACC,A     SACC <= ACC
098E  1EB3 67            LISU    7
0990  1EB4 68            LISL    0
0991  1EB5 5D            LR      SIS+1,A    SIS <= ISAR
0992  1EB6 49            LR      A,9
0993  1EB7 5D            LR      SJ+1,A     SJ <= J
0994  1EB8 1E            LR      J,W        J <= W
0995  1EB9 4A            LR      A,HU
0996  1EBA 5D            LR      SHU+1,A    SHU <= HU
0998  1EBC 5C            LR      SHL,A      SHL <= HL
0999  1EBD 11            LR      H,DC       H <= DC
099A                    •
099B  1EBE 66            LISU    6
099C  1EBF 69            LISL    1
099D  1EC0 3D            DS      SNDD+1     SNDD <= SNDD-1
099E  1EC1 84 16         BZ      SIN1       IF SNDD.NE.0 [
099F  1EC3 77            LIS     H'7'
09A0  1EC4 EC            XS      SNDL
09A1  1EC5 5C            LR      SNDL,A     SNDL <= SNDL.XOR.7
09A2  1EC6 B0            OUTS    0          SET LEVEL
09A3  1EC7 71            LIS     1
09A4  1EC8 15            SL      4
09A5  1EC9 B1            OUTS    1          SET ENABLE
09A6  1ECA 70            CLR
09A7  1ECB B1            OUTS    1          LATCH
09A8  1ECC 2A 08 FB      DCI     YCUR
09A9  1ECF 68            LISL    0
09AA  1ED0 16            LM
09AB  1ED1 CC            AS      SNDP
09AC  1ED2 2A 08 F0      DCI     YINT
09AD  1ED5 17            ST                 YINT <= YCUR+SNDP
09AE  1ED6 90 0F         BP      SIN2       ]
09AF  1ED8 68    SIN1    LISL    0          ELSE [
09B0  1ED9 70            CLR
09B1  1FDA 5C            LR      SNDP,A     SNDP <= 0
09B2  1EDB 78            LIS     INT
09B3  1EDC 62            LISU    2
09B4  1EDD 68            LISL    0
09B5  1EDE EC            XS      PCOM
09B6  1EDF 5C            LR      PCOM,A     PCOM <= PCOM-INT
09B7  1EE0 2A 08 F7      DCI     COM        DISABLE UM-1 INT
09B8  1EE3 17            ST
09B9  1EE4 70            CLR                DISABLE SMI INT
09BA  1EE5 BE            OUTS    DSMI       ]
09BB  1EE6 10    SIN2    LR      DC,H       DC <= H
09BC  1EE7 67            LISU    7
09BD  1EE8 6B            LISL    3
09BE  1EE9 4E            LR      A,SHL+2
09BF  1EEA 5B            LR      HL,A       HL <= SHL
09C0  1EEB 4E            LR      A,SHU+2
09C1  1EEC 5A            LR      HU,A       HU <= SHU
09C2  1EED 1D            LR      W,J        W <= J
09C3  1EEE 4E            LR      A,SJ+2
09C4  1EEF 59            LR      J,A        J <= SJ
09C5  1EF0 4C            LR      A,SIS
09C6  1EF1 0B            LR      IS,A       ISAR <= SIS
09C7  1EF2 48            LR      A,SACC     ACC <= SACC
09C8  1EF3 1B            EI
09C9  1EF4 1C            POP                RETURN
09CA                    •
09CB                    •
09CC  1EF5 66    COND    LISU    6
09CD  1EF6 68            LISL    0
09CE  1EF7 70            CLR
09CF  1EF8 ED            XS      SNDP+1
```

```
09D0  1EF9  84 30           BZ      SND2            IF SNDP.NE.0 [
09D1  1EFB  13              SL      1
09D2  1EFC  14              SR      4
09D3  1EFD  24 02           AI      2
09D4  1EFF  5C              LR      SNDD,A
09D5  1F00  20 40           LI      64
09D6  1F02  12              SR      1
09D7  1F03  3C              DS      SNDD
09D8  1F04  94 FD           BNZ     *-2
09D9  1F06  5D              LR      SNDD+1,A        SNDD <= 64/SNDP
09DA  1F07  20 1E           LI      SINT:           SMI INT VECTOR <= ^SIN
09DB  1F09  BC              OUTS    IVU
09DC  1F0A  20 B1           LI      SINT.
09DD  1F0C  BD              OUTS    IVL
09DE  1F0D  76              LIS     H'6'
09DF  1F0E  5C              LR      SNDL,A          SNDL <= 6
09E0  1F0F  B0              OUTS    0               SET LEVEL
09E1  1F10  71              LIS     1
09E2  1F11  15              SL      4
09E3  1F12  B1              OUTS    1               SET ENABLE
09E4  1F13  70              CLR
09E5  1F14  B1              OUTS    1               LATCH
09E6  1F15  71              LIS     ESMI            ENABLE SMI INT
09E7  1F16  BE              OUTS    OSMI
09E8  1F17  2A 08 FB        DCI     YCUR
09E9  1F1A  68              LISL    0
09EA  1F1B  16              LM
09EB  1F1C  CC              AS      SNDP
09EC  1F1D  2A 08 F0        DCI     YINT
09ED  1F20  17              ST                      YINT <= YCUR+SNDP
09EE  1F21  78              LIS     INT
09EF  1F22  62              LISU    2
09F0  1F23  EC              XS      PCOM
09F1  1F24  5C              LR      PCOM,A          PCOM <= PCOM+INT
09F2  1F25  2A 08 F7        DCI     COM             UM-1 LINE-INT MODE
09F3  1F28  17              ST
09F4  1F29  1B              EI                      ENABLE CPU INT
09F5                        *                       ]
09F6  1F2A  1C      SND2    POP                     RETURN
09F7                        *
09F8                        *JOYSTICK INPUT ROUTINE*
09F9                        ************************
09FA  1F2B  08      JOYI    LR      K,P
09FB  1F2C  62              LISU    2
09FC  1F2D  68              LISL    0
09FD  1F2E  4B              LR      A,TMP2
09FE  1F2F  2A 08 F0        DCI     YINT
09FF  1F32  17              ST                      YINT <= TMP2
0A00  1F33  4A              LR      A,TEMP          SELECT JOYSTICK POT
0A01  1F34  B0              OUTS    0
0A02                        *
0A03  1F35  20 1F           LI      JOY1:           SMI INT VECTOR <= ^JOY1
0A04  1F37  BC              OUTS    IVU
0A05  1F38  20 83           LI      JOY1.
0A06  1F3A  BD              OUTS    IVL
0A07                        *
0A08  1F3B  71              LIS     ESMI            ENABLE SMI INT
0A09  1F3C  BE              OUTS    OSMI
0A0A                        *
0A0B  1F3D  1B              EI                      ENABLE CPU INT
0A0C                        *
0A0D  1F3E  78              LIS     INT
0A0E  1F3F  EC              XS      PCOM
0A0F  1F40  5C              LR      PCOM,A          PCOM <= PCOM+INT
0A10  1F41  2A 08 F7        DCI     COM
0A11  1F44  17              ST                      UM-1 LINE-INT MODE
0A12                        *
```

```
0A13  1F45 90 FF              BR      *          WAIT FOR INTERRUPT
0A14                      *
0A15                      *
0A16                      *
0A17                      *MAP X-Y FREEZE READINGS INTO SCREEN COORDINATES
0A18  1F47 2A 08 F9  MAP   DCI     YFRZ
0A19  1F4A 4B              LR      A,TMP2
0A1A  1F4B 18              COM
0A1B  1F4C 1F              INC
0A1C  1F4D 88              AM
0A1D  1F4E 5A              LR      TEMP,A     TEMP <= DEL.YFRZ
0A1E  1F4F 70              CLR
0A1F  1F50 5B              LR      HL,A
0A20  1F51 10              LR      DC,H       DC0 <= TEMP*256
0A21  1F52 20 E4           LI      228
0A22  1F54 8E       MAP1   ADC
0A23  1F55 3A              DS      TEMP
0A24  1F56 94 FD           BNZ     MAP1
0A25  1F58 2C              XDC                DC1 <= DEL.YFRZ*228
0A26  1F59 2A 08 F8        DCI     XFRZ
0A27  1F5C 70              CLR
0A28  1F5D 8C              XM
0A29  1F5E 2C              XDC
0A2A  1F5F 8E              ADC
0A2B  1F60 20 EB           LI      -533.
0A2C  1F62 8E              ADC
0A2D  1F63 11              LR      H,DC
0A2E  1F64 20 FE           LI      -533:+1
0A2F  1F66 81 03           BP      MAP2
0A30  1F68 24 01           AI      1
0A31  1F6A CA       MAP2   AS      HU         H <= DEL.YFRZ*228+XFRZ-533
0A32  1F6B 81 04           BP      MAP3
0A33  1F6D 70              CLR
0A34  1F6E 90 0A           BR      MAP5
0A35  1F70 94 06    MAP3   BNZ     MAP4
0A36  1F72 4B              LR      A,HL
0A37  1F73 25 C7           CI      199
0A38  1F75 82 03           BC      MAP5
0A39  1F77 20 C7    MAP4   LI      199
0A3A  1F79 5A       MAP5   LR      TEMP,A
0A3B                    *
0A3C  1F7A 72              LIS     FRZ
0A3D  1F7B EC              XS      PCOM
0A3E  1F7C 5C              LR      PCOM,A     PCOM <= PCOM-FRZ
0A3F  1F7D 2A 08 F7        DCI     COM
0A40  1F80 17              ST                 RESET FREEZE MODE
0A41                    *
0A42  1F81 4A              LR      A,TEMP
0A43  1F82 0C              PK                 RETURN
0A44                    *
0A45  1F83 20 80    JOY1   LI      EJOY       ENABLE JOYSTICK
0A46  1F85 B1              OUTS    1
0A47                    *
0A48  1F86 20 1F           LI      JOY2:      SMI INT VECTOR <= ^JOY2
0A49  1F88 BC              OUTS    IVU
0A4A  1F89 20 96           LI      JOY2.
0A4B  1F8B BD              OUTS    IVL
0A4C                    *
0A4D  1F8C 7A              LIS     INT+FRZ
0A4E  1F8D EC              XS      PCOM
0A4F  1F8F 5C              LR      PCOM,A     PCOM <= PCOM-INT+FRZ
0A51  1F92 17              ST                 UM-1 FREEZE MODE
0A52                    *
0A53  1F93 1B              EI                 ENABLE CPU INT
0A54                    *
0A55  1F94 90 FF           BR      *          WAIT FOR INTERRUPT
0A56                    *
```

```
0A57
0A58  1F96 70      JOY2      CLR
0A59  1F97 B1                OUTS    1         DISABLE JOYSTICK
0A5A  1F98 BE                OUTS    DSMI      DISABLE SMI INT
0A5B      •
0A5C  1F99 90 AD            BR      MAP       READ X & Y-FREEZE REGISTERS
0A5D
0A5E
0A60                •••••••••••••••••••••••••••••••••••••••••••
0A61                •                                          •
0A62                •         RAM ASSIGNMENTS                  •
0A63                •                                          •
0A64                •••••••••••••••••••••••••••••••••••••••••••
0A65                •
0A66                          ORG     RAM
0A67                •
0A68                •LEFT SCORE
0A69                LSCR      ORG     •
0A6A                          ORG     •+SCH+SCH
0A6B                •         DC      LSCR+LSCR+LSCR+LSCR+LSCR+LSCR+LSCR+LSCR
0A6C                •         DC      LSCR+LSCR+LSCR+LSCR+LSCR+LSCR+LSCR+LSCR
0A6D                •         DC      SCH
0A6E                •
0A6F                •RIGHT SCORE
0A70                RSCR      ORG     •
0A71                          ORG     •+SCH+SCH
0A72                •         DC      RSCR+RSCR+RSCR+RSCR+RSCR+RSCR+RSCR+RSCR
0A73                •         DC      RSCR+RSCR+RSCR+RSCR+RSCR+RSCR+RSCR+RSCR
0A74                •         DC      SCH
0A75                •
0A76                DATU      ORG     •
0A77                DLXU      ORG     •+1
0A78                XVU       ORG     •+NOBJ+NOBJ+2
0A79                FPLO      ORG     •+NOBJ+3
0A7A                FPHO      ORG     •+NOBJ+1
0A7B                FPLE      ORG     •+NOBJ+NOBJ+NOBJ+5
0A7C                FPHE      ORG     •+NOBJ+1
0A7D                •
0A7E                •
0A7F                          END
00
BASE 1800   BB   0004   BBH  0020   BBH2 0010   BBIM 0002
BBK1 000C   BBK2 000C   BBTB 1204   BBVX 0001   BBVY 0002
BBW2 0003   BBX  000C   BBY  000C   BBYH 0004   BGFN 08F5
BH   0006   BH2  0003   BL   12DD   BLU  0020   BR   12E3
BSCO 188B   BVX  000C   BVY  000C   BW   0004   BW2  0002
BYHN 00FB   C0   190F   C1   19E8   C10  1A7B   C11  1A82
C11A 1A97   C12  1A9B   C12A 1AAE   C12B 1AB0   C13  1AB6
C14  1ABF   C14A 1AC5   C15  1AC8   C15A 1ACF   C15B 1AE2
C15C 1AEF   C15D 1AF8   C15E 1B06   C15F 1B0E   C15G 1B0F
C1A  19EE   C2   19F7   C2A  1A09   C2B  1A0C   C3   1A0D
C3A  1A24   C3B  1A34   C4   1A35   C5   1A3E   C6   1A4E
C6A  1A5C   C7   1A67   C8   1A6B   C9   1A74   CB   14E1
CBB  00EA   CBH  0004   CH   00B4   CH2  005A   CH11 1B2B
CH12 1B33   CH13 1B3B   CH14 1B43   CH15 1B4B   CH1E 1B4D
CHIM 1B22   CLB  0006   CLEN 00CF   CLER 1DCA   CMP1 1E23
CO1  1A65   CO2  1AC6   COM  08F7   COMP 1E03   COPY 0080
CR1E 16F1   CR1D 16E5   CR2E 1709   CR2D 16FD   CRB  00B6
CRH  000C   CRW  0028   CUB  0036   CW   00B0   CW2  0058
DAT0 125A   DATU 0C1C   DELX 0820   DELY 0830   DIGS 1214
DLXU 0C1D   EJOY 0080   ENB  0004   ESMI 0001   EVNF FFFD
EVNR 12C0   EXCH 1E24   FMOD 08F2   FRZ  0002   GB   0002
GFN  0040   HBF  0008   HBFN 00F7   HBY5 0008   HI   0040
HIB  0010   HITK 000C   HL   000B   HU   000A   INT  0008
IVL  000D   IVU  000C   JOY1 1F83   JOY2 1F96   JOYI 1F2B
LB1E 1525   LB1D 14E5   LB2E 15A5   LB2D 1565   LBLN 0020
LBRN 0030   LCPY 00EF   LDVJ 0001   LO   0000   LOB  0000
LP1E 1309   LP1D 12E9   LP2E 1369   LP2D 1329   LPIM 0040
```

| | | | | | | | | | |
|---|---|---|---|---|---|---|---|---|---|
| LFX | 0022 | LFY | 000C | LSCD | 000C | LSCR | 0C00 | LSV | 00BF |
| LSVB | 0001 | LSX | 0046 | LTER | FFFF | MAF | 1F47 | MAF1 | 1F54 |
| MAF2 | 1F6A | MAF3 | 1F70 | MAF4 | 1F77 | MAF5 | 1F79 | MAXS | 0015 |
| MB0 | 1988 | MBB | 1907 | MOVD | 1E96 | MOVE | 1DD1 | MP0 | 1996 |
| MP1 | 19A0 | MP2 | 19B3 | MP3 | 19CC | MP4 | 19D2 | MPY2 | 1DF5 |
| MVD1 | 1EA7 | NH | 003C | NL | 1469 | NOBJ | 000D | NP | 14A5 |
| NW2 | 0001 | NX | 005E | ODAT | 1200 | OD | 08FA | OPSU | 0006 |
| OSMI | 000E | PCOM | 000C | PEN | 0006 | PENS | 0002 | PERB | 0010 |
| PERH | 0008 | PERS | 0004 | PH | 0020 | PH2 | 0010 | PIMN | 009F |
| PY | 000C | PAM | 0C00 | PB | 0011 | PB1E | 16E5 | PB10 | 15E5 |
| PB2E | 16A5 | PB20 | 16A5 | PBLN | 0000 | PBAN | 0010 | PCRX | 006A |
| PDVJ | 0010 | PED | 0020 | PF1E | 13C9 | PF10 | 13A9 | PF2E | 14E9 |
| PF20 | 13E9 | PFH | 0010 | PFHE | 0C91 | PFHO | 0C57 | PFIM | 0020 |
| PFL | 0800 | PFLE | 0C83 | PFLO | 0C49 | PFX | 009A | PFY | 000C |
| PSCD | 000C | PSCP | 0C0E | PSV | 0040 | PSVB | 0004 | PSX | 0066 |
| S | 000C | SACC | 0002 | SBB1 | 1C62 | SCH | 0007 | SE0 | 1877 |
| SE1 | 1886 | SE1A | 18B7 | SE1B | 18C5 | SE1C | 18D6 | SE1D | 18E2 |
| SE1E | 18E4 | SE2 | 18F7 | SE3 | 1903 | SE4 | 190F | SE4A | 1919 |
| SE5 | 1920 | SE6 | 192C | SE7 | 1947 | SE7A | 1968 | SE7B | 1972 |
| SE7C | 1984 | SELA | 0040 | SE01 | 18F5 | SED2 | 191E | SED3 | 1945 |
| SERV | 007F | SHL | 000C | SHU | 000C | SIN1 | 1ED8 | SIN2 | 1EE6 |
| SINT | 1EB1 | SIS | 000C | SJ | 000C | SND2 | 1F2A | SNDD | 000C |
| SNDL | 000C | SNDP | 000C | S01 | 1CE3 | S02 | 1CF4 | S03 | 1D09 |
| SOND | 1EF5 | SORT | 1CD0 | STER | FFFF | SUB | 0027 | SV | 003A |
| SYNC | 1DE0 | TEMP | 000A | TMP2 | 000B | TXT | 08F1 | UPD0 | 1E5D |
| UPD1 | 1E5F | UPD2 | 1E68 | UPD3 | 1E71 | UPD4 | 1E83 | UPDT | 1E50 |
| UPFL | 0080 | UPRX | 1B55 | UPY1 | 1D30 | UPY2 | 1D32 | UPY3 | 1D45 |
| UPY4 | 1D47 | UPY5 | 1D5A | UPY6 | 1D5F | UPY7 | 1D71 | UPY8 | 1D73 |
| UPYV | 1D1D | VF | 0006 | VTBL | 1200 | VX | 0005 | VX0 | 0180 |
| VXP | 0004 | VY | 0007 | VY20 | 0103 | VY40 | 025A | VYCH | 1DE9 |
| VYP | 0006 | WCBB | 1D9F | WCUB | 1DBB | X | 0001 | XFPZ | 08F8 |
| XLST | 000C | XOFF | 08F3 | XP | 0000 | XV | 0840 | XVU | 0C39 |
| Y | 0003 | YCUR | 08FB | YFPZ | 08F9 | YINT | 08F0 | YOFF | 08F4 |
| YP | 0002 | YVLA | 0850 | YVLB | 0860 | YXA | 0870 | YXB | 0880 |
| ZERO | 1D0A | ZOOM | 086E | | | | | | |

While the invention has been described in detail in connection with a preferred embodiment thereof, it will be apparent to those skilled in the art that many changes or modifications can be made without departing from the spirit of the invention. It is therefore intended that the coverage afforded be limited only by the language of the claims and its equivalent.

We claim:

1. A method of arranging information defining a display for a display surface area which is scanned by a scanning system to produce said display, comprising the steps of:

A. storing at predetermined locations in memory apparatus, sets of information respectively defining a plurality of spatial display segments, each of which at least partially defines an object image that it may be desired be included in said display;

B. placing in memory apparatus in a predetermined order correlated with the order of appearance in said display of those spatial display segments to be included therein, indicia uniquely associated with each of the sets of information defining those spatial display segments to appear in said display, which said indicia at least partly defines the geometrical location on said display surface area at which the spatial display segment to which it is associated is to appear; and C. responding to said predetermined order of indicia by extracting from said memory apparatus in their order of appearance in said display, those sets of information defining the spatial segments to be included in said display.

2. A method according to claim 1 of arranging information defining a display for a display surface area, wherein said scanning system scans said display surface area to produce each of said displays by sequentially scanning adjacent lines to produce a raster scan defining said display; and said indicia uniquely associated with each of said sets of information defines the first line to be scanned containing a portion of the spatial display segment associated therewith.

3. A method of arranging information defining a display for a display surface area which is scanned over a period of time by a scanning system to produce said display, comprising the steps of:

A. storing at predetermined locations in memory apparatus, sets of information respectively defining a plurality of spatial display segments, each of which at least partially defines an object image that it may be desired be included in said display;

B. placing in memory apparatus in a predetermined order correlated with the order of appearance in said display of those spatial display segments to be included therein, indicia uniquely associated with each of the sets of information defining those spatial display segments to appear in said display, said order of appearance being the order in time in which said segments are required by said scanning system to produce said display; and C. responding to said predetermined order of indicia by extracting from said memory apparatus in their order of appearance in said display, those sets of information defining the spatial display segments to be included in said display.

4. A method of arranging information defining a display of spatial display segments for a display surface area which is scanned by a scanning system to produce said display and wherein it is desired that said display include a showing of background at all locations not having a spatial display segment, comprising the steps of:
   A. storing at predetermined locations in memory apparatus, sets of information respectively defining a plurality of spatial display segments, each of which at least partially defines an object image that it may be desired be included in said display;
   B. placing in memory apparatus in a predetermined order correlated with the order of appearance in said display of those spatial display segments to be included therein, indicia uniquely associated with each of the sets of information defining those spatial display segments to appear in said display;
   C. responding to said predetermined order of indicia by extracting from said memory apparatus in their order of appearance in said display, those sets of information defining the spatial display segments to be included in said display;
   D. calculating for said display the time-distance between spatial display segments which are to be displayed thereon; and
   E. providing to said scanning system background control signals directing said scanning system to produce said background display between spatial display segments for said calculated time-distance.

5. A method of arranging information defining a display for a display surface area which is scanned by a scanning system to produce said display by sequentially scanning adjacent lines to produce a raster scan defining said display, comprising steps of:
   A. storing at predetermined locations in memory apparatus, sets of information respectively defining a plurality of spatial display segments, each of which at least partially defines an object image that it may be desired be included in said display;
   B. placing in memory apparatus in a predetermined order correlated with the order of appearance in said display of those spatial display segments to be included therein, indicia uniquely associated with each of the sets of information defining those spatial display segments to appear in said display; and
   C. responding to said predetermined order of indicia by extracting from said memory apparatus in their order of appearance in said display, those sets of information defining the spatial display segments to be included in said display, including the step of sequentially composing each of said adjacent lines individually to produce said raster scan by extracting from each of said sets of information only that information required for each of said adjacent lines.

6. Apparatus for arranging information defining a display for a display surface area which is scanned by a scanning system to produce said display and wherein it is desired that said display include a showing of background at all locations not having a spatial display segment, comprising:
   A. means to store at predetermined locations sets of information respectively defining a plurality of spatial display segments, each of which at least partially defines an object image that it may be desired be included in said display;
   B. means to store in a predetermined order correlated with the order of appearance in said display of those spatial display segments to be included in said display, indicia uniquely associated with each of the sets of information defining the spatial display segments to appear in said display;
   C. means responsive to said predetermined order of indicia by extracting from storage those sets of information defining the spatial display segments to be included in said display in their order of appearance in said display;
   D. means to calculate for said display the time-distance between spatial display segments which are to be displayed on said area; and
   E. means responsive to said means to calculate, by providing to said scanning system background control signals directing said scanning system to produce said background display between spatial display segments for said calculated time-distance.

7. Apparatus according to claim 6 for arranging information defining a display for a display surface area, wherein said display surface area is a display screen of a television receiver and said scanning system is the raster scanning system therefor; means are included for generating the timing and synchronization signals required to produce a composite video signal for the scanning system of said television receiver; each of said sets of information defining a spatial display segment includes indicia defining background for an object image also defined by said set of information signals; and further including delivery means responsive to said background defining information in each of said information sets by directing said scanning system to produce said background display when required to produce background in a spatial display segment for an object image of said segment.

8. Apparatus for arranging information defining a display for a display surface area which is scanned by a scanning system to produce said display comprising:
   A. means to store at predetermined locations sets of information respectively defining a plurality of spatial display segments, each of which at least partially defines an object image that it may be desired be included in said display;
   B. means to store in a predetermined order correlated with the order of appearance in said display of those spatial display segments to be included in said display, indicia uniquely associated with each of the sets of information defining the spatial display segments to appear in said display;
   C. means responsive to said predetermined order of indicia by extracting from storage those sets of information defining the spatial display segments to be included in said display in their order of appearance in said display;
   D. means to provide information defining a display surface area background for object images to be displayed during said display;
   E. means to convert said spatial display segment information and said background defining information to corresponding control signals for said scanning system; and F. means to deliver said background defining information and the set or sets of spatial display segment information defining object images to be included in said display to said converting means at times during scanning for said display correlated with the desired spatial positioning on said display surface area of background and said spatial display segments, which delivery means includes means to discharge information defining image objects at a regular rate correlated with the rate at which said scanning system scans said display surface area to produce said display.

9. Apparatus according to claim 8 for arranging information defining a display for a display surface area wherein said delivery means includes a first in-first out buffer.

10. Apparatus according to claim 8 for arranging information defining a display for a display surface area, wherein said means responsive to said predetermined order of indicia includes:
A. means to track the scan by said scanning system which produces said display; and
B. means responsive to said means to track the scan indicating that said scanning system is approaching a desired spatial position for a selected spatial segment by directing said means storing the information set defining said spatial display segment to deliver said information set to said delivery means.

11. Apparatus according to claim 8 for arranging information defining a display for a display surface area, wherein said means to store indicia in a predetermined order correlated with the order of appearance in said display of those spatial display segments to be included in said display, comprises a dynamic read and write memory which also stores indicia defining the location in said display of each of said spatial display segments to appear in said display.

12. Apparatus according to claim 1 wherein said read and write memory further includes information defining a color and color intensity desired for the object images in said segment to appear in said display; and said approach indicating means is further responsive to said means to track the scan indicating that said scanning system is approaching a desired spatial position for a selected spatial segment by delivering said color and color intensity information to said information discharging means.

* * * * *